US011001776B2

(12) United States Patent
Hoffman et al.

(10) Patent No.: US 11,001,776 B2
(45) Date of Patent: May 11, 2021

(54) SYSTEM AND METHOD OF PREPARING PRE-TREATED BIOREFINERY FEEDSTOCK FROM RAW AND RECYCLED WASTE CELLULOSIC BIOMASS

(75) Inventors: Richard B. Hoffman, Broomfield, CO (US); Frank S. Barnes, Boulder, CO (US)

(73) Assignee: Richard B. Hoffman, Broomfield, CO (US)

( * ) Notice: Subject to any disclaimer, the term of this patent is extended or adjusted under 35 U.S.C. 154(b) by 650 days.

(21) Appl. No.: 12/671,397

(22) PCT Filed: Jul. 31, 2008

(86) PCT No.: PCT/US2008/071806
§ 371 (c)(1),
(2), (4) Date: Jun. 14, 2010

(87) PCT Pub. No.: WO2009/018469
PCT Pub. Date: Feb. 5, 2009

(65) Prior Publication Data
US 2010/0287826 A1   Nov. 18, 2010

Related U.S. Application Data

(60) Provisional application No. 60/952,992, filed on Jul. 31, 2007.

(51) Int. Cl.
*C08L 97/02* (2006.01)
*C10L 5/36* (2006.01)
(Continued)

(52) U.S. Cl.
CPC ............... *C10L 5/44* (2013.01); *C10L 5/363* (2013.01); *D21C 3/22* (2013.01); *D21C 5/00* (2013.01);
(Continued)

(58) Field of Classification Search
CPC ........ C08L 97/005; C08L 97/02; C10L 5/363; C10L 5/366
(Continued)

(56) References Cited

U.S. PATENT DOCUMENTS 2,801,939 A   8/1957   Hignet et al.
2,801,955 A   8/1957   Rutenberg et al.
(Continued)

FOREIGN PATENT DOCUMENTS

CA   2488887 A1 * 12/2003 ....... A61F 13/15203
DE   2552449 A1   5/1977
(Continued)

OTHER PUBLICATIONS

International Search Report and Written Opinion for Application No. PCT/US08/071806 dated Nov. 4, 2008.
(Continued)

*Primary Examiner* — Prem C Singh
*Assistant Examiner* — Ming Cheung Po
(74) *Attorney, Agent, or Firm* — Marshall, Gerstein & Borun LLP

(57) ABSTRACT

A method of preparing cellulosic biomass material for subsequent processing first comprises moving at least one stream of biomass material along a flow path. Then, the stream of cellulosic biomass material can be explosively dried and pulverized to disrupt lignocellulosic bonds, and to reduce a moisture content and a particle size of the cellulosic biomass material. Then, the stream of cellulosic biomass material can be electrically degraded the stream of cellulosic biomass material to disrupt lignocellulosic bonds. Additional pre-treatment and post-treatment processes can also be included.

15 Claims, 21 Drawing Sheets

(51) Int. Cl.

| | | |
|---|---|---|
| *C08L 97/00* | (2006.01) | |
| *C10L 5/44* | (2006.01) | |
| *D21C 5/00* | (2006.01) | |
| *F26B 5/02* | (2006.01) | |
| *F26B 1/00* | (2006.01) | |
| *D21C 3/22* | (2006.01) | |
| *F26B 3/28* | (2006.01) | |
| *F26B 3/347* | (2006.01) | |
| *F26B 17/10* | (2006.01) | |

(52) U.S. Cl.
CPC .............. *F26B 1/005* (2013.01); *F26B 3/28* (2013.01); *F26B 3/347* (2013.01); *F26B 5/02* (2013.01); *F26B 17/102* (2013.01); *Y02E 50/10* (2013.01); *Y02E 50/30* (2013.01)

(58) Field of Classification Search
USPC .......................................................... 44/605
See application file for complete search history.

(56) References Cited

U.S. PATENT DOCUMENTS

| | | | |
|---|---|---|---|
| 2,832,545 A | 4/1958 | Segraves | |
| 3,212,932 A | 10/1965 | Hess et al. | |
| 3,255,793 A | 6/1966 | Clute | |
| 3,523,911 A | 8/1970 | Funk et al. | |
| 3,876,156 A | 4/1975 | Muschelknautz et al. | |
| 4,000,032 A * | 12/1976 | Bergstrom | D21B 1/325 162/21 |
| 4,059,231 A | 11/1977 | Neu | |
| 4,226,369 A | 10/1980 | Botts et al. | |
| 4,341,609 A | 7/1982 | Eskamani et al. | |
| 4,376,010 A | 3/1983 | Gauvin | |
| 4,390,131 A | 6/1983 | Pickrel | |
| 4,391,411 A | 7/1983 | Colburn | |
| 4,418,871 A | 12/1983 | Powell | |
| 4,427,453 A | 1/1984 | Reitter | |
| 4,515,816 A * | 5/1985 | Anthony | A23K 50/15 426/626 |
| 4,612,286 A | 9/1986 | Sherman et al. | |
| 4,706,903 A | 11/1987 | Brink et al. | |
| 4,718,609 A | 1/1988 | Rolle et al. | |
| 4,797,135 A | 1/1989 | Kubat et al. | |
| 4,852,818 A | 8/1989 | Rolle et al. | |
| 4,892,261 A | 1/1990 | Rolle et al. | |
| 4,992,105 A | 2/1991 | Werner et al. | |
| 5,000,000 A | 3/1991 | Ingram et al. | |
| 5,096,462 A | 3/1992 | Schulz et al. | |
| 5,114,541 A | 5/1992 | Bayer | |
| 5,135,861 A | 8/1992 | Pavilon | |
| 5,184,781 A | 2/1993 | Andela | |
| 5,186,722 A | 2/1993 | Cantrell et al. | |
| 5,188,298 A | 2/1993 | Gerber | |
| 5,196,069 A * | 3/1993 | Cullingford | C13K 1/02 127/1 |
| 5,417,817 A | 5/1995 | Dammann et al. | |
| 5,458,897 A | 10/1995 | Pare | |
| 5,464,513 A | 11/1995 | Goriachev et al. | |
| RE35,118 E | 12/1995 | Gerber | |
| 5,498,766 A * | 3/1996 | Stuart | C08H 8/00 435/99 |
| 5,554,520 A | 9/1996 | Fowler et al. | |
| 5,628,830 A | 5/1997 | Brink | |
| 5,682,683 A | 11/1997 | Haimer | |
| 5,726,046 A | 3/1998 | Farone et al. | |
| 5,735,916 A | 4/1998 | Lucas et al. | |
| 5,770,010 A | 6/1998 | Jelks | |
| 5,839,671 A | 11/1998 | Sand et al. | |
| 5,846,787 A | 12/1998 | Ladisch et al. | |
| 5,907,037 A | 5/1999 | Gujral et al. | |
| 5,950,542 A | 9/1999 | Harris et al. | |
| 5,969,207 A | 10/1999 | Kozyuk | |
| 6,024,307 A | 2/2000 | Sand et al. | |
| 6,030,538 A | 2/2000 | Held | |
| 6,039,277 A | 3/2000 | Hamm et al. | |
| 6,174,472 B1 | 1/2001 | Johnson et al. | |
| 6,306,248 B1 | 10/2001 | Eley | |
| 6,443,376 B1 | 9/2002 | Huang et al. | |
| 6,491,242 B1 | 12/2002 | Dingee, IV et al. | |
| 6,491,820 B2 | 12/2002 | Held et al. | |
| 6,540,919 B2 | 4/2003 | Held et al. | |
| 6,588,686 B2 | 7/2003 | Dingee, IV et al. | |
| 6,620,292 B2 | 9/2003 | Wingerson | |
| 6,682,005 B2 | 1/2004 | Kantonen et al. | |
| 6,722,594 B2 | 4/2004 | Graham | |
| 6,773,545 B2 * | 8/2004 | Tanner | D21B 1/066 162/20 |
| 6,811,879 B2 * | 11/2004 | Dezutter | C04B 18/241 428/402 |
| 6,818,027 B2 | 11/2004 | Murcia | |
| 6,824,599 B2 | 11/2004 | Swatloski et al. | |
| 6,863,878 B2 | 3/2005 | Klepper | |
| 6,880,772 B2 | 4/2005 | Schlesiger et al. | |
| 6,933,381 B2 | 8/2005 | Mallon et al. | |
| 6,978,953 B2 | 12/2005 | Graham | |
| 7,001,520 B2 | 2/2006 | Held et al. | |
| 7,040,557 B2 | 5/2006 | Graham et al. | |
| 7,059,550 B2 | 6/2006 | Graham et al. | |
| 7,137,580 B2 | 11/2006 | Graham et al. | |
| 7,481,385 B2 | 1/2009 | Narayan et al. | |
| 2002/0053259 A1 | 5/2002 | Ma et al. | |
| 2002/0062502 A1 | 5/2002 | Lebel et al. | |
| 2002/0063177 A1 | 5/2002 | Graham | |
| 2003/0041982 A1 | 3/2003 | Prior | |
| 2003/0044951 A1 | 3/2003 | Sporleder et al. | |
| 2003/0080223 A1 | 5/2003 | Dingee et al. | |
| 2003/0080224 A1 * | 5/2003 | Rowley, Jr. | F26B 17/10 241/5 |
| 2003/0157351 A1 | 8/2003 | Swatloski et al. | |
| 2003/0176669 A1 | 9/2003 | Thorre | |
| 2003/0221363 A1 | 12/2003 | Reed | |
| 2004/0200910 A1 | 10/2004 | Graham et al. | |
| 2004/0251343 A1 | 12/2004 | Graham | |
| 2004/0251345 A1 | 12/2004 | Graham et al. | |
| 2005/0177013 A1 | 8/2005 | Countz | |
| 2005/0223587 A1 | 10/2005 | Boily et al. | |
| 2005/0236121 A1 | 10/2005 | Kondo et al. | |
| 2006/0032139 A1 | 2/2006 | Yamada et al. | |
| 2006/0108459 A1 | 5/2006 | Narayan et al. | |
| 2006/0130396 A1 | 6/2006 | Werner | |
| 2007/0220805 A1 | 9/2007 | Leveson et al. | |
| 2007/0275447 A1 | 11/2007 | Lewis et al. | |
| 2008/0006536 A1 | 1/2008 | Cuomo et al. | |
| 2008/0057554 A1 | 3/2008 | Huhnke et al. | |
| 2010/0041119 A1 * | 2/2010 | Christensen et al. | 435/162 |

FOREIGN PATENT DOCUMENTS

| | | |
|---|---|---|
| EP | 0018348 A1 | 10/1980 |
| JP | H10295390 A | 11/1998 |
| JP | 2010066594 A | 3/2010 |
| WO | WO-8100296 A1 | 2/1981 |
| WO | WO-8301781 A1 | 5/1983 |
| WO | WO-8805168 A1 | 7/1988 |
| WO | WO-9811235 A2 | 3/1998 |
| WO | WO-9836124 A1 | 8/1998 |
| WO | WO-0119942 A2 | 3/2001 |
| WO | WO-02057317 A1 | 7/2002 |
| WO | WO-2005118648 A2 | 12/2005 |
| WO | WO-2006017655 A2 | 2/2006 |
| WO | WO-2006081645 A1 | 8/2006 |
| WO | WO-2007019505 A2 | 2/2007 |
| WO | WO-2007049485 A1 | 5/2007 |
| WO | WO-2007106773 A1 | 9/2007 |
| WO | WO-2007138256 A2 | 12/2007 |

(56) References Cited

FOREIGN PATENT DOCUMENTS

| WO | WO-2008043837 A1 | 4/2008 |
| WO | WO-2008063512 A2 | 5/2008 |

OTHER PUBLICATIONS

International Preliminary Report on Patentability for Application No. PCT/US08/071806 dated Feb. 11, 2010.

* cited by examiner

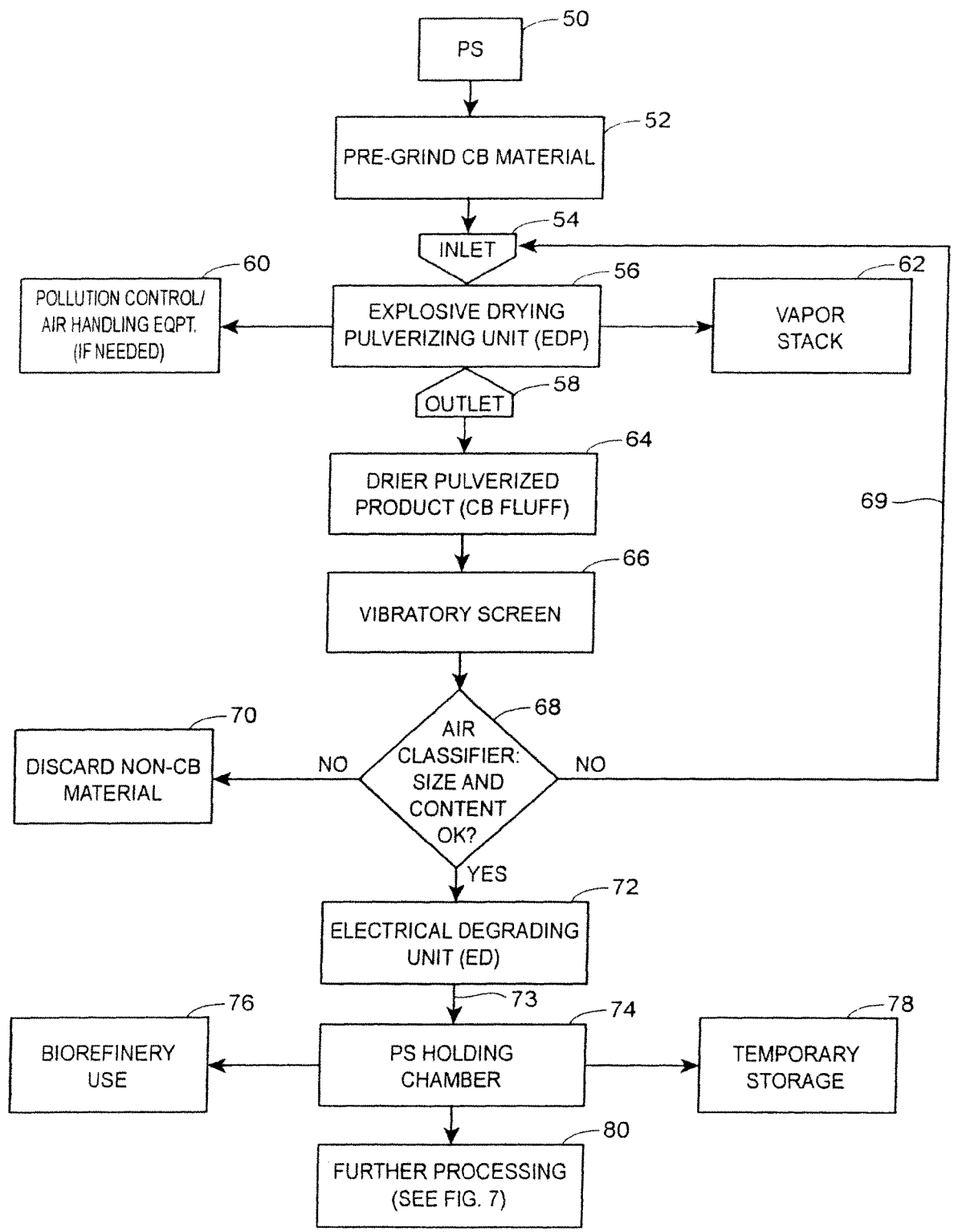

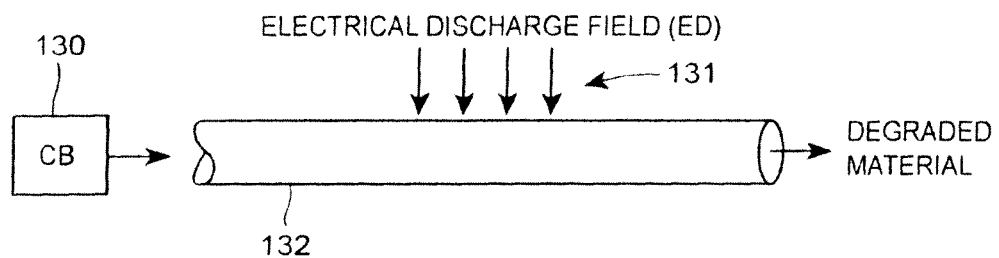
FIG. 4A1
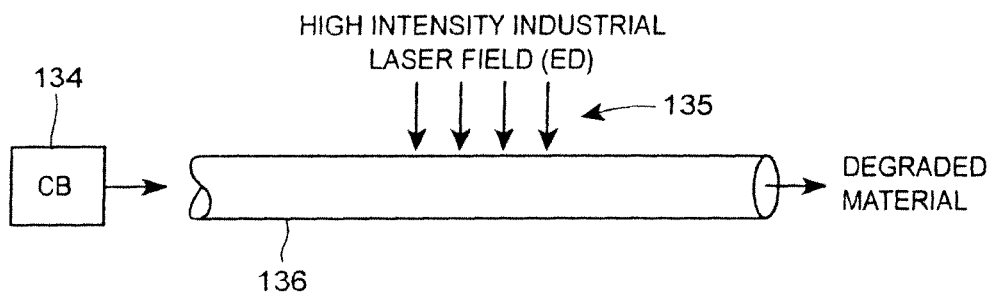
FIG. 4B1
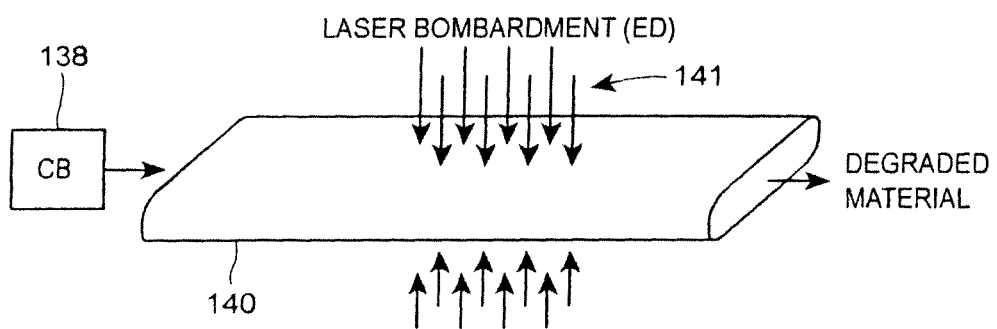
FIG. 4C1

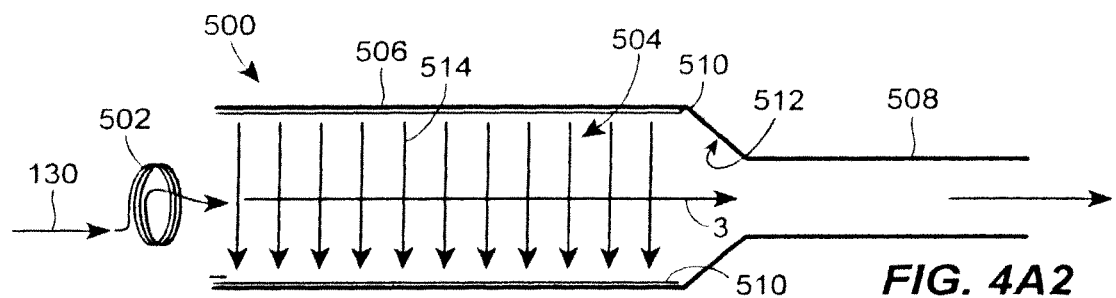
FIG. 4A2
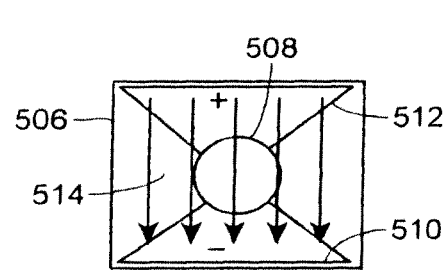
FIG. 4A3
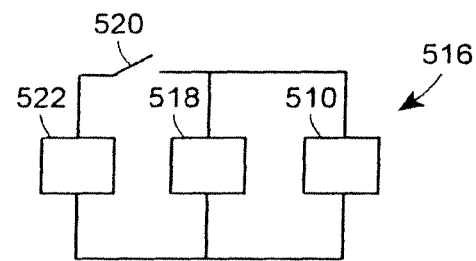
FIG. 4A4
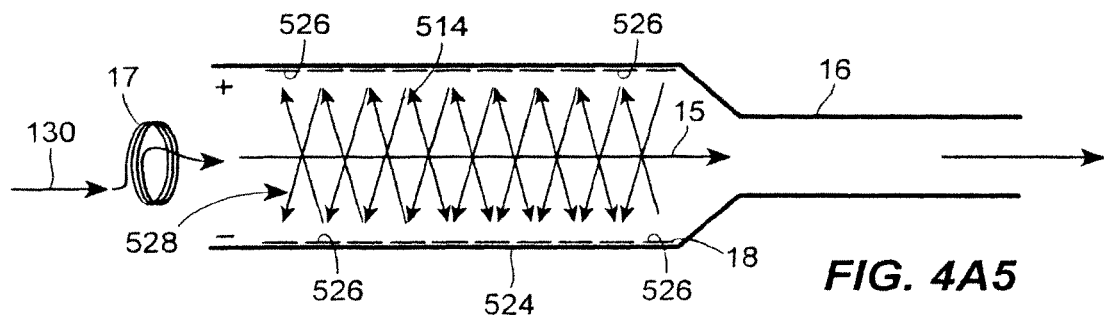
FIG. 4A5

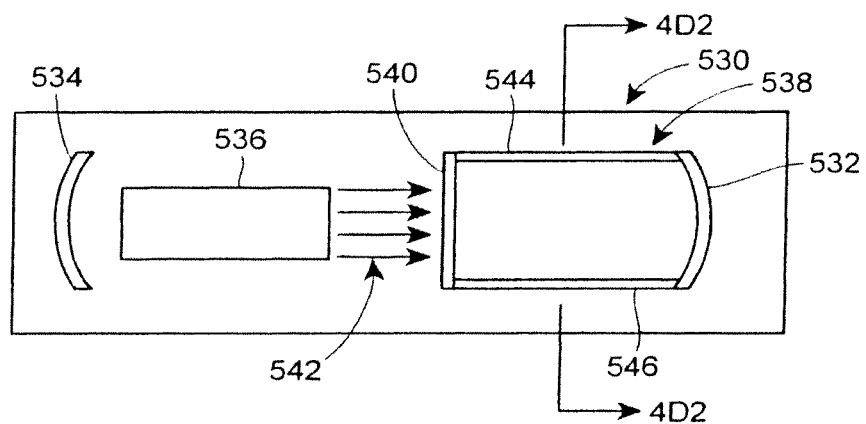
FIG. 4D1
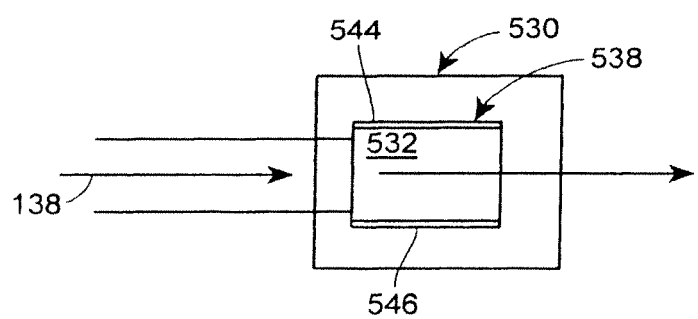
FIG. 4D2

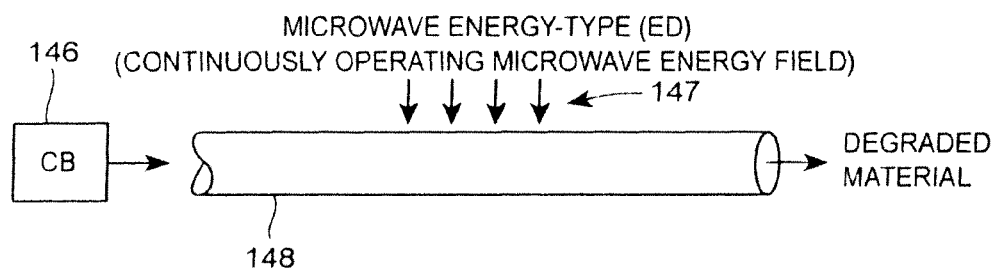
FIG. 4E1
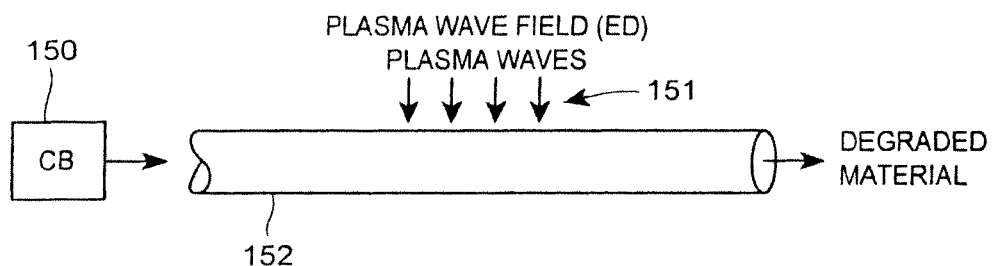
FIG. 4F1
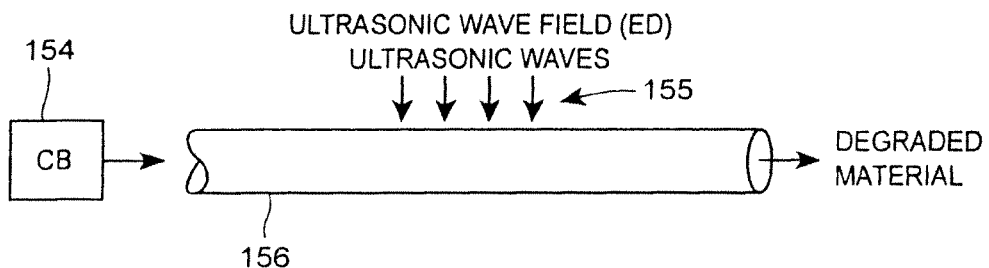
FIG. 4G1

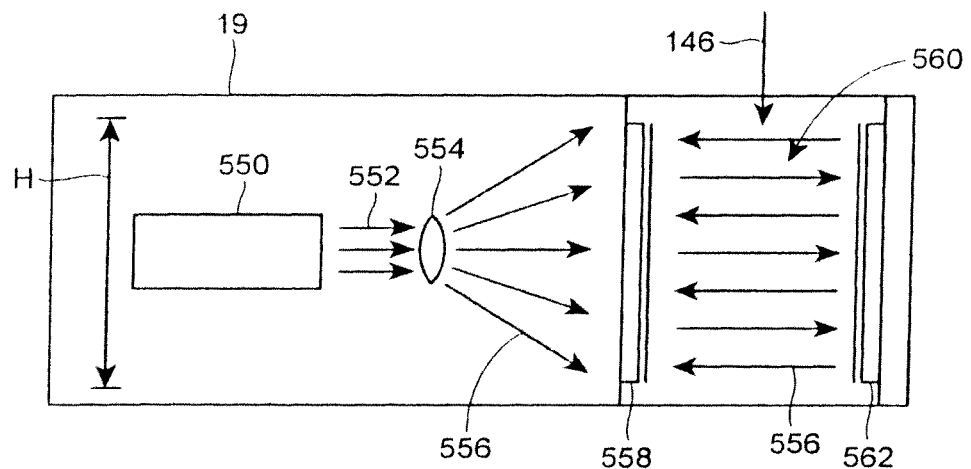
FIG. 4E2
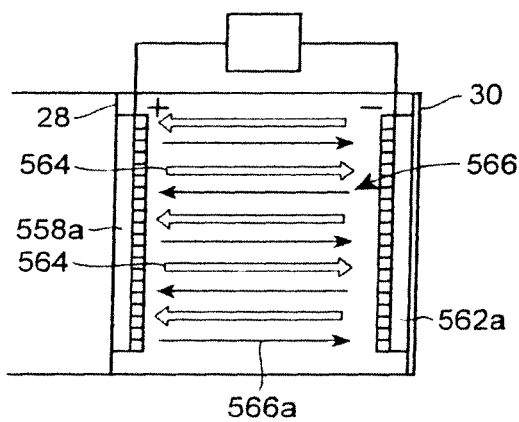
FIG. 4E3

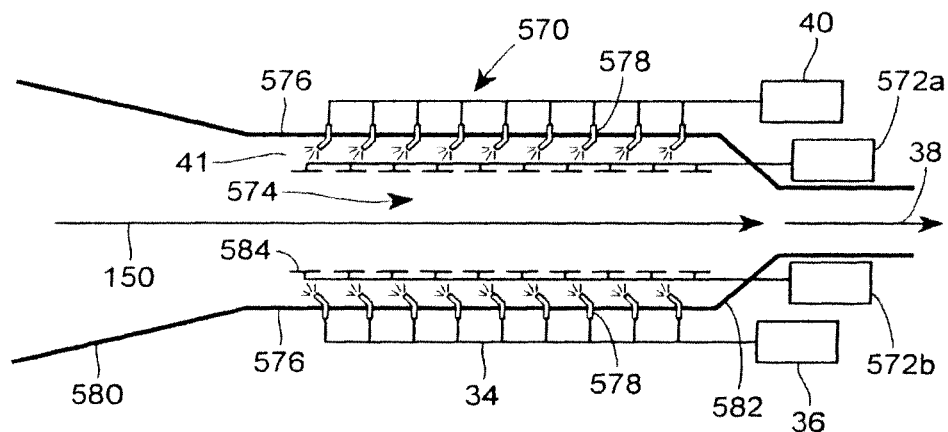
FIG. 4F2
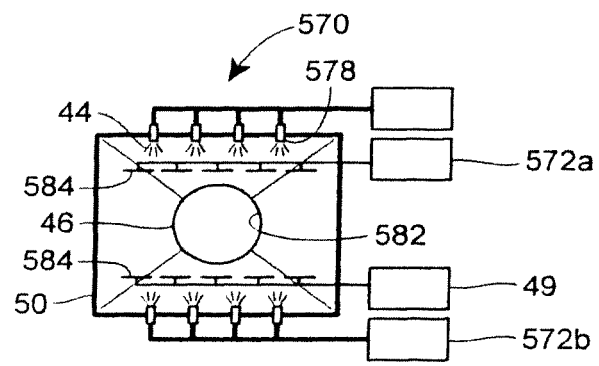
FIG. 4F3

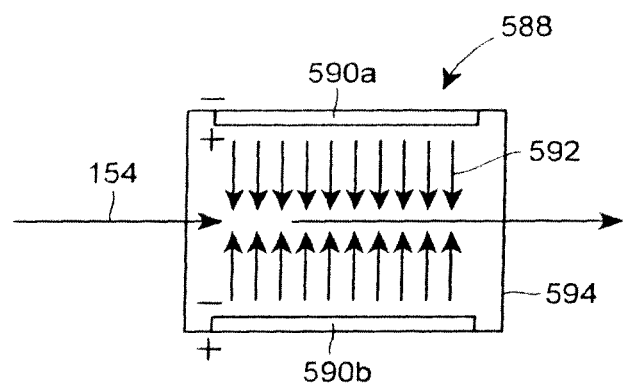
FIG. 4G2
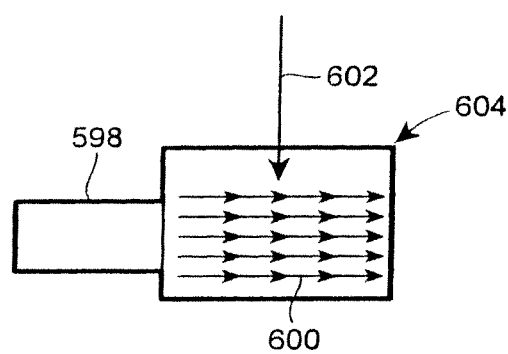
FIG. 4H

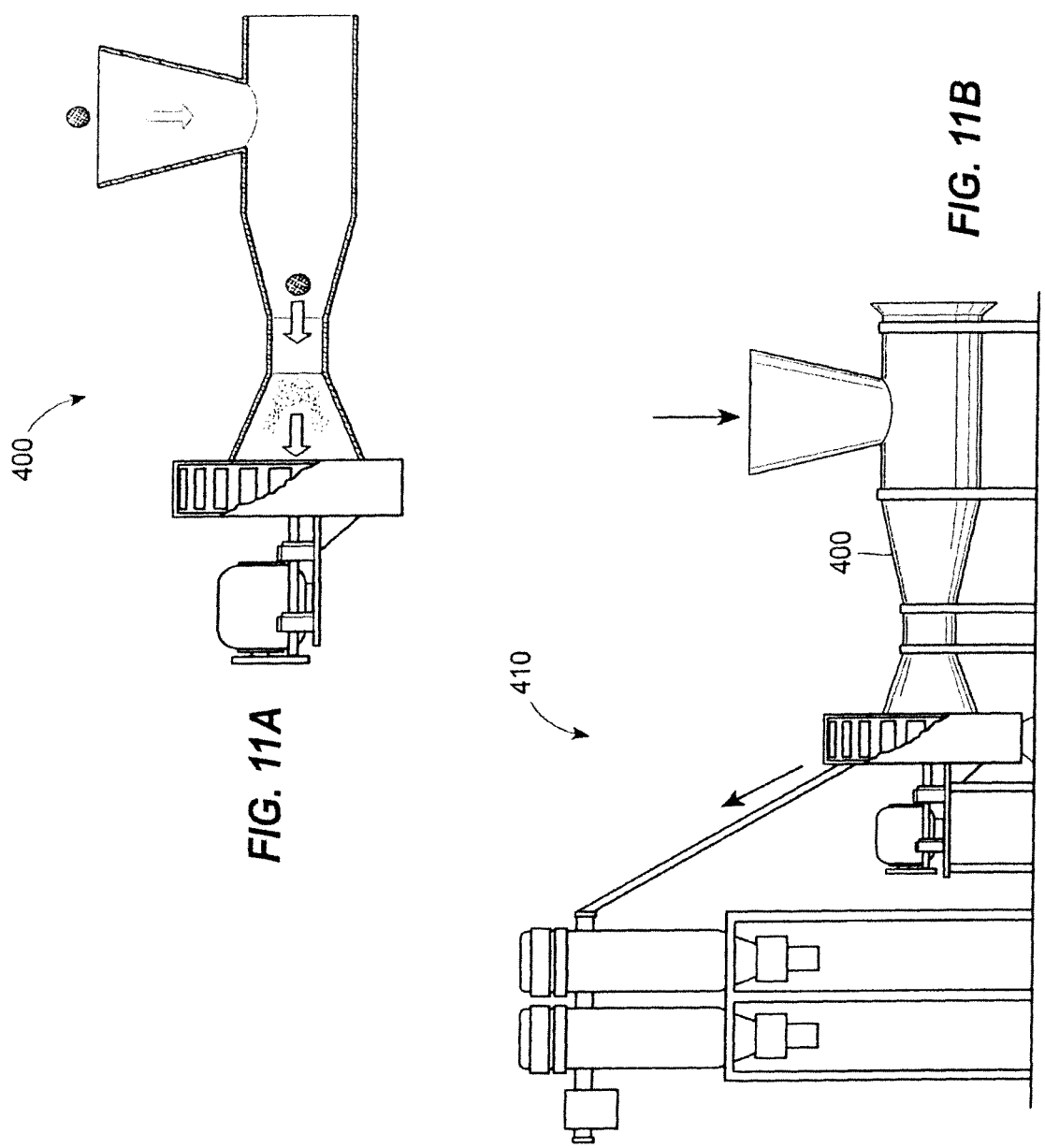

SYSTEM AND METHOD OF PREPARING PRE-TREATED BIOREFINERY FEEDSTOCK FROM RAW AND RECYCLED WASTE CELLULOSIC BIOMASS

CROSS-REFERENCE TO RELATED APPLICATIONS

The present application claims the benefit of priority benefit of the International Patent Application No. PCT/US2008/071806, filed Jul. 31, 2008, which application claims priority of U.S. provisional application No. 60/952,992, filed Jul. 31, 2007. The entire contents of the priority application is expressly incorporated herein by reference in its entirety.

FIELD OF THE DISCLOSURE

This disclosure relates to a system and method of creating a pre-treated feedstock for use in biorefineries, such as for making cellulosic-type ethanol, biobutanol, so-called biocrude, other biofuels, and other bio-byproducts, and particularly to a pre-treated biorefinery feedstock, that can be provided in powdered or pelletized form, as created from blends of various incoming types of raw cellulosic biomass and recycled cellulosic-containing waste stream materials.

BACKGROUND OF THE DISCLOSURE

Due to an increased demand for alternative fuel sources, substantial corn and grain production, previously used for food and livestock feed, now ends up in ethanol conversion. There are also competing demands for biomass resources from the standpoints of food, fuel, fiber, feed and power. These trends, coupled with the need to create a sustainable environment, drives an ever-increasing push to create transportation fuel and other bio-byproducts from various cellulosic biomass ("CB") source materials. Two of the more significant problems still to be overcome before achieving large scale production of such CB biomass biofuels, such as biobutanol, biocrude, and cellulosic ethanol, include, first, cost-effective collection, densification, and transportation of the sheer quantities and bulk of the needed CB source materials to a biorefinery, and second, breaking down (i.e., disrupting for further treatment) the tough, so-called ligno-cellulosic bonds ("LC bonds") found within plant cell wall structures. That is, a pretreatment of the CB source material is needed to make the same more susceptible to subsequent process steps in biorefinery conversion ("bio-conversion") operations. For example, unlike grain kernel ethanol production processes (i.e., starch-to-sugar), hydrolysis-type CB ethanol production includes complex pre-treatment and pre-processing steps as needed to liberate the internal sugars that are locked up by the LC bonds within CB source materials. It is understood that there are a complex variety of chemical bonds, covalent and hydrogen bonds, as well as the protective layering of lignin, both of which operate both at the macro and micro scales in lignocellulose. In view of that complexity, the term "LC bonds" as used herein is shorthand for that complex multiplicity of barriers to bio-conversion of LC biomass sugars into useful products.

CB materials contain cellulose, hemi-cellulose, lignin, and minor amounts of extractives. Within a plant's cell wall, the cellulose and hemi-cellulose are contained in bundle-like micro structures, including so-called microfibrils and micro-tubes, with the lignin acting like a superstructure binding those bundles together, e.g., creating the tough-to-separate LC bonds. Thus, pre-treatment of CB source materials is needed to separate the carbohydrate fractions and to break down the bundles, e.g., to alter the cell wall's cellular and molecular structure, to obtain access to the included sugars. Anything that can be done to expedite the bio-conversion, e.g., hydrolysis, of the cellulosic structure into its component parts will, in turn, accelerate the day by which economical CB ethanol production, for example, on a widespread commercial basis, becomes a reality.

Significant efforts and government research grant monies are being directed to creating more efficient methods of turning raw and recycled cellulosic biomass into transportation fuel. The eventual CB biofuel (e.g., ethanol) and bio-byproduct production facility, also sometimes called a "biorefinery", will use CB feedstocks that are agricultural crop residue-based, forest-based, industrial process waste-based, food processing waste-based, energy crop-based, organic waste-based and recycle waste-based, among yet even other CB sources like aquaculture. However, in the currently unfolding development of a cellulosic biomass infrastructure, and particularly between the locations where various different types and sources of cellulosic biomass are grown (or created, collected or recycled) on the one hand, and the actual biorefineries themselves, where such CB source materials will be fractionated and refined, on the other hand, there remains a significant gap to achieve a uniform cost-efficient operation. That gap is due, at least in part, to the great logistical challenge in cost-effectively and quickly getting CB source materials collected, densified and transported between the edge of the farm field, forest, primary processing facility, landfill, or waste recycling operation, and over to the front gate of the biorefinery in a usable form, and in the huge daily quantities that will be required. For example, collection and road-siding by farmers of field-grown raw CB materials is currently costly, and labor and energy intensive. Thus, new types of farming equipment, or at least new attachments and modifications to existing farm equipment, e.g., to harvesters, combines, and forage equipment, will be needed for farmers to not only harvest the grain kernels, e.g., corn and wheat, but also to harvest some portion of the rest of the plant, e.g., corn stover and cereal straw, and to preferably do so all with a single pass through the field.

Numerous different sources of raw and recycled CB materials may be available in a given locale that are likely to be useful at a biorefinery, and which may vary by locale across the country. As used herein, the term "raw" CB materials may also be known as "rural" or "crude" CB materials. For example, some principal crop residue-based candidates for raw CB source material include corn stover (every non-edible part of the corn plant, thus excepting the kernel), cereal straws (wheat, oats, rice, rye, barley, and clover hay), and even grain sorghum and milo stubble. Other crop-residue and agricultural processing waste materials in given locales could include sugarcane bagasse, citrus residues (peel, pulp, seeds, and cull fruit), olive pits, rice hulls, peanut shells, cotton stalks, cotton gin trash, corn fiber, soy fiber, palm processing waste, and similar food processing and organic wastes. However, many of such raw CB crop residue (and most crop processing-waste) sources, preferably in field-dried form, will generally be available in abundance only at certain times of the year, e.g., corn stover and cereal straw at fall harvest time. Also, if either the corn stover or cereal straw is chopped, bulk baled or bulk haystacked and then field-stored, or instead, if it is chopped and then ensiled, e.g., with both type storages intended then for later contract delivery to the pre-processing site, such stored CB materials may then only be available at higher moisture contents, albeit for longer parts of the year. Alternately, such field- or silo-stored raw CB materials may, suffer from "weather" decay, mildew and loss, or have excess initial moisture content, thus having reduced sugar content or requiring excessive drying (and in either case perhaps causing a financial "dock" in price levied against the grower-producer).

Separately, if finally grown in abundance, certain other raw CB source materials might be available fora larger period, and at several times per year. These could include such raw CB materials as the so-called "energy" perennial or prairie grass crops that are to be grown for their energy value, e.g., switchgrass, Indian grass, Reed Canary grass, Big Blue-stem grass, giant Miscanthus (also known as elephant grass), Arundo (also known as E-Grass or Energy cane), prairie cordgrass, giant sorghum varieties, or even a high-diversity mixture (i.e., a "polyculture") of many different native prairie perennial grass species (so as to achieve higher productivity). For example, there are expected to be some one to three annual cuttings of switchgrass, and then Miscanthus is expected to have even twice the tonnage per acre yield as switchgrass, once those type energy grass crops finally begin to be grown in sufficient quantities in the U.S. and elsewhere. It could also include cuttings, e.g., highway right-of-way cuttings, of fast-growing weeds.

Then, in many locales, particularly near cities, or instead near forest or orchard lands of any size, there are other generally regular supplies of more wood-based raw CB source materials. These may well have the advantage of being free, or at least quite low cost. These wood-based CB sources could result, for example, from government program (softwood) forest thinnings (e.g., for fire safety control; for "pine beetle kill" removal in Colorado), wood chips, orchard prunings, city arbor trimmings, forest floor debris removal, forest "slash" collection (e.g., tree branches, tree tops, and stumps left after logging operations), roadside brush clearings, and urban yard waste (e.g., grass clippings, leaves, small branches). For example, so-called "bundled" forest slash (see the John Deere "Timberjack" slash bundler apparatus) or the grindings and chips from the same can be processed. Also, most industrial wood processing facilities generate large ongoing, and many relatively dry, potential supplies of CB source materials, e.g., in the form of sawdust, lumber mill waste, paper mill waste, planar shavings, end cuts, slabs, pulp mill sludge, and wood chips. Yet another fairly regular supply of wood CB source material is urban wood waste, whether collected from landfills or otherwise, such as wood construction debris, wood consumer durables, wood demolition debris (depending on the contaminatin fraction), ground used wood pallets (nails fragments in all preferably having been first magnet-removed), and other similar wood wastes. Further, there is the possibility of so-called "energy tree" plantations, i.e., an energy crop of short-rotation trees that, like the "energy grasses", could be planted, cultivated, harvested, and supplied for their energy value as a biorefinery feedstock material. Such fast-growing energy trees could include, for example, hybrid poplars, willow, poplar coppice, eucalyptus, silver maple, sweetgum, sycamore, cottonwood (e.g., black cottonwood), and alder. Even certain herbaceous (woody) plants are considered suitable candidates as CB source material, e.g., kenaf, industrial hemp, and chaparral (the branched dwarf shrubs that grow wild in abundance in various arid locations, e.g., parts of California).

Further yet, one very good (and also normally low cost) potential source of CB material is the separated recyclable cellulosic portion of the daily municipal waste stream ("MWS"). It has a very high cellulose-containing content, e.g., paper, newsprint, paperboard, cardboard, packaging materials, recycled mixed paper waste, cellulose-fiber food containers, food and grease laden so-called "contaminated" paper, shredded "security" waste (copier paper, file folders), and such. All such recycled and separated high-content cellulose containing CB source materials are highly desirable. This is because they already are partially delignified, i.e., their LC bonds have previously undergone some type of substantial mechanical and chemical pre-treatment process when first being made, and importantly, a majority of their lignin fraction has been removed. Yet another low cost (or even negative cost) potential source of CB material is the organic waste portion of the daily MWS.

Then, at the other end of the spectrum, the CB biorefineries themselves, so as to best operate continuously and efficiently, will need an incoming CB feedstock that is generally uniform, of consistent high energy value, in dependable supply, available all year long, in a densified form (preferably in a "flowable" densified form, so it can be easily transported to the biorefinery and then handled with customary high speed material handling equipment), of a generally consistent moisture content, and most importantly, readily obtainable at a consistently low cost. Further, due to the significant pre-treatment required for CB feedstock for most bio-conversion processes, and to help accelerate its rapid and cost-effective conversion at the biorefinery, it would be helpful if the incoming CB feedstock had at least some form of pre-treatment already in place. That is, it would greatly enhance the subsequent bio-conversion if some form of pre-treatment (physical, chemical, enzymatic, microbial, or other) was already started, and completed, or at least substantially so. Further yet, it would be helpful if, to allow the eventual switchover to economical use of CB feedstocks, any existing grain-based ethanol plant would need only minimal front-end process or equipment modifications, e.g., allowing the easiest and least costly conversion from grain to CB ethanol production. It might even become desirable if certain existing ethanol and other biofuel plants could simultaneously handle both grain and CB-type feedstocks, or switch between them when needed. Thus, if achievable, the presence within the incoming CB feedstock of some significant physical disruption of the CB material's LC bonds, plus some type of chemical, enzymatic, microbial, or other pre-treatment, could create significant cost and time savings for the biorefinery, whether the same was making ethanol, biobutanol, biocrude, or some other form of biofuel.

It is anticipated that the delivered cost per ton of CB feedstock to a biorefinery will be very critical to the overall switchover, and thus economic success, from grain-based to CB feedstock-based ethanol production. It is expected that most CB feedstock ethanol plants, unless fortunate enough to be located near a dedicated single type of CB source material, and particularly one that is of consistent low-cost abundant supply, will actually operate on a diverse mixture of CB feedstocks. This will allow the CB feedstock ethanol and other biofuel plants to best adjust to diverse market factors affecting cost and supply of CB source materials.

More specifically, various different factors are expected to affect the price, desirability and availability of raw and recycled CB source materials. These may include such things as energy density, lignin content, ash content, variations in hemicellulose, consistency of supply (e.g., seasonality), amount of needle or bark content, quality (e.g., freedom from contaminants, incoming reduced size), collection costs (e.g., already collected at single locations, wet field vs. dry field collection, need for additional size reduction prior to pre-treatment), transportation costs (e.g., length of average "origination" distance), local waste "tipping" fees, market price fluctuations, competing uses (e.g., as livestock feed, soil amendments, mulch, pulverized insulation, burner fuel), moisture content (e.g., any need and cost to dry incoming CB materials to remove excess water content), "available sugar" content, age and condition of CB source material, amount of "loss" portion (e.g., decayed fraction), local crop growing habits, good vs. poor crop yield years, among numerous others. But these diverse needs greatly complicate creation of a uniform system for preparing a CB feedstock product.

To be uniformly acceptable, any CB feedstock product must be capable of being prepared for effective use by each of the different known (and future) types of CB-to-biofuel and bio-byproduct conversion processes, and particularly, by each of the different types of CB pre-treatment processes. For example, when making CB fuel ethanol, such pre-treatments commonly include so-called dilute acid (at high temperature), dilute alkali, concentrated acid (at low temperature), steam explosion, ammonia explosion, enzymatic hydrolysis, microbial hydrolysis, organic solvent (so-called "Organosolv" or "clean fractionization"), and ionic liquid solvent. Besides the "hydrolysis" type ethanol processes, there are also the separate "thermal conversion" type processes, e.g., pyrolysis, gasification, and "plasma arc" gasification, among others. Yet other known pre-treatment processes are used in making fuel biobutanol and biocrude. But such diverse bio-conversion processes also complicate creation of a uniform system for the preparation of a CB feedstock product.

Thus, there remains a need, which grows more important each day, for a standardized system of pre-processing and pre-treating various different types of incoming raw CB source material, and of recycled cellulosic-containing waste source material, as close to the CB source materials as able, to then create a uniform, generally consistent, high-energy content, flowable form of CB feedstock for use in biorefineries, for both biofuel conversion, and for preparing other biorefinery byproducts. There is also a need to quickly and inexpensively, but significantly, disrupt and alter to the greatest extent able, the LC bonds within the cellular and molecular structure of the CB materials, regardless what type and final reduced size of CB feedstock is being used. There is a need for a CB material pre-treatment that creates the maximum amount of internal surface area and pores that can be exposed, to thereby render the CB material more efficiently and easily converted, in subsequent biorefinery processing steps. Notwithstanding that each different type of CB source material has unique characteristics, physical differences, lignocellulosic make-up, and pre-processing needs, there remains a need to create a uniform, homogenous, consistent, preferably pelletized, form of CB feedstock material as formed from two or more different CB source types. There is also a need for a CB material pre-treatment and processing system that, while standardized, still has sufficient built-in flexibility to handle numerous different types, characteristics, sizes and conditions of incoming raw and waste-type CB source materials, and also to accommodate the various different bio-conversion processes to follow.

SUMMARY OF THE DISCLOSURE

The present disclosure provides a unique standardized system and method, regardless of the type and source of incoming raw or recycled cellulosic biomass, to create a homogenous, uniform, densified, pre-treated, pre-processed, preferably pelletized CB feedstock product, and one that is flowable, of a generally consistent high energy value, and also generally consistent lignocellulosic makeup and moisture content, throughout the year. In one aspect, it permits transforming and blending different sources of raw CB materials and recycled cellulosic-containing waste stream materials into a flowable powder, or pellet, as desired, of CB feedstock. The pre-treated CB feedstock has as much of the tough internal LC bonds physically broken down and destructed (via mechanical, explosive, and electrical forces) as possible. This in turn breaks up many of the lignocellulosic micro structures, and creates more surface areas, pores and reactive sites, e.g., footholds, for further reactions to occur (e.g., by any one or more of dilute acids, alkaline solutions, enzymes, microbial agents, and organic and ionic liquid solvents).

In another aspect of the present disclosure, the resultant CB feedstock also includes an ongoing active chemical pretreatment of the tough LC bonds through the additional use of a suitable dilute acid (or dilute alkaline solution or organic solvent or ionic liquid solvent). The included dilute acid (or alkaline or solvent) remains working and thus active, during the CB feedstock pellet's lifetime, i.e., before its ultimate biorefinery use, to thereby continue to break down the LC bonds. The present system and method of severe physical (mechanical, explosive and electrical) degradation of the LC bonds, plus the additional chemical pre-treatment step, as desired, acts to render the resulting CB feedstock (whether in fine powder form, or formed into a pellet, dependent on the needs of a given biorefinery) ready to be efficiently and cost-effectively processed into CB fuel (e.g., ethanol and biobutanol), biocrude, and into related bio-byproducts. Alternate embodiments include incorporating ongoing enzymatic and/or microbial agent pre-treatment regimens.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

It is anticipated that a CB "pre-processing site", as contemplated hereunder, will need to process significant amounts of dry tons of incoming CB source materials on a daily basis. For example, simply to support one medium-sized biorefinery, i.e., operating some 335 days/year and that produces in the range of approximately 50-70 million gallons per year of CB ethanol fuel, it is anticipated that biorefinery will require in the range of approximately 1000-1700 dry tons of CB feedstock each day, as pre-treated hereunder. This in turn will require that the present process and method operate at very high hourly process throughput rates, e.g., in the range of approximately 50 to 70 tons per hour, or even higher. Thus, because the contemplated pre-processing site will need to operate at such high production rates, it may well need to have adequate temporary storage facilities, e.g., silos and/or bins for both receiving incoming raw and recycled waste CB source materials, as well as for temporary storage of final pre-treated powdered (or pelletized) CB feedstock product. Also, multiple processing lines formed in accordance with the present system may well need to operate in parallel, simply to meet such daily high volume throughput processing needs.

The present method's pre-processing and pre-treating steps, again as all performed at relatively high process throughput speeds, include: Receiving in pre-size reduced CB source material; or alternatively, receiving and quickly breaking-down, as needed, any large round, square, rectangular, or otherwise shaped bales, blocks, or haystacks of raw or waste CB source material, or chipping or grinding any oversize (e.g., "woody") materials; magnetic screening of the CB source material, to remove any unwanted metal debris; initial mesh sorting or other screening to remove large-fraction CB source material to assure the needed reduced size "starter" CB material for later process steps, and to also remove any large fraction non-CB materials; roller pressing (or other de-watering, if even needed) of the CB source material to eliminate any initial extra high moisture content that is present; coarse-grinding or chopping (of full plant length material if not otherwise already pre-ground or pre-chopped by the CB producer or recycling source to a suitable "starter" size) to reduce the CB material to a sufficiently small size, and any re-chopping (as needed) of any removed large fraction CB materials; explosively drying and pulverizing the small fraction CB material into fine particulate material, to thereby produce a lignocellulosic powder "fluff" material, in which many of the LC bonds are now destructed and altered; effecting any repeated explosive drying and pulverizing of the CB fluff material as needed, depending on the internal structural make-up of the incoming CB source materials, and also of any remaining large fraction material separated out, to yet further degrade the tough internal LC bonds; classifying or otherwise separating out any remaining non-CB debris materials, and also any unwanted bark and/or needle fraction (as needed); subjecting the resultant high quality CB fluff to a high-intensity electrical degrading force, thereby to yet further alter and destruct the LC bonds, and help further expose as much of the micro structure surface areas and pores, and reduce the lignin's interference, with subsequent processing, as able; then, if desired and dependent upon a given biorefinery's needs, the internal make-up of the CB source material, and the various types of CB source materials present, co-mixing any two or more separate types of raw CB fluff, including (as needed) one or more different types of recycled cellulosic-containing CB materials, to create, in effect, a pre-selected uniform blend of degraded lignocellulosic fiber material; incorporating (by spraying, mixing or otherwise) one or more dilute acids (and/or dilute alkaline solutions, organic or ionic liquid solvents, hydrolytic enzymes and microbial agents) into the CB blend to create a pre-treated CB fluff mass; if needed, blending in a suitable binder material to create a further compressible mass; if not then used (or temporarily stored) as a CB fluff feedstock product, forming the compressible mass into CB feedstock pellets of consistent size and high energy value; if desired, coating the CB pellets with a suitable coating material (that is unaffected by any dilute acid (or alkaline solution or solvent) present, but which coating, during later biorefinery processing, will readily break down at elevated temperatures); thereby to create a CB feedstock pellet (or powder fluff, if pelletizing is not needed for a given biorefinery's use) having an ongoing slow, but active, pre-treatment regimen, at ambient temperature and pressure, contained inside, thereby continuing to further break down the LC bonds, over the pellet's (or fluff's) lifetime up through eventual use at the biorefinery.

In another aspect, the present disclosure concerns a method of selectively adjusting the amounts and types of different streams of incoming raw and recycled waste CB source material, to create a generally consistent high energy content CB feedstock fluff or pellet and of uniform moisture content, but which nevertheless, through real-time chemical, moisture and/or conductivity analysis of the CB materials being processed, permits in-process blending adjustments, e.g., to accommodate market price fluctuations, seasonality, availability, internal make-up, moisture and energy content differences, quality, and the like, of the incoming CB source materials, and also to accommodate, i.e., match, the following bio-conversion process.

Yet another aspect of the present method and system allows custom blending of two or more relatively inexpensive raw CB materials, as available in a given locale, and which may well vary from locale to locale, to create a uniform low cost biorefinery feedstock. It further allows at least a portion (or even all) of the CB material within the CB feedstock (fluff or pellet) to be formed from locally available inexpensive recycled cellulosic-containing waste materials. The latter permits advantageous use of the preprocessing and lignin removal that has already occurred within at least that "recycled CB waste" portion of the CB feedstock's cellulosic makeup. The present disclosure thus utilizes, to whatever extent available, already "pre-converted" cellulosic materials, which will then require less processing later, thereby increasing CB bio-conversion yields and efficiencies, and at lower cost, for the biorefinery.

As used herein, the size and length of the various disclosed types of CB materials are used interchangeably, and the terms represent the maximum linear dimension of an irregularly shaped object (e.g., a single piece/particle of corn stover, a wood fragment, or other CB material). Further, when a particular CB material is described as having a size within a given range, at least some of the CB material particles are within the given range. Preferably, a majority (e.g., at least about 50 wt. %, for example at least about 90 wt %) of the CB material particles are within the given range and, more preferably, the weight average size of the CB material particle distribution is within the given range.

BRIEF DESCRIPTION OF THE DRAWINGS

FIG. 2 is a combination block/flow diagram of one embodiment of the system and method according to the present disclosure specific to processing a primary stream of cellulosic biomass;

FIGS. 4A-4H illustrate various embodiments of electrical degrading (ED) devices for use in the system and method of the present disclosure;

FIGS. 11A and 11B illustrate yet another embodiment of an EDP device for use with the system and method of the present disclosure.

Figure 1:
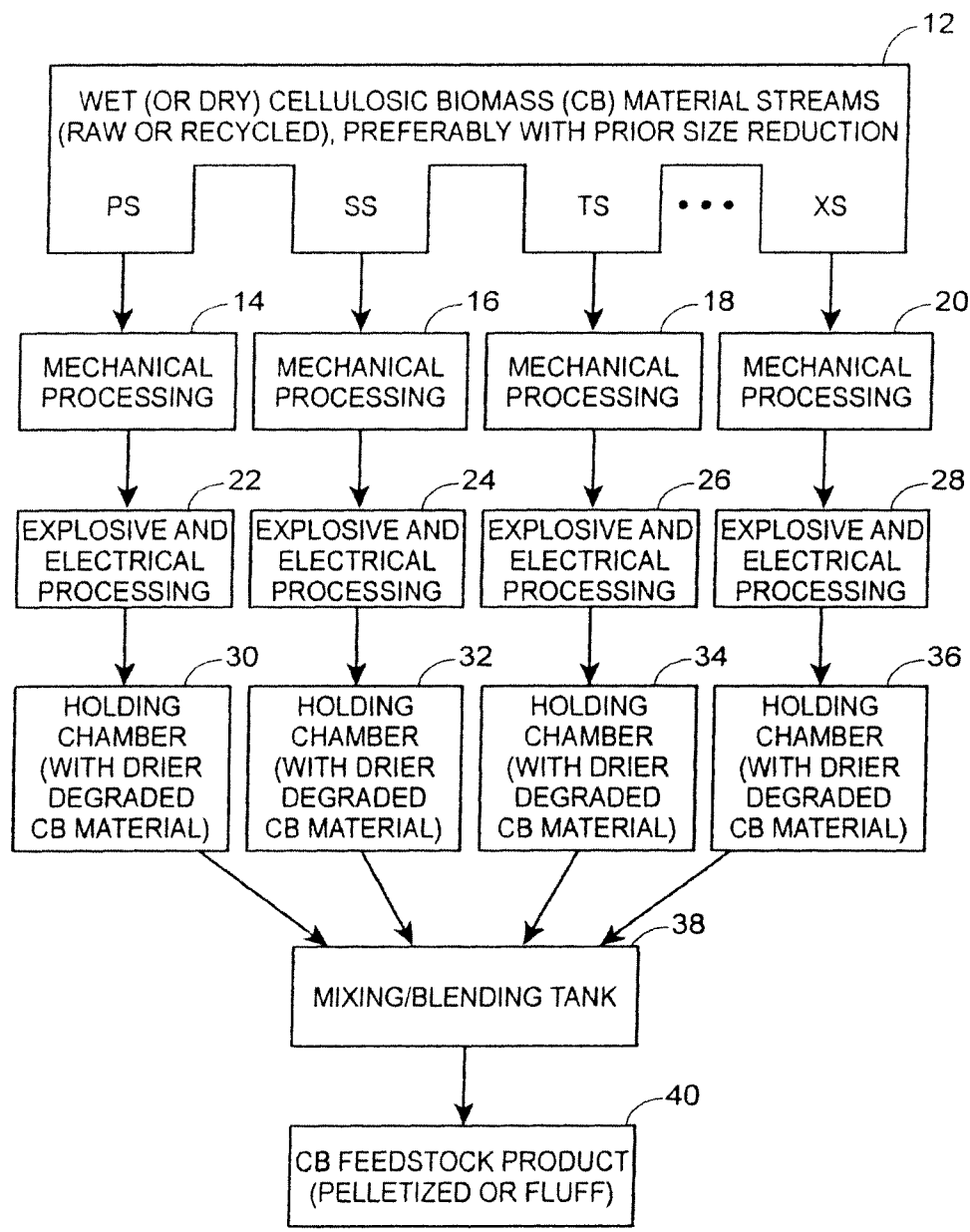
FIG. 1 is a combination block/flow diagram illustrating one system and method in accordance with the present disclosure.
Figure 1A:
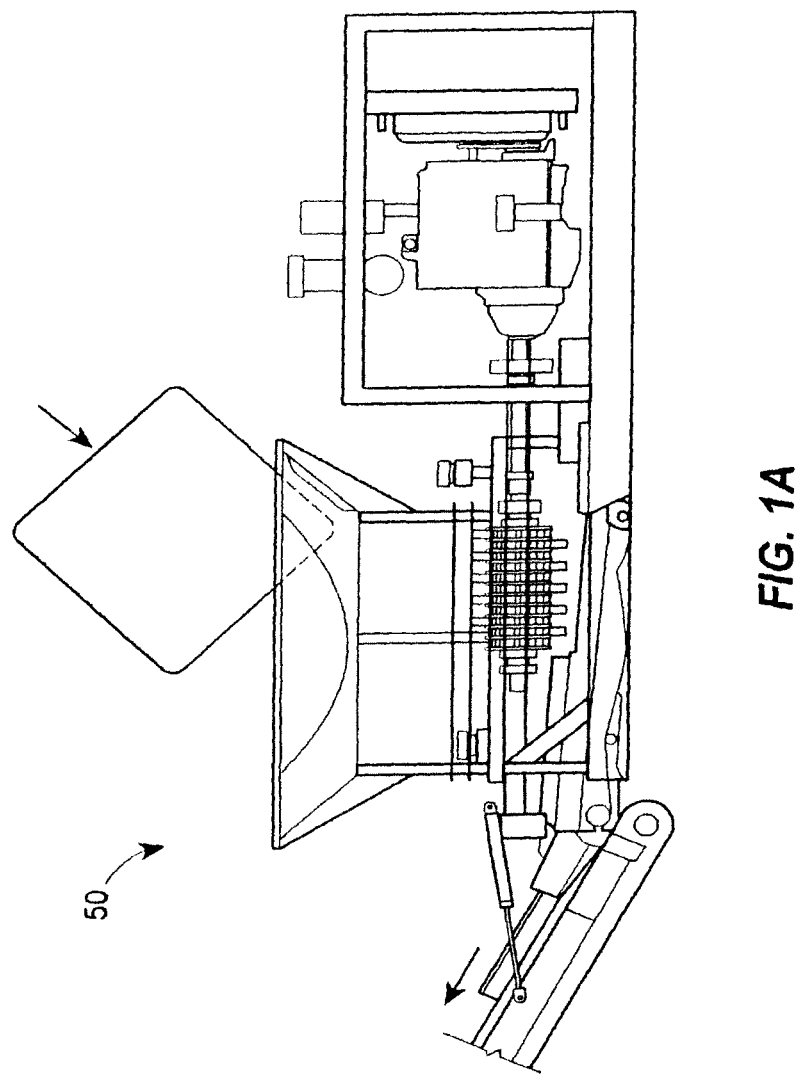
FIG. 1A is one embodiment of a tub grinder for use with the system and method of the present disclosure.

DETAILED DESCRIPTION OF THE DISCLOSURE a) Initial Size Reduction and Screening There is generally shown in FIG. 1 a flow diagram of one disclosed example of the present system and method for pre-treating CB source materials and for forming a biorefinery feedstock pellet therefrom. It comprises a pre-treating system 10 for creating a biorefinery feedstock pellet P from a plurality of different incoming streams of CB source material. Such CB material streams may include a raw CB primary stream (denoted by "PS"), that is locally available and cultivated by CB producers, e.g., farmers, in large quantity, and mostly on a seasonal basis. Such PS source materials, however, may normally only be available in field-dried form (e.g., generally of an average moisture content of approximately 35%) during annual crop harvesting time. Alternatively, they could be generally available throughout the year, such as by contracting for staggered deliveries with various CB producers, but then likely received in at higher moisture contents. The PS-type CB source materials could arrive in large bulk bales (e.g., rectangular or round), cubes, blocks, or haystacks. In this case, the CB source materials are quickly broken down and initially size-reduced, for example in a commercial tub hay grinder (illustrated as the tub grinder 50 in FIG. 1A), such as one made by Haybuster™, or one made by Vermeer™ (see U.S. Pat. No. 5,950,542, the teachings of which are incorporated herein by reference). Preferably, however, the CB materials will arrive size-reduced to at least be in an already large "field pre-chopped" form, such as pieces of corn stover in a range of approximately 4" to 8" in length. Alternatively, if the CB source materials are producer-processed by a "single pass" harvester, or by a "second pass" forage harvester, for example, the "field pre-chopped" size of incoming CB materials could advantageously be smaller, and in a range of approximately ½" to 3", and preferably even down to a range of approximately ½" to 1½" in size. Common examples of such PS-type CB source materials in large quantities include corn stover, and cereal straws (such as the plant stems from wheat, oats, barley, rye, alfalfa, and Triticale straw). Such pieces of PS-type CB materials could, however, also arrive in substantially whole plant lengths, e.g., averaging in a range of approximately 2 feet to 4 feet or even more in length, and therefore first are size-reduced in the tub grinder 50. Currently, due to its great abundance, the most likely initial candidate for such a PS CB material stream will be corn stover (albeit limited to whatever extent farmers ultimately decide to part with it, given their soil amendment and soil erosion needs therefore).

Additionally, as depicted in FIG. 1, there can be a local secondary CB source material stream (denoted by "SS"), perhaps comprising locally available and cultivated so-called "energy" type CB material. This can include the so-called "energy crops", once the same become commonly grown in abundance and more regularly available in a given locale. These energy crops might include, for example, energy grasses such as giant Miscanthus and switch grass, or they might include fast growing energy tree crops such as hybrid poplars and willows. They might even include such herbaceous woody plants as kenaf and industrial hemp. In any event, such an SS stream can thus provide raw CB source material that is generally available, to a lesser or greater extent, on an annual basis, or at least available over a larger part of the year relative to the PS materials. Also, such SS source materials are preferably pre-chopped, then large-baled (or blocked or haystacked), and then stored (e.g., roadsided) by the grower producer for later timed-contract delivery to the CB middleman or "CB pre-processor". However, instead of the preferred smaller "pre-chop" pieces, such large bales of SS type CB energy materials could instead include full length plant materials, thus also first needing size-reduced in the tub grinder 50. (As contemplated hereunder, a middleman-type "pre-processing" operator will perform most of the steps of the system of the present disclosure and be, in effect, a distributed pre-treatment processor for CB materials. Such an operator is likely to be situated somewhere between the edge of, for example, the production field, or recycling site, and the front gate of the biorefinery. That operator will preferably be located as close to the CB source materials as able, but in other cases may be adjacent, co-located, or integral with a biorefinery. Also, various components and steps of the present system and method may even be separated from other components and steps, i.e., located in two or more locations and/or undertaken at different times.)

Alternatively, rather than comprising an "energy" type crop, the SS CB source material might comprise a different but still readily available locally-produced raw CB stream, e.g., woodchips, orchard prunings, city arbor trimmings, program forestry thinnings, leaves, grass clippings and other urban yard waste, and such. Still further, such an alternate SS CB source material stream might comprise various wood waste type materials, such as ground wood pallets, wood construction and demolition debris (so-called "C & D wood waste"), sawdust, wood pulp, wood shavings, and similar wood waste. Any such "woody" SS-type CB materials will normally be received in smaller pre-chopped pieces, e.g., in a range from approximately ½" to 8" or even larger, in size. In any event, whatever type CB material actually makes up the SS stream, it will preferably be received in a suitable pre-chop size, both complementing and supplementing the PS stream, or perhaps in some cases, such as for part of every year, even replacing the same. If not of such smaller pre-chop size, then the SS CB source material may need to be initially processed in a heavy-duty industrial size wood grinder (such as one made by any of Continental Biomass Inc., Duratech Ind., or Vermeer Inc., for example).

Further, in some cases, and especially if available in sufficient year-round quantities, the present system can include a tertiary source of CB material (denoted by "TS" in FIG. 1). That TS stream might comprise such commonly available recycled cellulosic-containing wastes as baled newsprint, baled cardboard cartons, paper pulp waste, and the recycled cellulosic-containing portion of the local municipal waste stream (known generally as "MWS"), even including "contaminated" paper waste. The inclusion of such regularly available, separated, inexpensive, cellulosic-containing wastes, e.g., from local industrial, garbage and recycling efforts, will help create a relatively low cost CB feedstock product. Such TS CB material normally can be obtained for a negative cost, (or for free or a minimal cost), at least for such waste materials where there is no regular local market, and/or tipping fees are otherwise being charged locally to dump the same. It also takes advantage of cellulosic materials that have been previously pre-treated by some third party, in one form or another, e.g., where they have been chemically converted to the point where there are only minimal or no LC bonds remaining, and the lignin has been substantially removed.

It will be understood that even a fourth (or higher) separate incoming CB material stream can be utilized with the system of the present disclosure, if locally available and warranted. This is denoted as stream "XS" in FIG. 1. Examples of XS CB materials could be seasonal food-processing wastes, the organic waste fraction of the daily MWS, and year-round cellulose-containing industrial processing wastes.

Again, if not initially received by the pre-processor in its preferred size distribution, e.g., the preferred pre-chop size, each different potential incoming source of CB materials, e.g., the respective PS, SS, TS, and any other streams, are initially size-reduced to a usable "starter size" for the present process, as discussed above. Additionally, the materials are pre-screened to remove any bulk, non-CB material from the streams. For example, any large round or square bales or large machine-formed unbound haystacks of cereal straw or stover must have any plastic protective outer sheath liners, netting, covers, and/or strapping removed. Preferably, PS CB material such as cereal straw and corn stover has already been "pre-chopped" by the producer-grower at harvest, at a remote location, prior to delivery. In any event, a suitable initial size (for the present system) of such "pre-chopped" cereal straw, for example, as coming from such a bulk tub grinder device 50, would be in the range of approximately ½" to 3" in length, and preferably from approximately ½" to 1½" in length. Similarly, each individual "pre-chopped" piece of corn stover would be no larger than in a range of approximately ½" to 8", preferably of approximately ½" to 3", and more preferably of approximately ½" to 1½" in size.

Separately, and depending on the sizes of the large incoming fragments or chips, any delivered wood chips and other wood wastes (i.e., SS CB material), may first be run through an industrial wood shredder, chipper, or grinder 50 as illustrated in FIG. 1A, again to initially reduce them down to a suitable initial size for the present system. Such wood material can be received in pre-chopped pieces in a range of approximately ½" to 8", but it is preferably received (or coarse ground to be) in a range of approximately ½" to 2" in size, and more preferably, in a range of approximately ½" to 1½" in size. Further, all shredded or recycled newsprint, used cartons, "contaminated" paper waste, and similar recycled cellulosic-containing recycled waste materials from the TS type CB material stream if not already broken up and size-reduced, are pre-shredded, e.g., in a bulk tub grinder 50 in FIG. 1A. Alternatively, if already size-reduced as received, the TS CB material can be processed in a dry cellulose fiberizer, also known as a disk attrition mill, such as the fiberizer unit made by Reynolds Engineering and Equipment, Inc. (see the fiberizer 244 in FIGS. 6B and 6C, described later herein). Consequently, such TS-type cellulosic material is preferably reduced to the desired suitable initial size, i.e., preferably in the range from approximately ¼" to 1" in size, and more preferably of approximately ¼" to ½". With continued reference to FIG. 1, and as will be described in more detail below, each stream of CB material, i.e., the PS, SS, TS and XS streams, are run through respective explosive drying and pulverizing devices, and electrical degrading devices, collectively referenced by reference numbers 22, 24, 26, 28, after being size-reduced by the respective mechanical processing devices 14, 16, 18, 20. Then, the streams PS, SS, TS, XS are transferred into respective holding chambers 30, 32, 34, 36, to be selectively transferred to a common mixing/blending tank 38, and finally becoming a CB feedstock product 40, such as pelletized product or fluff.

Figure 3:
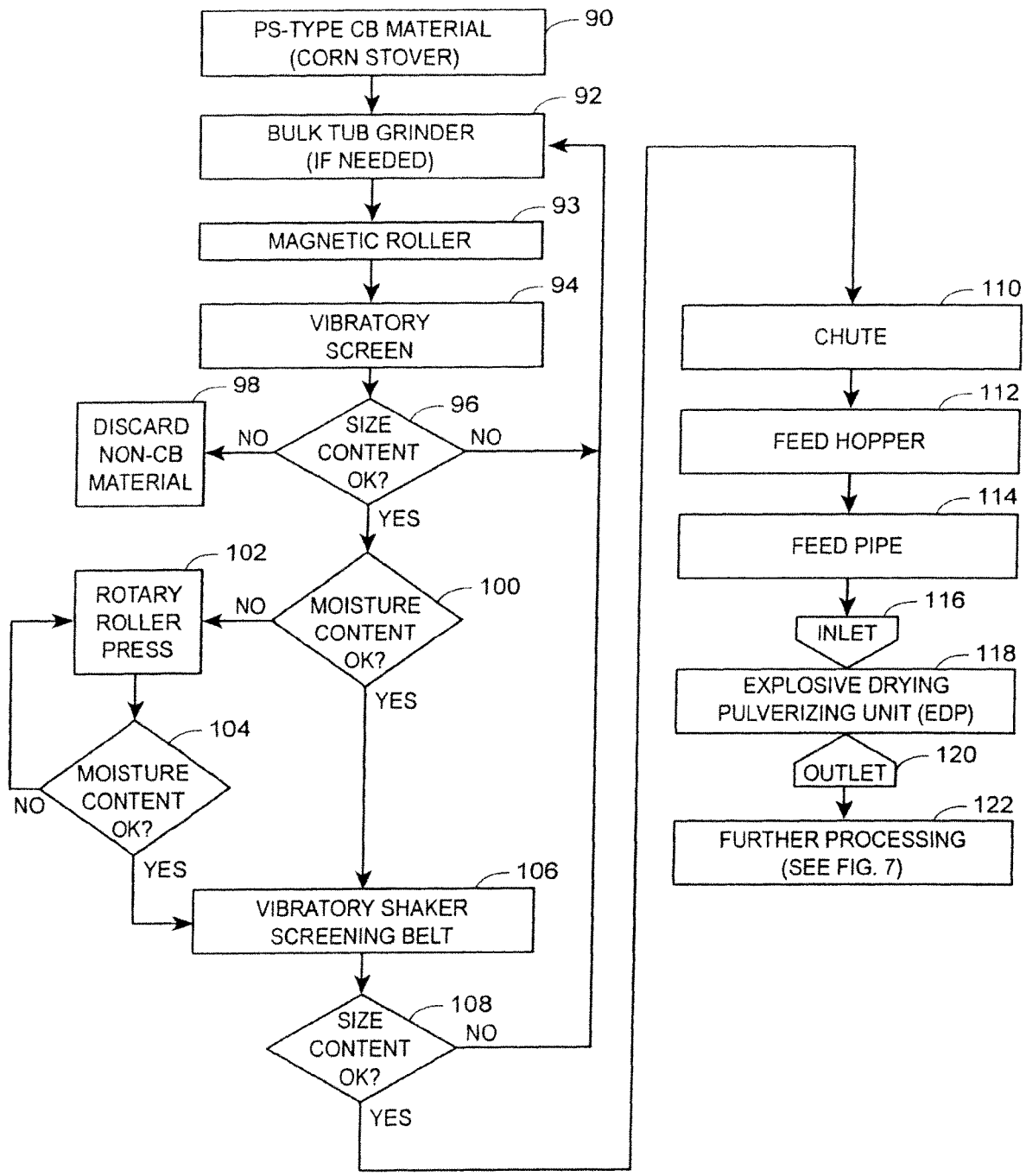
FIG. 3 is a combination block/flow diagram of an embodiment of a system and method specific to processing corn stover.

For example, FIG. 3 depicts one exemplary embodiment of a device and process for pre-preparing a PS stream of corn stover. The received corn stover 90, preferably of 4" to 8" in size, enters a bulk tub grinder 92 and is mechanically processed, that is, further cut, chopped, severed, flaked, shaved, crushed and ground to a small starter size in a range of approximately ½" to 1½" size. Also, to ensure the best quality of incoming CB material, the initial pre-chop CB source material is run over a magnetic roller unit 93 and also over a vibratory screen 94 (see FIG. 3), to respectively separate out any unwanted metal debris and any large fraction CB material (for a subsequent recycle re-grinding step), and more importantly, to remove any large fraction non-CB debris materials 98. The latter may include gloves, sacks, soda cans, water bottles, plastic bag and film materials, strapping, large rocks and stones, bricks, dirt clods, metal items, large broken glass fragments, clay tile pieces, and such. Preferably, the screen used within the vibratory screen comprises round holes in a range of approximately 1" to 2", and preferably approximately 1½" in diameter, and also is at least approximately ½" thick, or greater. Depending on the type of CB material being processed, and amount of metal objects included, other suitable screening apparatus can include trammel and conveyor screens, rotating and barrel screens, inclined screens, air classifiers, and additional magnetic screens and rollers (non shown).

The moisture content at this stage for such incoming CB source material can vary widely. That is, it can be as high as in a range of approximately 45% to 65%, if it is received in as "field wet chop" corn stover, or as corn stover ensilage (e.g., corn stover that was chopped and then stored for several months in silos at on-farm sites or at CB material "warehousing" sites such as elevators). Alternatively, it can have a moisture content in a range of approximately 35% to 45% (if the corn stover has been partially field-dried). Then instead, the moisture content could be in a range of approximately 15% to 20% (e.g., for wheat or oat straw), if it was first stored in the field (in pre-formed and properly covered large bales, cubes, or haystacks). As used herein, "moisture content" refers to the wet-weight water content of the particular CB material (i.e., the water weight of the CB material relative to the combined weight of both water and solid mass in the CB material). It will be understood that, if ensiled corn stover (or other high moisture content stover or CB materials) is received for use at the pre-processor site, then after (or before) coarse pre-grinding of the same (if needed), it may be necessary to run such high moisture raw CB material through a rotary roller press 102 (see FIG. 3), to thereby squeeze out any unwanted initial excess liquid fraction (e.g., water and other plant juices) from the individual CB pre-chop material. Other suitable de-watering apparatus that can be used, in lieu of a roller press, include vacuum evaporators, centrifuges, belt presses, and squeeze presses (none shown).

Thereafter, with continued reference to FIG. 3, the pre-grind stover material 90 flows from the roller press 102 via a vibratory shaker screening belt 106, through a chute 110, and to a feed hopper 112. The vibratory shaker screening belt 106 acts as a further screen to deposit only correctly sized small-fraction CB material 108 (in the preferred size range noted above) into the PS infeed hopper 112, via the chute 110, and to allow return of any remaining large-fraction CB material (as not sufficiently ground) to the bulk tub grinder 92, for re-grinding. Preferably, the final corn stover (or other CB) pre-grind material leaving the bulk tub grinder 92 (and leaving any roller press 102), will be generally free of non-CB debris and have a moisture content in the range of approximately 10% to 20%, and more preferably of approximately 10% to 15%, which later range represents the equilibrium moisture content of most raw CB materials. Plus, it will be screened to have a substantially reduced initial size range of approximately ½" to 3", and more preferably, of approximately ½" to 1½", so as to be best-sized for further processing.

b) Explosive Drying and Pulverizing

From the feed hopper 112 of FIG. 3, the pre-grind stover material 90 flows through a feed pipe 114 at a suitably high process (i.e., high throughput) rate to the feed inlet 116 of an explosive drying and pulverizing unit, generally denoted by reference numeral 118 in FIG. 3, for example. That high throughput explosive drying and pulverizing unit 118 (hereafter "EDP unit") can take the form of any one of several commercially-available or even other devices. Two different classes of exemplary EDP devices are described below. The goal for any such EDP unit, while operating at relatively high process rates, e.g., preferably in the range of at least 2 tons to 10 tons per hour, and more preferably 20 tons/hour and even higher, if able, is to explosively dry and pulverize, and thereby destruct, i.e., alter, as many of the cellular structures and molecular bonds in the CB materials' cell walls as able. (It will be understood that two, three, four or more such EDP units, operating in parallel, may be needed to accommodate the needed daily high process throughput tonnage rates for a given pre-processing faciltiy, as contemplated hereunder. Also, different type EDP units, operating in parallel, may be required for different, incoming CB source type streams.)

Such EDP units are understood to effect an explosive separation of the water fraction molecules from the material (i.e., solid) fraction in CB materials particles, and then also to explosively pulverize the material fraction into minute particles. Important here, however, it is projected that they also act, while pulverizing the cellulose material fraction, to explosively destruct much of the very cellular and molecular makeup of the material fraction. Although this is a projection, it is believed that the explosive forces cause many of the CB microstructures to fracture and defibrillate, and to have new pores opened up. However, as best known, relative to CB ethanol and other biofuel production, none of the commercially available EDP units have heretofore been utilized or suggested for use to substantially explosively degrade, i.e., disrupt and destruct, the very LC bonds and other micro structures found within CB source materials, so as to thereby better prepare and pre-treat the same for subsequent bioconversion processing. It will be understood that two or more EDP units, of the same or of different kinds, may be operated in series, i.e., to process the CB materials through two or more explosive drying and pulverizing events, to achieve the greatest levels of LC bond disruption, should a given type CB material so require, as well as to achieve extra levels of drying and size reduction, if required by a given biorefinery for its CB feedstock.

There follows a description of several exemplary forms of commercially available devices that can be used for the present EDP unit. Two different general classes of EDP units are described below, one utilizing high-speed rotational flail-type chains and/or striker bars against the CB materials, and the other utilizing high speed air streams to entrain and process the CB materials. It will be understood that even other suitable types of explosive drying and pulverizing apparatus may also be used, to achieve the desired destruction of CB cellular structures.

As a first class of EDP units, such as might be used (e.g., for capital cost reasons) for processing CB materials for smaller to medium-sized CB ethanol and other type biofuel plants, e.g., in the range of 10 to 75 million gallons per year capacity, there is the high-speed rotating chain flail-type explosive pulverizer as exemplified by U.S. Pat. No. 6,039,277, the teachings of which are incorporated herein by reference. That pulverizer uses radially outwardly extending flexible flail chains, rotating at tip speeds in the range of 0.85 to 1.3 Mach (about 645 to about 990 MPH), and associated stationary anvils, to create kinetic energy and standing sound waves to explosively fracture material and to vaporize liberated moisture. This type explosive dryer and pulverizer, in a single pass, can reduce material in a range of 1-½" to 2" in size, and up to 60% moisture content, down to a fine essentially dry powder of approximately 200 mesh screen (i.e., less than approximately 74 μm in size). The shock waves, sound waves, high speed movement, turbulence, and moisture expansion created within the processing zone between the flail chains and anvils causes the fracturing, disintegration, and vaporizing of the materials being processed. The moisture content of the finished product is controlled via the speed of separating the material by an air stream from an associated air circulation system.

Figure 9A:
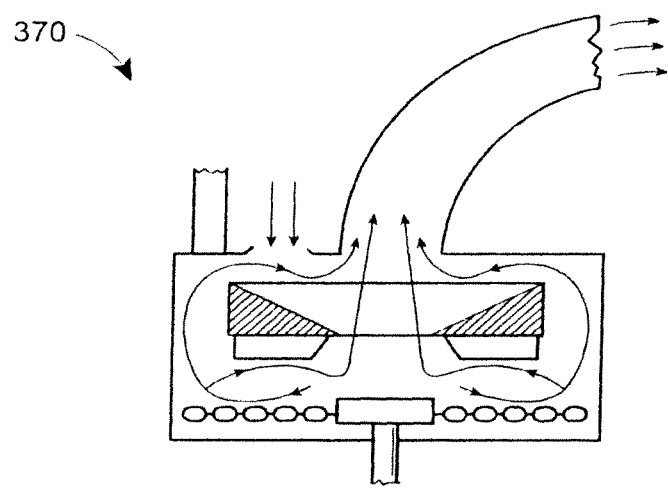
FIGS. 9A and 9B illustrate one embodiment of an explosive drying and pulverizing (EDP) device for use within the system and method of the present disclosure.
Figure 9B:
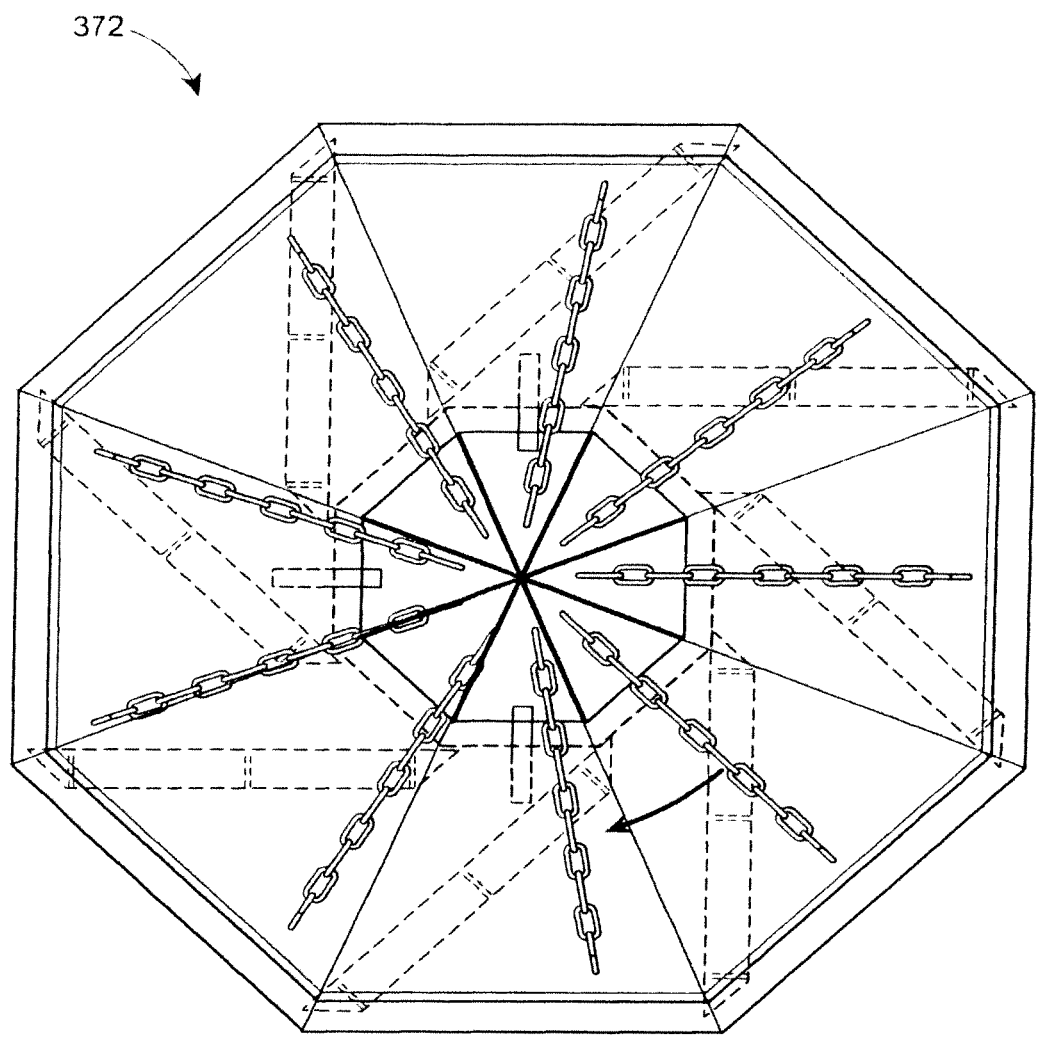
Figure 10:
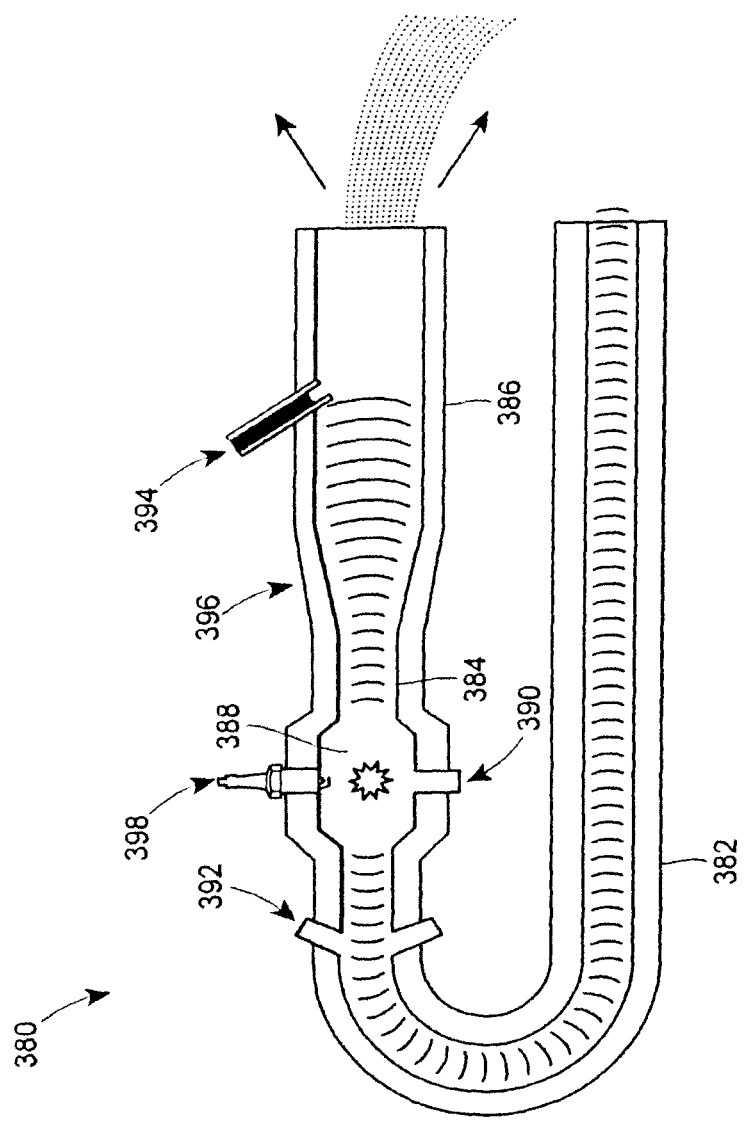
FIG. 10 is another embodiment of an EDP device for use with the system and method of the present disclosure.

Another suitable high speed swinging chain flail-type explosive pulverizer is the electrically-driven "KDS Micronex™" unit, as made by First American Scientific Corp. of British Columbia, Canada, and Las Vegas, Nev. (see www.fasc.net; and U.S. Pat. Nos. 5,839,671, 6,024,307, and 6,682,005, and, U.S. Publication No. 2006/0108459, for a description of the construction and operation of that type explosive pulverizer, and of methods for its use with various materials, the teachings of which are incorporated herein by reference). The chains, rotating at tip speeds anywhere from about 300 to about 600 mph (but preferably, from about 400 to about 500 mph), cooperating with stationary striker plates mounted within the torus chamber (i.e., the work zone where input material is processed), cause the material particles to be explosively blown apart due to repeated impacts of particles against the respective chains, other particles, and chamber sides. The higher the operating speed, the finer the resulting particle size. It is indicated that wood products material having up to a 50% moisture content can be dried down to a range of about 10% to about 13%, and to reduce particle sizes down to a range of approximately 250 μm to approximately 2 mm (60 to 10 mesh screen size). For example, wood chips having an initial size of approximately 1"×2"×¼" can be pulverized to approximately 40 mesh size in one cycle, and down to approximately 85 mesh size in two cycles. Also, so-called spruce/pine/fir "hog fuel" material initially averaging about 25 mm size, and 14% water content, can be reduced to an output particle having a top size of about 2 mm and median size of about 500 microns. Then, wet sawdust can be dried and ground down, from an initial 48% moisture content to 14%, and to a median output particle size of about 250 microns; also, spruce/pine/fir bark material can be dried and ground down, from a 50% moisture content to 12%, and to output median particle size of about 250 microns. Further alfalfa hay, in a range of 25% to 30% moisture and 25 cm in length, can be reduced to a fine powder of approximately 3 mm top size and 17% moisture content. Crushed sugar cane bagasse, depending on the process speed rate used, can be dried down from a 44% to 21% moisture content, and ground down from a coarse fiber to a fine powder-type particle size. For most biomass materials, the output particle size will be in the approximately 100 to 2000 microns size. Germs and other pathogens in the materials processed by the KDS Micronex™ unit are substantially eliminated, due to the immense centrifugal particle accelerations causing pathogen cell walls to rupture, thereby killing the cells. Production rates in a range of 3 to 4 tons per hour, and even higher with bigger models, are available with this type EDP unit. The final product moisture content is controlled by the input process feed rate. See FIGS. 9A and 9B, for a depiction of how such a KDS Micronex™ unit would operate on CB materials in the present system and method, with the arrows depicting the material flow pattern through that high rotational speed flail type EDP unit.

Another potential form of the present EDP unit may comprise the twin parallel horizontal tube type explosive pulverizer unit, with a special high speed chain flail assembly, as exemplified by U.S. Pat. No. 5,184,781, the construction and teachings of which are incorporated herein by reference. Suitable moisture and air exhaust piping would need to be added, to use this type explosive pulverizing unit, when explosively drying and pulverizing CB materials in accordance with the present disclosure.

Then, as a second class of EDP units, i.e., a so-called high speed air processing type, such as perhaps used for larger biofuel and CB ethanol plants, e.g., 75-120 million gallons per year capacity and up, there first is the Pulverizing Air Dryer device (or so-called PAD unit) as offered by Gulftex Environmental Services, LLC, of Vansfields, Tex., and MPCEE, of England. The explosive PAD dryer operates by first entraining a product (here, the CB materials being processed), within a high-speed air stream (moving at about 400-500 mph at its peak). The air stream, with solids entrained, is then directed into a cyclone chamber. Obstacles (e.g., striker bars) within the cyclone chamber redirect and cause turbulence in a portion of the airflow. Those redirected airflow and material portions create collisions at approximately a 60 degree angle of collision then with other particles still entrained within the non-redirected airflow. The resulting high-speed collisions, i.e., between particles, and between particles and striker bars, reduce the size of the particles and release moisture from within. Pulverized and dried material exits the cyclone chamber and enters a cyclone separator for separation from the airstream and collection. This apparatus is described to operate as a high-speed, air-jet driven, self-sandblasting type device, with no moving parts, to effect a rotational shearing and drying process for the solid materials directed into its housing. It has the ability to adjust the air jet speed and direction, in order to control the particle size and/or moisture content at the outlet. When the processed particles explosively collide into one another within the housing, significant drying and pulverizing actions occur. The PAD dryer can dry materials down, it is claimed, to as low as 10%, and in the unlikely event if so needed (for CB materials), even down to a 3% moisture content. It is intended to operate at a process production rate of up to 20 input tons per hour. (See www.mpcee.com.uk, as well as U.S. Pat. Nos. 6,491,242, 6,588,686, and U.S. Publication No. 2003/0080223, for a description of the structure and operation of a PAD dryer, the teachings of which are incorporated herein by reference.)

Second, there is the so-called "valveless pulse combustor" and drying apparatus, known as a PDS unit, as made by Pulse Drying Systems, Inc., of Portland, Oreg. That explosive PDS unit operates on the principle of creating sound energy shock waves, at approximately 250 cycles per second, to explosively operate on the materials being processed, to thereby disperse and dry the same, and to separate the material into fine droplets and fine particles. Depending upon the process feed rate, it is indicated that the PDS unit can dry materials down to a 1% moisture content. Input particle sizes can vary from sub-micron to ½ inch, and then are size-reduced in the PDS unit to a fine powder. This type EDP unit runs at a stated production rate of approximately 2-4 wet tons of material (at 80% moisture and 20% solids) per hour. It is particularly suitable for these CB source materials that have higher initial moisture contents, e.g., paper-making pulp and sludge, bagasse, and high moisture content forest slash. (See www.pulsedrying.com for a description of the structure and operation of a PDS unit.)

More specifically, an example of a valveless pulse combustor 380 is illustrated in FIG. 10 (again, as made by Pulse Drying Systems, Inc.). Such a pulse combustor 380 can be feed when needed with any suitable wet particle feed equipment, including a positive displacement pump, diaphragm pump, or screwauger, for example (none shown). The pulse combustor 380 includes a U-shaped body 382 having an air outlet 384 and a conical tailpipe 386 serving as an outlet for dried CB material. The U-shaped body 382 also includes a combustion chamber 388 and a fuel inlet 390 located upstream of the conical tailpipe 386. An air inlet 392 is located upstream of the combustion chamber 388 and a CB material inlet 394 is located in the conical tailpipe 386. During operation, fuel is introduced into the combustion chamber 388 via the fuel inlet 390 and ignited, thereby increasing the pressure in the system and momentarily shutting off the flow through the air inlet 392 and the fuel inlet 390. As the pressure gradually returns to its initial value, fuel and air once again enter the combustion chamber 388 and reignite, thus resulting in a cyclic, pulsed combustion operation. The resulting detonation from each combustion cycle emits pressure waves, heat, and exhaust gases that travel through U-shaped body 382 and exit through both the air outlet 384 (approximately 30% of the emitted gas) and the conical tailpipe 386 (approximately 70% of the emitted gas). Incoming CB material (preferably, for this particular EDP unit, having been pre-sized to a range of about ¼" to ½") entering the conical tailpipe 386 through the CB material inlet 394 is dried and reduced in size. The detonation event (combined with the geometry of the pulse combustor 380) generates sonic energy shock waves that atomize the incoming CB material into both smaller solid fragments and water droplets. The increased surface area of the smaller solid fragments and the heat generated from the detonation event combine to rapidly evaporate water and dry down the incoming CB material. Because of the evaporative cooling that occurs in the conical tailpipe 386, the temperature of the CB material during its short residence time (only a few milliseconds) in the pulse combustor 380 preferably does not exceed a range of approximately 100° F. to approximately 125° F. The drier CB material now exiting from the conical tailpipe 386 can be separated from the effluent gases and water vapor using conventional gas-solid separation techniques.

Third, the present EDP unit could take the form of the high-speed entrained air-type explosive pulverizer device disclosed in U.S. Pat. Nos. 6,722,594, 6,978,953, 7,040,557, 7,059,550, and 7,137,580, and at www.pulverdryerUSA-.com, the teachings of which are incorporated herein by reference. That device, known as a PulverDryer™ unit, is made by PulverDryer USA, Inc., of Kalamazoo, Mich. It operates on the principle of drawing the materials being processed through a venturi-tube type device via a fan-produced air flow that is at or above the speed of sound at the throat of the venturi, i.e., Mach 1.0, or about 761 MPH at ambient temperature and pressure, whereby the material is explosively dried and disintegrated, i.e., pulverized, by the action of various significant shock waves (described as trailing, leading, and restriction area shock waves) that are created by the material within the venturi-tube device. This particular explosive pulverizer apparatus has a stated production rate of approximately 5-7 tons per hour, and is claimed to greatly reduce the moisture content, for example, reducing the moisture content in wet sawdust from 43% down to 15% or even less, and producing a fine wood powder. It is also claimed, for certain unstated materials undergoing just one pulverization event, and which have an initial size of 2" (50 mm) diameter, that they are size-reduced into a powder of particles each generally having a diameter of about 20 μm. See FIGS. 11A and 11B, for a depiction of how this type explosive pulverizer unit would process CB materials in accordance with the present system and method. (It should be noted that while the explosive pulverizer device illustrated in FIGS. 11A and 11B illustrate a generally uniformly circular mass of input material being processed, actually a continuous stream of many irregularly-shaped fragments of CB material will be processed when such a high-speed entrained air-type EDP unit is used in accordance with the present disclosure.)

Yet other forms of the present EDP unit may comprise one of the following high-speed, entrained air type explosive pulverizer devices:

The high air speed, venturi-type, particle pulverizing device, of Grefco, Inc., of Bala Cynwyd, Pa., as exemplified by U.S. Pat. No. 4,059,231;

The high air speed material pulverizing apparatus, as exemplified by U.S. Pat. No. 4,390,131;

The vacuum pulverizing device, of Process Development Corp, of Denver, Colo., as exemplified by U.S. Pat. No. 4,391,411;

The size reduction, separation, and classification device, of P.V. Machining, Inc. of Santa Fe, N.Mex., as exemplified by U.S. Pat. No. 4,418,871; and, The material pulverizing device of T.D.J. Co., Inc., of Dubuque, Iowa, as exemplified by U.S. Pat. Nos. 4,718,609, 4,852,818, and 4,892,261, the respective teachings of all of which above patents are incorporated herein by reference.

As this phrase is used herein, an "explosive drying and pulverizing" action, as produced by the present EDP unit, will be understood to mean a high-speed explosive force-type separation of the CB material particles being processed of: (1) one type material from another type material (e.g., bark and/or needle material from wood material), (2) one type material into smaller fractions thereof (e.g., wood chips into wood powder), and (3) the material fraction from the water fraction. In all such cases, the explosive forces are produced by material particles impacting with each other or with a machine part at high speeds, i.e., greater than approximately 300 mph, and preferably in a range from about 400 to about 765 mph or even higher (about 0.53 Mach to about 1.0 Mach plus), and/or by material particles being impacted by shock waves (air and/or sound waves) occurring in airflows in a speed range of about 645 mph to 990 mph. Yet other such EDP units, with or without internal moving parts, may be available that produce such high speed movement explosive pulverizing results, and thus may be advantageously used for the EDP unit here. In any event, the basic need for any EDP unit used with the present system is that it will, at a sufficiently high process rate, create a high speed explosive force against and within the particles of CB materials being processed through them, whereby the explosive high speed impact literally explodes and/or implodes those materials, and thus, not only acts to reduce the particle size, and to create a more uniform particle size, but more importantly, to explosively destruct many of the LC bonds and other micro structures within them, at the cellular and molecular level.

The decision as to which specific type EDP unit is ultimately chosen for a given CB material pre-processing site, whether from among the above-listed two different classes of exemplary explosive pulverizer devices or even others, will be dependent upon many variables. These variables may include such pre-processing site specific factors as initial capital equipment cost, portability, maintenance costs (any ongoing replacement part costs, e.g., worn flail chains), operating costs namely locally available energy and its cost (e.g., ability to use any energy created on-site or nearby, such as methane gas or excess steam, or instead, to use electricity or natural gas), whether the EDP unit will be intended for processing additional types of materials, the characteristics and composition of the CB materials intended to be processed (e.g., wood materials having tough LC bonds; high crystalline content type LC bonds; high lignin content), the CB feedstock's final desired moisture percentage (high vs. low), the EDP unit's available feed and production rates, whether heat (if any) used or generated within the EDP unit will negatively affect the end quality of the specific CB materials being processed, whether any extra high moisture content type CB materials (e.g., ensiled corn stover, forest slash, yard waste, bagasse, or pulp mill sludge) will need to be processed, whether because of the specific CB materials being processed any air pollution control equipment would be required, the EDP unit's required space "footprint", whether only one explosive drying and pulverization event, for given CB material particles, is needed, or instead two or more such explosive drying and pulverization events, i.e., cycles, will be needed, and, if so, whether they are done in EDP units operating in series or instead the CB materials are run back through the same EDP unit, and so forth. Accordingly, no one commercially available (or other) EDP unit is considered best for use with the present system and method, and each is understood to have its own advantages for given applications.

Referring now to FIG. 2, with whatever type high-throughput EDP unit 56 is chosen for a given pre-processing site, it receives the pre-ground and pre-sized CB material 52 in its inlet 54, and then at an outlet 58, exhausts a substantially drier, pulverized powdered fluff-type CB product 64. The separated moisture vapors are vented from the EDP unit through a vapor stack 62, or through air handling or pollution control equipment 60 (e.g., wet scrubber, baghouse or electro-static precipitor unit, none shown, if needed). The resulting pulverized CB fluff 64 will be in a range preferably of approximately 1% to approximately 20% in moisture content, and more preferably in a range of approximately 1% to approximately 15%. Then, depending on the CB source materials' initial moisture percentage, and depending on a particular subsequent biorefinery pretreatment process, the CB fluff 64 could be dried to a range as low as approximately 1% to 10% moisture content. The feed rate of the EDP unit can be adjusted to achieve the desired end moisture content. Depending on their own pre-treatment process utilized, some biorefinery customers may wish it to be within the equilibrium moisture content (of approximately 10 to 15%) of raw CB materials, while others may require it to be lower, and yet others higher.

Also, depending on the feed rate of the CB materials being processed through the EDP unit, the resultant drier pulverized CB fluff will now likely be of a particle size in a range of approximately 625 mesh to 4 mesh screen size, i.e., from approximately 20 microns to approximately 4760 microns in size, and more preferably ranging from about 500 to about 200 mesh screen, or from approximately 25 microns to approximately 74 microns in size. Importantly, the combination of the EDP unit's explosive drying and pulverizing actions, the moisture content reduction, and the significant CB particle size reductions, cause many of the tough LC bonds within the processed CB materials to start to be substantially disrupted and broken up, whereby substantial destructions and alterations occur at various micro sites within the plant's cell walls. This in turn exposes more internal surface area, pores and other openings, and thus provides greater access (e.g., foothold locations) for subsequent chemical, biological and any other bio-conversion reactions to occur. Separately, where needed, it also permits more efficient thermal-conversion type ethanol and other biofuel processing.

Again, by this stage in the present method, for the first disclosed example, the explosively dried and pulverized corn stover material 64 (of FIG. 2) has been reduced to essentially a fine powder "fluff". Any remaining large fraction CB pieces, e.g., threads or larger segments of the now drier and pulverized corn stover material 64 that may exit the EDP unit 56, can be screened out if needed (see the fine-mesh vibratory screen 66, e.g., preferably of 40 mesh screen size or smaller, in FIG. 2). If desired, such separated large-fraction CB material can then be collected, recycled, and re-fed through the EDP unit 56, by a return pipe 69, to thus be re-processed in the EDP unit 56 for a second explosive drying and pulverization event. Alternately, any such large fraction CB material still remaining can be separated out by an air classification process (see the air separation unit 68 in FIG. 2), for re-processing. Such large fraction CB material can also be used in separate unrelated processing operations, e.g., as an animal feed component; or as fuel pellets. Or, if comprising only a small percentage, such large fractions can simply remain as part of the CB material stream exiting the EDP unit 56.

It will also be appreciated that the incoming CB source materials (to the EDP unit) still may include some fraction of smaller non-CB debris material, e.g., dirt, stones, small bits of metal, broken glass, leather, rubber, fabric, plastics, clay tile, and glass, but now as processed through the EDP unit are generally ground and pulverized, to the extent such unwanted debris was not otherwise previously removed via the large fraction non-debris removal (during the initial large fraction vibratory screening). If such non-CB debris materials would ultimately enter, to any large degree, the later biorefinery's processing equipment, the same could create extra levels of sediment, silica, and ash, if not also cause serious disruption. For example, if the subsequent biorefinery ethanol conversion process is a thermal-conversion (e.g., gasification) type process, any such non-CB debris fraction can result in unwanted so-called "clinkers", which can result in lost efficiency and down-time for their removal. Thus, at this stage of the present system and method, the powder CB fluff stream 64 is preferably processed through an air-solid classification step (see air classifier 68 in FIG. 2), to advantageously separate out such non-CB fines and particles from the desired CB fluff materials. Importantly, this then results in a substantially high quality, non-CB debris-free end CB fluff product.

Advantageously, even though the processes of the subsequent biorefineries themselves are considered "robust" and may well control or eliminate unwanted contaminates, it is projected that the explosive drying and pulverizing forces caused by the EDP unit 56 will sterilize and kill some 90% or greater of any bacterial, fungus, mold, mildew, and other biological growths and pathogens present within the incoming CB source materials, which unwanted harmful contents might otherwise interfere with the subsequent biorefinery processes.

Importantly, at this now drier and pulverized stage in the present process, where the CB particles now comprise a fine powder fluff, they have undergone some level of physical degradation. It is believed, however, that since this is occurring at the cellular if not molecular level, some portion of the tough LC bonds within the CB material particles are not yet broken down. Thus, notwithstanding the explosive destruction already caused to various of the internal structural LC bonds, it is believed that still further destruction and degrading of such LC bonds and other micro structures is needed, i.e., to properly prepare an efficient biorefinery CB feedstock. This is especially the case for any CB materials having a relatively high resin, lignin, or crystalline content, e.g., softwood-based wood chips and other "woody" CB materials.

c) Electrical Degrading

Thus, to yet further advantageously provide significant physical disruptions, i.e., alterations and destructions, within as many of the LC bonds as able, the powdered CB fluff 64, of material stream 50 in FIG. 2, is next processed, again preferably at a high throughput rate, through a so-called high intensity electrical degrading device (an "ED" unit 72). It will be understood that further moisture content reduction and size reduction of the CB particles making up the material stream 50 may, or may not, occur when being processed through the ED unit, especially depending on what type ED unit is used (see descriptions below for various different exemplary ED units), and also depending on the structural make-up of the CB materials being treated. Nevertheless, passing the now pulverized CB fluff particles through the ED unit 72 causes, among other forces, disruptive electric compressive forces, implosive forces, and explosive forces, on the cellular structure, and thus causes yet further damage to more of the LC bonds and other micro (cellular and molecular) structures within such particles. This further destructive action, as effected through high intensity electrical-degrading forces, causes fractures and thus exposes yet even more surface area, pores and LC bonds (e.g. footholds) for subsequent chemical, biological, and other bio-conversion processes. It will be understood that the respective power levels described below, for a given ED unit approach, will necessarily vary depending on the flow rate, particle size, moisture content, and specific type (e.g., chemical makeup) of the CB materials being processed.

A first exemplary form of such an ED unit could be an electrical discharge field, sometimes also known as a pulsed electric field ("PEF"), as shown in FIG. 4A1. In that example, the cellulosic biomass material stream 130 would be subjected to a high intensity electrical charge, as the CB particles move through the PEF treatment zone, as caused by an electrical discharge field form of ED unit. With that approach, when the electrical charge contacts the CB particles, it causes the LC bonds to be further structurally degraded and destroyed. The electrical charge field may be maintained at a steady state, or more preferably is pulsed. Where such a PEF process is used, the high intensity pulsed electric field would preferably operate in the range of approximately 200 to 1000 V/cm, for $10^{-4}$ to $10^{-2}$ seconds. Alternatively, and more preferably, even higher intensity shorter pulses may be used, operating between approximately 1 KV/cm to 100 KV/cm, for ten to 60 nanoseconds, at pulse repetition rates of one hundred to 900 pulses per second.

More specifically, the incoming CB fluff stream 130 is fed into the PEF-type ED unit 500 (see FIGS. 4A2 and 4A3) by a high rotational speed screw auger press 502 (or via a high speed pneumatic air flow, or via other high speed pressurized feed systems), so as to gently and temporarily pack the CB material 130 into the elongated PEF-type ED treatment zone 504, enclosed in a treatment chamber 506 of the ED unit 500. Also (see the right end of treatment zone 504 in FIG. 4A2), an output member 508, formed as a reduced diameter output pipe, is used to also create a slight back pressure on the CB material 130 present within the PEF-type ED treatment zone 504. The treatment zone 504, and output member 508, if needed, can be vibrated to help prevent the slightly packed and pressurized CB fluff material 130 from building up on the elongated electrodes 510 (formed of a parallel plate type electrode configuration) and/or the inner walls 512 of the treatment zone 504. Such vibrations also prevent the CB fluff material 130 from becoming too tightly packed, such as into an unwanted blockage area at the output reducer pipe 508, or anywhere along the treatment zone 504.

This combination of the pressurized input feed, and back-pressured output feed, while still allowing high throughput speeds, cooperates to minimize any unwanted excess air and air gaps within the treatment zone 504. The reduction in amount of air present then helps minimize unwanted arcing, e.g., any useless electrical discharge passing between the electrodes 510, thereby minimizing unwanted attendant electrode wear, and also minimizing loss of electrical energy benefit, e.g., efficiencies.

The pulsed electrical discharge forces of the PEF field (see representative arrows) act between the parallel plate electrodes 510, and thus act on the pressurized CB material stream 130 being passed through it.

The high intensity pulsed PEF field is created by using (see FIG. 4A4) a high voltage impulse generator 516 having an energy storage device 518, with the stored energy charged across a charging resistor in the form of a thyristor pulse switch 520, (alternatively, a spark gap switch, with protective resistors—not shown), by a high voltage power supply 522. Serial or parallel connection of switches can be used to achieve the sufficiently high power levels needed here, as well as storage capacitors and protective resistors. Preferably, the present PEF-type ED unit, for any given application, needs to be designed to permit at least a sufficiently minimum number of applied PEF pulses within the ED treatment zone 504. That is, preferably, so as to achieve the highest PEF field treatment as able, for a given volume of the CB material stream 130 passing through the PEF-type ED unit 500, the number of individual treatment pulses will be in the range between 20 to 1000 pulses, i.e., representing the PEF treatments per volume processed. To achieve such maximized PEF field treatment, it is preferable to use a square-wave pulse form generator. Further operational parameters, for the present high intensity PEF-type electrical discharge ED unit 500, as dependent on the incoming CB materials feed rate, will include generating a voltage in the range from approximately 1 kV/cm to approximately 100 kV/cm, and even up to as high as 5 MV/cm, if needed. Preferably, the field strength, as will be needed for most different CB source material types, will operate in the range of from approximately 10 to approximately 60 kV/cm. Then, the energy input will be in the range of from about 1 to about 45 kJ/kg, and more preferably in the range of about approximately 10 to approximately 20 kJ/kg; a pulse repetition or frequency in the range of about 103-107 Hz; a pulse width in the range from approximately 0.5 to approximately 10 microseconds; and an electrode gap (that will vary by size of ED unit, and by power source and electrode type).

Input feed flow rates (for the CB material stream 130 passing through the PEF-type ED treatment chamber) could be in the range from about 0.5 to about 2.0 meters/second, and more preferably in the range from about 0.8 to about 1.2 meters/second, e.g., permitting about 2000 pulses/second. Electrodes can vary in size, also dependent on the size of the PEF type ED unit, but generally in a length range of from about 10 cm to about 5 m in size. The material used for constructing the electrodes is preferably stainless steel. But they can also be made of: aluminum, brass, gold, platinum, carbon, metal oxides, copper beryllium, titanium-covered platinum, and copolymer coatings.

Thus, the present PEF-type ED unit 500 uses pulsed electrical degrading power as generated by a repetitive discharge of electrical energy stored in a capacitor bank across a high-voltage switch. To a plant cell, it is projected that an external electrical field (of sufficient cell breakdown voltage) causes various electro-compressive forces on the cell wall and molecular structures, such that high intensity PEF treatment leads to formation of new irreversible pores and fractures, electroporation.

If desired, one can perform real-time conductivity meter testing of PEF-type ED-treated CB material exiting the output pipe 508 of the ED unit 500, to determine the percent of pre- and post-ED treated CB material cell wall (molecular and cellular) disruption and degrading.

As an alternate embodiment, (see FIG. 4A4, or instead as then coupled with the above-described treatment zone 504 in series format), a treatment chamber 524 that is designed to have the individually connected electrode pairs 526 offset axially from one another can be used. This alternate design causes the pulsed PEF-type ED forces 528, in effect, to operate at an acute angle (and then even at an opposing, oblique angle, if a yet further, but oppositely angled, set of offset electrode pairs follow in series) to the flow direction of the CB material stream 130. This angled direction of the PEF-created electrical degrading forces, coupled with that of the right angled applied PEF forces of the preceding unit 500, helps to achieve a maximized electrical degrading of the CB materials' cellular and molecular structure.

It is believed that with the above-disclosed form of PEF-type ED unit, and depending on the configuration of the treatment chamber, and the type, shape and placement of the electrodes, that it can reasonably be expected to process between about 5 to about 20 tons of CB fluff material 130 per hour. To achieve the sufficiently large daily production capacities needed from the present system and method, it is believed that, rather than increasing the size, e.g., cross-sectional area and/or length, of a given PEF-type ED treatment zone, it is preferable to establish and operate several smaller PEF-type treatment units in parallel. This parallel ED unit approach, while increasing somewhat the initial capital costs, will help reduce long term energy costs, e.g., by greatly reducing the peak voltages required. It would also be helpful to set the power supply as close to ED treatment chamber as able, to limit power losses. The overall goal would be to adjust the field strength, current density, frequency, and pulse duration, as well as CB particle duration time in the PEF treatment zone, to achieve maximum cellular and molecular wall disruption, yet minimize the total energy input, all so as to reduce overall energy costs for the ED portion of the present system and method.

In any event, with the present PEF-type ED unit, the goal remains (whether if only a single such ED unit is used, or instead, there are several ED units operating in parallel), to operate it at the needed high throughput flow rates and short process time, i.e., to electrically degrade the cellular and molecular structure of the CB particles, so as to match the high flow rates of the rest of the present CB pre-processing system.

Other configurations of PEF treatment chambers, and associated electrode plates, that can be used would include a generally round PEF-type treatment chamber using coaxial electrodes, and also a round PEF treatment chamber using co-linear type electrodes.

A second exemplary form of an ED unit is a high intensity industrial laser field. Such a laser field would preferably be in the form of an array of laser beams 135 (see FIG. 4B1), i.e., a plurality of opposing and offset laser beams, as depicted in FIG. 4C1, so as to be set in a pattern to achieve full coverage across the CB materials being presented to it. For example, the laser units could be so mounted and directed as to provide multiple passes of radiation beam energy through each respective particle of CB materials, as the same pass through a flattened narrow cross-section product flow pipe 140. Such a flow pipe could be suitably formed of a glass, transparent plastic or other laser-resistant material (see FIG. 4C1), and oriented at generally a right angle to the laser field. In that example, the fine particles (of CB material stream 138 in the flow pipe 140) could be rapidly passed through the high-intensity laser field, such as by having the CB particles pneumatically transferred in the flow pipe past a series of laser beams 141. The lasers making up such a laser field can be run at steady state, or more preferably be pulsed. With this approach, the CB particles would be subjected to a laser-generated high intensity electrical energy transformation, thereby further damaging their structural make-up.

More specifically, it will be important that the depth of penetration of the laser energy beam be sufficient to penetrate and properly process the particles of the CB material stream 138 passing through the laser treatment chamber 140. Thus, to achieve that, the operating range for the laser wavelength should preferably be between approximately 0.9 microns and approximately 1.15 microns.

FIGS. 4D1 and 4D2 show the preferred embodiment for a laser-type ED unit 530. It is operated as a so-called Q-switched mode laser, and the material 138 being processed passes adjacent the laser's reflecting mirrors 532 and 534. That is, the laser 536 is formed as an amplifying laser generating material, operating between a curved back reflecting mirror 532 and a material treatment conduit 538. The continuous CB material stream 138 passes through the conduit 538, e.g., under a pneumatic flow force through the laser ED unit 530. The treatment conduit 538 is formed with a transparent window plate 540, through which the laser beam field 542 passes. The upper and lower conduit walls 544, 546 can also be formed of a glass-like material to complete the enclosed material treatment conduit 538. The presence of the curved back reflecting mirror 532 allows the high intensity laser field 542, once it has passed through the CB material stream 138 to reflect back and pass through the same CB stream one or more times to increase the absorbed laser energy, thereby maximizing the laser energy being deposited in the CB material. Again that laser generating material must operate within a range of wavelengths so as to achieve a sufficient depth of penetration of the laser beams into the particles of CB materials.

Alternatively, the CB material stream could be exposed to the laser energy field at a location outside the laser cavity, wherein the laser could be operated in so-called mode locked. Likely types of lasers could be a so called $N_d$ pulsed laser, a pulsed $TiAlO_3$ laser, and other high power solid state or gas lasers. Future generations of so called high powered semiconductor diode lasers may be a convenient source of optical or infrared power for a laser type ED unit.

Yet a third exemplary form of an ED unit is an industrial type microwave energy unit (see FIG. 4E1), which is considered especially useful for CB materials having higher end moisture contents, e.g., in the 10% to 20% range. With this approach, the microwave energy-type ED unit would cause, when the particles of the CB material stream 146 pass through the continuously-operating microwave energy field 147, the remaining moisture content within the same to become excited. Thus, if the CB materials being processed are maintained, i.e., are flowed in respective pulsed, segmented packets, as it were, of a portion of the CB material stream 146 into operating position within the microwave type ED unit, for a sufficient residence time (yet still a short time, due to the high throughput process rates needed), and are thus excited with a high enough microwave energy level, then the microwave energy caused by such an ED unit will further damage and disrupt additional LC bonds remaining within the fine CB particles.

More specifically, FIG. 4E2 shows a microwave energy generator 550, preferably in the form of a high power magnetron, tetrode or an FET, operating so as to generate a microwave beam 552 directed at a microwave power dispersal lens 554. That lens 554 acts to divide, balance and spread the microwave energy over the desired larger area, e.g., see arrows 556 in FIG. 4E2. There, the microwave energy is distributed across the general height H of the dispersal lens 554. Alternatively, the dispersal lens 554 could be replaced with a suitable waveguide and impedance matching tuner (neither shown) which also acts to couple the microwave energy into the CB material. In either case, the dispersed microwave energy is passed through a dielectric plate 558, operating as a partial reflecting mirror, such as made of material such as polycarbonate or ceramics. The balanced and dispersed microwave energy travels through the dielectric plate 558, and processes the CB material stream 146 passing through the material treatment chamber 560, and then is reflected off the rear or reflecting plate 562, and passes back through the CB material stream 146, where the microwave energy again, to the extent not now fully spent, reflects again off the dielectric plate 558, to yet again be passed back through the CB material stream 146. Assuming their absorption coefficients are small enough, these dielectric and reflecting plates 558, 562 can be tuned so as to make the treatment chamber a resonate cavity or a Fabry Perot interferometer. Such a multi-pass approach assures that the disruptive electrical energy forces within the microwave field 556 are not quickly lost, as might occur with a single pass approach.

In any event, with this microwave ED approach, the various reflected microwave energy beams effect significant disruption to the CB material's cellular and molecular structure.

As an alternate embodiment of a microwave ED unit, and to yet further degrade and disrupt more of the cellular and molecular structure of the CB materials processed through the above-described microwave energy type ED unit, there is an enhanced version shown in FIG. 4E3. That alternate unit includes an applied accelerating voltage, i.e., an accelerating electric field 564, which helps drive the electric ions generated by the microwave energy field 556a farther into the CB material particles. To provide such an applied accelerating voltage within the material stream chamber 566 (see FIG. 4E3), a pulsed (or steady state) voltage is charged across the space between the dielectric plate 558a and the reflecting plate 562a.

Preferably, the microwave energy generator 550 of FIG. 4E2, would operate in a frequency range of from about 100 GHz to about 20 MHz, and within a power range between approximately 5 KW and 10 MW. The additional applied accelerating voltage would, by itself, operate in voltage range of from about 1 KV to about 10 KV.

As a further alternate embodiment, a continuous wave microwave energy type industrial microwave apparatus could be used, in the form of the rotary microwave ED unit. Such a rotary microwave ED unit causes tumbling of the CB particles in the material stream, by rotating them through regions of intense and then weaker microwave energy fields, in three dimensions, so that all the CB particles are fully exposed to the intense, high-energy microwave-type ED field. Such a rotary microwave ED unit, preferably in the size range of about 2 meters to 8 meters long, would operate in the intense peak power microwave frequency range of from about 4.0 GHz up to 100 MHz, at within a power range of between about 5 KW and 10 MW.

Further, as formed and operating inside such a rotary microwave could be an accelerating electric field, generated by a large dc power supply. The energy level needed by such an industrial-type microwave energy unit would be microwaves in the range of about 10 to about 90 KW.

Yet a fourth exemplary form of an ED unit comprises a pressurized plasma wave energy field (see FIG. 4F1). In that version of ED unit, a plasma wave generator would create a high-intensity electrical energy within a glass tube 152 (or within a series of such tubes), through which the dried CB fluff 150 could be pneumatically passing, and within which the plasma operating under pressurized conditions is maintained, to thus cause the CB materials to undergo yet further destruction and alteration. The pressurized plasma wave energy field could be pulsed, or run at a steady state.

More specifically, see FIG. 4F2, a generally horizontally-aligned, pressurized-type plasma wave ED unit 570 could comprise radio frequency generators 572a, 572b, creating a radio frequency wave field 574, as directed against an enclosed material treatment conduit 576, such as formed of high tensile strength glass/ceramic plate walls. The CB material stream 150 would pass through the treatment conduit 576, in a direction coming towards the viewer (in FIG. 4F3). The radio frequency generators 572a, 572b (or other suitable plasma-maintaining high energy generator) is used to generate an electrical-assisted plasma within the material treatment conduit 576, utilizing the gas present therewithin for the plasma, namely air. Alternatively, suitable plasma operating gasses could include oxygen, hydrogen, helium, nitrogen and other gases commonly used to create plasmas. However, to be most effective, given the high throughput speeds required with the present system and method, the plasma created within the length of the treatment conduit 576 (see FIGS. 4F2, 4F3), needs to occur within a highly pressurized environment, thereby creating a pressurized plasma processing zone. That is, along at least a portion of the plasma treatment conduit 576, a plurality of pressurized air inlet nozzles 578 are mounted (preferably at an angle, directed back against the direction of CB material stream flow) on at least both sides of the plasma treatment conduit 576. Further, as the pneumatically forced CB material stream 150 (traveling from left to right in FIG. 4F2) enters the reducer inlet cone 580, the CB material stream 150 and the air stream that is carrying it becomes compressed, such that the pressure temporarily present in the plasma treatment zone (created by the RF wave field 574) is raised to well above atmospheric pressure. Further, as the CB material stream 150 exits the plasma treatment conduit 576, it enters a further pressure-increasing reduction area, i.e., in the form of the reducer outlet tube 582. That is, the cross-sectional size reduction in outlet tube 582 has the effect of creating yet a further pressure increase, i.e., back pressure, within the plasma treatment zone. These various pressure increases, coupled with the pressurized air inflows via nozzles 578, collectively combine to temporarily create a pressurized plasma work zone within the treatment conduit 576, i.e., a pressurized, plasma processing zone at least about the length of the radio frequency wave field 574 (see elongated metallic transducer array 584).

The pressures temporarily reached within treatment conduit 576 are projected to be in the range of from at least about one and one-half to two and a half times atmospheric pressure, or in the range from about 1140 Torr to about 1900 Torr, i.e., about 22.05 psi to about 36.75 psi.

Separately, if desired, and for some CB source materials that are more easily disrupted, and where the needed high throughput process speeds through the plasma type ED unit can still be maintained, the plasma ED unit 570 could be operated without the presence of/be pressurized air nozzles 578. In that case, the plasma wave field created within the air present within the CB material stream 150 in the treatment conduit 576 will likely operate closer to from about one to about one and a half times atmospheric pressure, i.e., from about 760 Torr to about 1140 Torr, i.e., 14.7 psi to about 22.05 psi.

With such a pressurized plasma type ED unit 570, the intense plasma energy field generated within the plasma treatment conduit 576 operates to break down the air around the CB materials and create disruptive ions, thereby providing significant energy bonds to disrupt the cellular and molecular structure of the CB material particles being processed, and at high throughput speeds.

The radio frequency generator would preferably operate within the range from about 10 MHz to about 300 MHz, and at a power range of within about 10 KW to about 100 KW.

Still a fifth exemplary form of an ED unit is an ultrasonic wave generator (see FIG. 4G1). This approach is best used with those CB source materials having relatively higher end moisture contents, e.g., paper pulp and sludge, forest slash, ensiled corn stover, and the like. That is, the CB material stream 154 being processed should have a moisture content of preferably at least 5%, and more preferably of at least 15%. With this sonification approach, the ultrasonic waves generated by the ultrasonic wave generating device would be directed to the CB fluff materials 154, creating numerous areas of intense localized destructive cavitation forces within the moisture fraction, which act to process the materials as they passed through the ultrasonic wave field, thereby causing further alteration and destruction of the LC bonds within the particles.

More specifically, with an ultrasound type ED unit 588, the sound acts to create a source of vibrational energy, which if at sufficient peak powers, provides significant destructive forces. In FIG. 4G2, a vibrational energy source in the form of piezoelectric transducers 590*a*, 590*b*, which direct ultrasound energy 592 into the treatment chamber 594. Preferably, the transducers 590*a*, 590*b* operate in a frequency range from about 20 kHz to 20 MHz, i.e., more than 20,000 vibrations/second, in a pulsed operating mode. A preferred operating frequency range is from about 25 kHz to about 2 MHz.

There are micro-mechanical shocks created through the formation and break-up of microscopic vapor bubbles in the liquid fraction portions of the CB materials being processed. In effect, the vibrational energy causes the molecules in the water to vibrate, which in turn causes bubbles to rapidly create and burst, which bursting then releases significant localized energy into the surrounding CB particles. These ongoing localized micro-mechanical shocks, via instantaneous pressure changes, cause cellular and molecular disruption within the CB material particles. Such localized minute pressure changes form and die out at ultrasonic speeds. Particularly useful are the unstable inertial cavitation forces so created, that tear apart and defibrate the CB particles. This ultrasound ED approach is performed at ambient temperatures. The ultrasound wave amplitude, and treatment time for a given volume of the CB material stream passing through the ultrasonic treatment zone, can be adjusted, depending on the type of CB material being treated and its moisture content.

Still a sixth exemplary form of an ED unit 596 comprises a gamma wave generator 598 (see FIG. 4H). With that approach, the gamma wave energy field 600 directed against the CB fluff particles 602, would cause the structural bonds within the same to resonate and break apart, thus causing further destruction and disruption of the LC bonds. The gamma wave field could be run steady state, but is preferably pulsed.

More specifically, as seen in FIG. 4H, the gamma wave irradiation type ED unit 596 is formed as a gamma wave generator 598 formed, into one wall of the CB treatment chamber 604, through which the CB material stream 602 passes (CB material is moving in a downward direction in the treatment chamber 604). The preferred gamma wave irradiation dosage is in the range from about $1.2 \times 10^8$ rads to $3.5 \times 10^8$ rads, and more preferably in the range about $2.0 \times 10^8$ rads to $3.0 \times 10^8$ rads. The effect of such gamma wave irradiation on the CB materials is to further disrupt the bonds holding together the cellulose, hemicellulose, and lignin components. Suitable safety shielding should surround such a gamma wave irradiation type ED unit.

Yet additional high intensity electrical force-generating systems will be known to those of skill in the art, as being able to supply the needed high intensity electrical degrading force (steady state or pulsed) necessary to operate as the ED unit of the present disclosure. Again, the need and intent for any such ED units is their ability to effect further significant degrading, e.g., disruptions via the applied high intensity electrical force, of the internal LC bonds at the cellular and molecular level within the CB particles being presented for processing, yet doing so at high process throughput speeds, and also without setting the fine and relatively dry particles afire. Also, the specific type of ED unit selected, and the power operating levels utilized for that ED unit, for a given pre-processing site will depend on such variables as the energy costs required to operate it; the non-uniform electrical characteristics present (e.g., due to the different sizes of CB particles, the intervening air spaces between CB particles, the varying moisture contents present, and the various different CB source material types present); the levels of negative differential impedances created during CB particle breakdown by a given type high intensity ED unit; dependent upon the type (and chemical makeup) of CB materials being processed, the force level needed to cause such further degrading; the ED unit's permitted process flow rates; the given ED unit's effectiveness at different moisture content ranges for the incoming CB fluff; capital equipment costs; a given ED unit's portability; the associated safety apparatus needed (e.g., any required shielding for a microwave energy field or gamma wave irradiation field); whether additional electrical energy is required (e.g., a combination microwave and acceleration approach) to drive a given ED unit; and so forth. Thus, no one ED unit is considered best, and each is understood to have its own advantages for given applications. (Again, to meet the high process tonnage rates needed within the present CB pre-processing system, it may be necessary to operate two or more ED units in parallel.)

In any event, no matter which type of ED unit is selected for use in the system of the present disclosure, the high intensity electrical degrading field created thereby is believed to be extremely disruptive to yet additional LC bonds and other micro structures remaining within the fine CB particles being processed through it. Stated another way, when the dried and pulverized CB particles pass through the given ED unit's high intensity energy field, including when performed at the high process rates contemplated herein, yet further substantial destruction of the LC bonds will occur whereby a large percentage of such bonds and structures are now degraded. Thereby, yet even more of the internal cellular and molecular structure of the CB fluff material has been advantageously altered and exposed for subsequent biorefinery processes. For example, and importantly, it is believed that the applied electrical degrading forces cause additional pores to be created, cell walls to be ruptured and defibration to occur, in the CB materials being processed.

At this stage of the first disclosed example, the now destructed CB material stream (from the PS materials) is ready to be fed via an ED outlet pipe 73 to a PS holding chamber 74 (see FIG. 2), either for removal to a nearby temporary storage 78 facility (e.g., silo or bin, not shown), or for subsequent direct biorefinery use 76 (in powder fluff form), or for further pre-treatment. It is expected that the degraded CB material, if it remains in its fluff powder form, will be somewhat difficult to handle on a high throughput large commercial scale, especially if needed to be placed in and conveyed by a bucket elevator or other such open-type material-handling conveyances. However, if such powder CB fluff were carted, trucked, auger-piped, pneumatically piped, transported through an enclosed conveyer, or otherwise transported (in a more closed-type material handling system) to a closely adjacent storage site or biorefinery site, e.g., the later being one that is integrally joined with, or co-located with or otherwise proximate to the present CB material pre-processing site, then the CB fluff, in that fine particulate form alone, could be suitable for direct biorefinery use.

It will be understood that the respective ED unit and EDP unit steps in the present process can be performed in reverse order, such as if for the given CB source material that is being processed, e.g., high moisture content raw or recycled CB source materials, it is found that even more of the LC bonds and other micro structures are better altered with such a reverse ordering of those process steps. This reversal of EDP and ED process steps may well be appropriate for higher moisture content CB particles. Alternatively, for certain CB source materials, only the EDP unit, or only the ED unit, will need to be used.

The other CB material streams, (e.g., SS, TS, and others), comprising different sources of CB materials, are similarly pre-treated. For example, a given SS stream might comprise sources such as urban wood chips, roadside bush thinnings, urban yard and wood waste, orchard prunings, forest residue, or a mixture of the same. In such case, and preferably performed offsite before arrival at the present pre-processing site, the incoming SS wood fragments (likely to include some bark portion, if the raw wood materials were not already debarked by a known debarking machine—not shown) would be initially pre-chopped and shredded (preferably size reduced offsite to an initial starter size range from approximately ½" to 1½"). If need be, this can also be done as an initial step at the pre-processing site, such as in an initial industrial-type shredder, grinder, or chipper (see tub grinder 162 in FIG. 5). In any event, such a pre-size reduced SS material stream 160 is run through a vibratory planar screen 164 (to remove non-CB debris), and across a magnetic roller 165, and then fed via the feed conveyor line 167 to the inlet 168 of the selected EDP unit 170 (see FIG. 5). Then, after being explosively dried and pulverized in the EDP unit, the resulting powdered wood CB fluff material is now partially dried to a preferred moisture content range of approximately 5% to 20%, and more preferably down to a range of approximately 10% to 15%. Also, the powdered wood fluff particles are reduced in size to a fine powder, preferably of approximately 35 mesh to approximately 90 mesh size, and more preferably of approximately 40 mesh to approximately 85 mesh. (If need be, and especially for SS stream materials comprising high lignin or resin content, or very tough wood crystalline fibers, e.g., softwood-based materials, or instead perhaps for yard waste, forest slash, bagasse, or other CB materials commonly having an extra high moisture content, such an SS stream exiting the EDP unit can be fed through yet a second EDP unit (of the same or different type) as installed in series, or instead, re-fed through the original EDP unit, for further explosive processing). In any event, the wood powder fluff material stream 173 then exits the outlet 172 of the EDP unit 170. At this stage of the present system, at least some large percentage of the LC bonds within the fine wood CB fluff particles have been disrupted and broken down at the cellular and molecular level, exposing substantial internal surface area and pores for further chemical, biological, and other bio-conversion reactions.

d) Air Classification

It is known that tree bark, being high in lignin, ash, and other undesirable components, and with little included sugars, is not well suited as a feedstock for efficient biorefinery use. Advantageously, if there is any significant percentage of bark fractions versus wood fractions present in the wood fragments (chips or other wood type materials) within the incoming SS stream, the bark 184 fractions can be substantially separated and removed by air classification processing from the material output stream 181 exiting the EDP unit 178, e.g., the bark fraction is separated from the wood fluff fraction. (See air classifier unit 182 located after the EDP unit 178, in FIG. 5.) With this approach, only the more desirable wood fluff fraction progresses to the SS holding chamber 192, while the separated bark fraction 184 becomes, in essence, an available byproduct of the present system and method, e.g., for pelleting as a biorefinery boiler burner fuel or for other use. Further, if needed, any excessive needle fraction (e.g. as with forest slash) can also be separated out via air classification.

Figure 5:
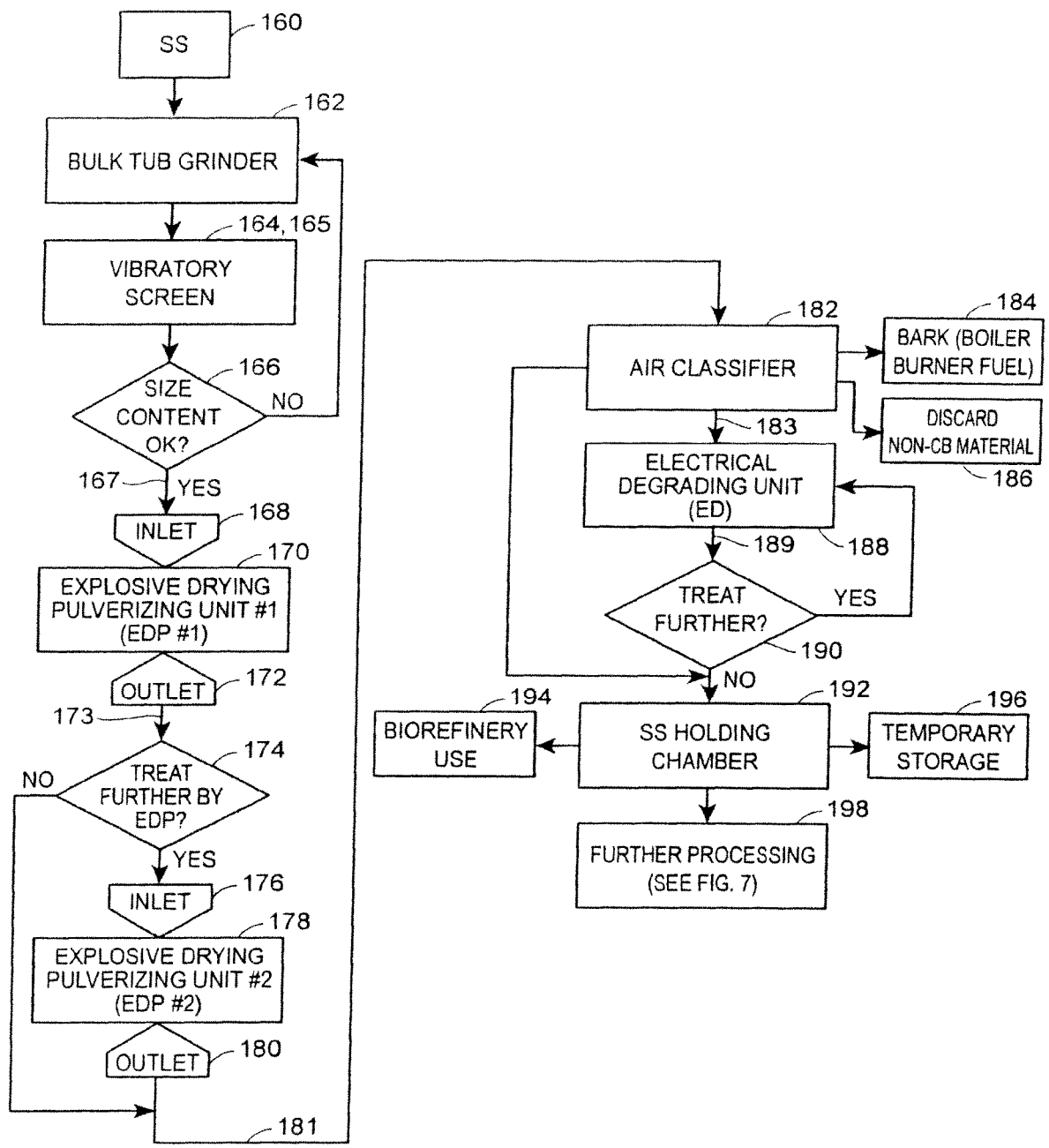
FIG. 5 is a combination block/flow diagram of an embodiment of a system and method specific to processing a secondary stream of cellulosic biomass according to the present disclosure.

From the air classifier 182, the now higher quality fine wood powder fluff fraction (of SS material stream 160) is delivered through an inlet pipe 183 to the electrical degrading energy field of the ED unit (see FIG. 5). Here again, the strong electrical energy force passing through the individual minute wood CB particles effects substantial further degradation i.e., physical destruction, to a majority of the remaining LC bonds. The electrically-degraded wood powder thus resulting is now expected to be even fluffier, with a large percentage of its lignocellulosic cellular structure finally broken down, or at least substantially disrupted. However, if need be, the resulting wood powder can be passed yet a second time through the ED unit, especially for hard-to-destruct softwood materials, or passed through yet a second ED unit (of the same or different type) operating in series. From there that further degraded fine particle wood fluff material stream 189 is fed into the SS holding chamber 192 (see FIG. 5), for subsequent pre-treatment and handling.

e) Fiberizer

Figure 6A:
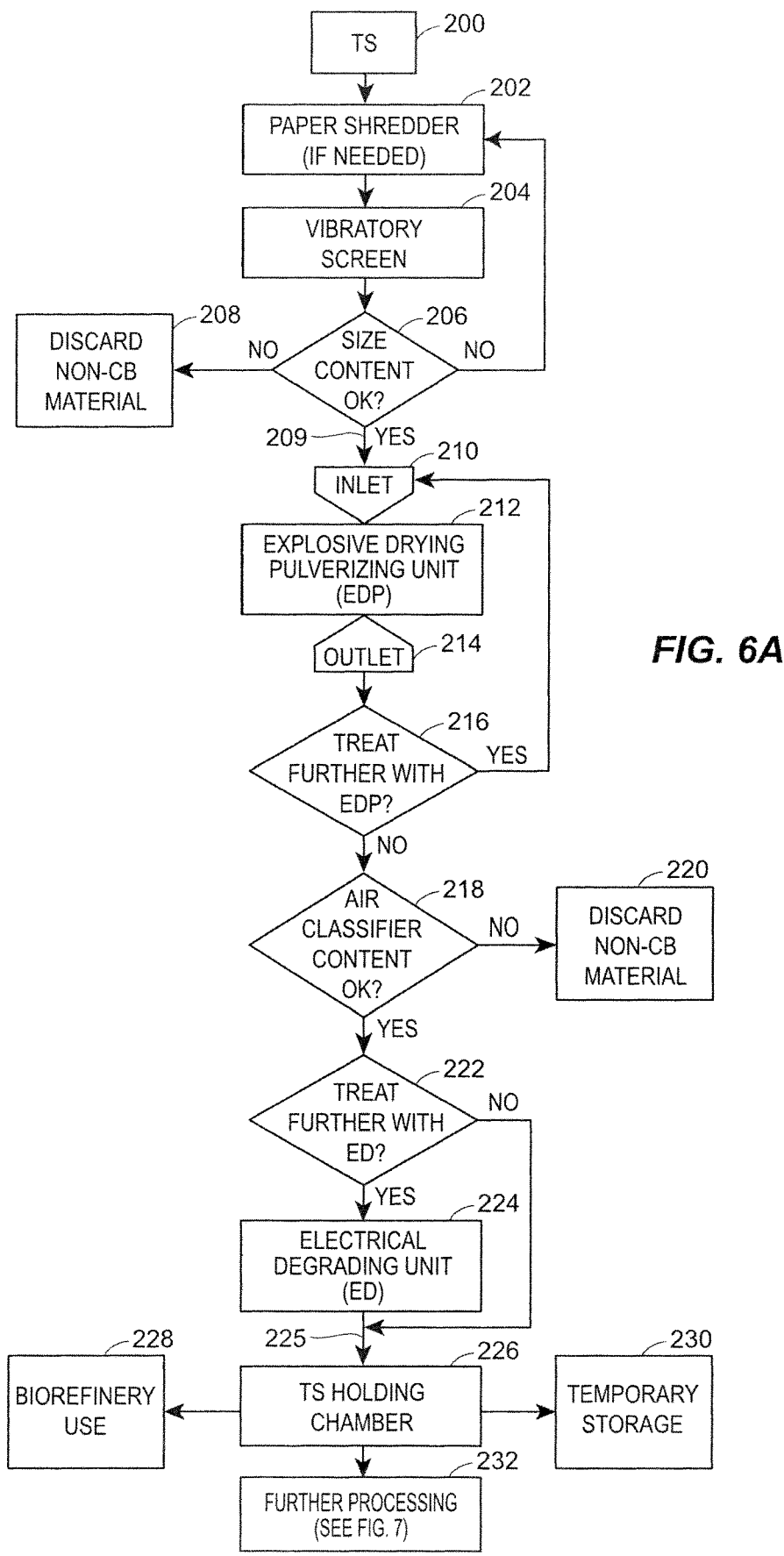
FIGS. 6A and 6B are block/flow diagrams of various embodiments of systems and methods specific to processing a tertiary stream of cellulosic biomass according to the present disclosure.
Figure 6B:
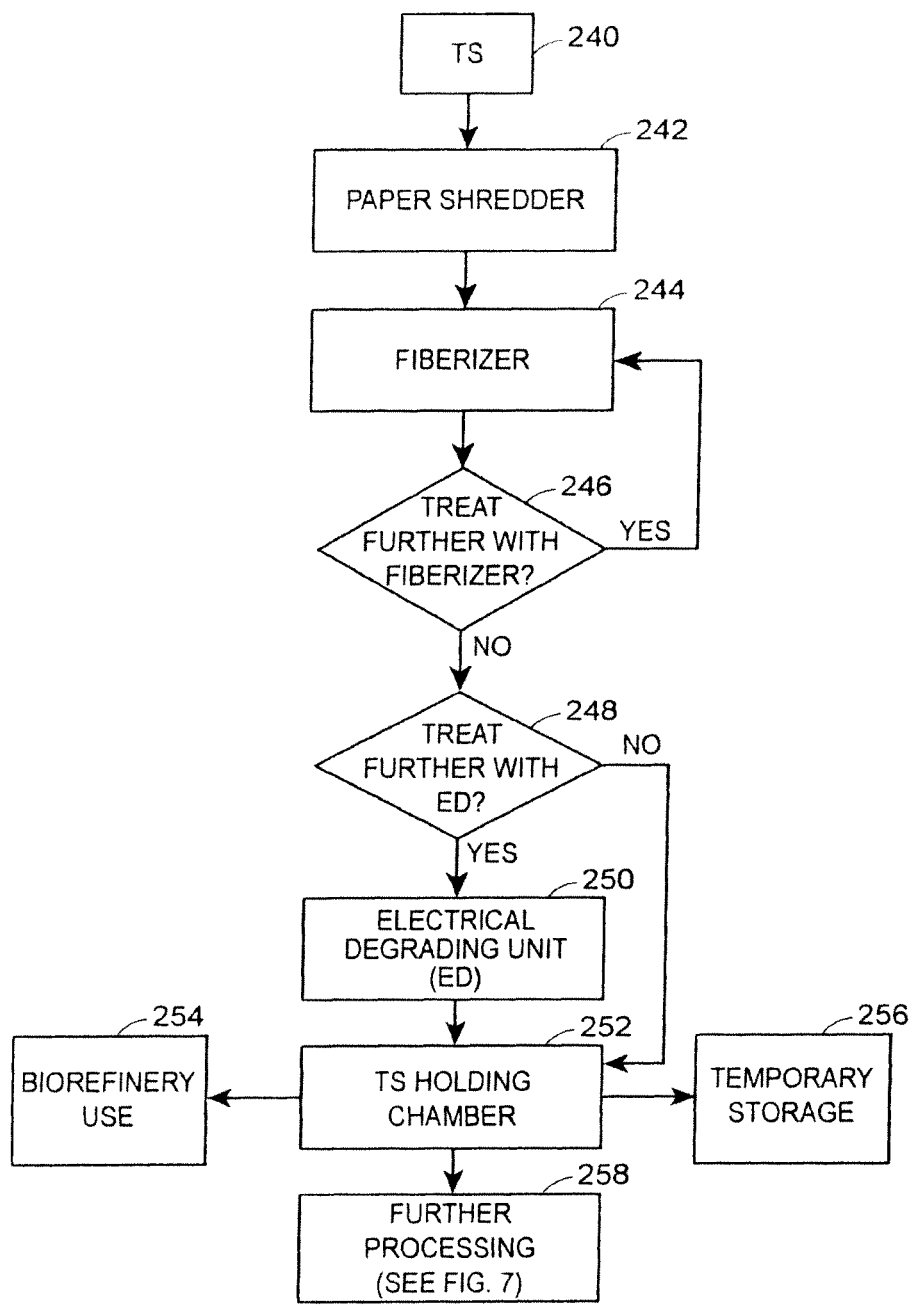

Next, the separate TS stream of CB materials could, for example, consist of pre-coarsely shredded recycled newsprint, coarsely ground recycled cardboard box material, or even the separated and shredded "contaminated" paper portion of the daily MWS, or any mixture of the same. Such a TS CB material stream may first require, for initial size reduction, shredding via a paper shredder machine (one suitable such high throughput paper shredder is made by the Williams Patent Crusher Company, of St. Louis). But, if no further initial size reduction is needed, such TS CB material stream is fed through a vibratory planar screen 204 (to remove large fraction non-CB debris, and through known magnetic roller devices—not shown, to remove unwanted metal debris), and then fed via the inlet feed pipe 209 to the inlet 210 of the EDP unit 212 (FIG. 6A). There, the recycled TS material is explosively dried (to any extent still needed) and pulverized, into a light fluffy powder of CB waste material. Importantly, such waste newsprint, cardboard, mixed and/or "contaminated" paper-type CB materials will have already been significantly chemically pre-treated, in effect, at the time such recycled cellulosic material was originally made into newsprint, cardboard, and paper. Thus, most of the lignin has already been removed, and most of the LC bonds within such waste-type CB materials should now be broken down, especially after passing through the EDP unit 212.

Figure 6C:
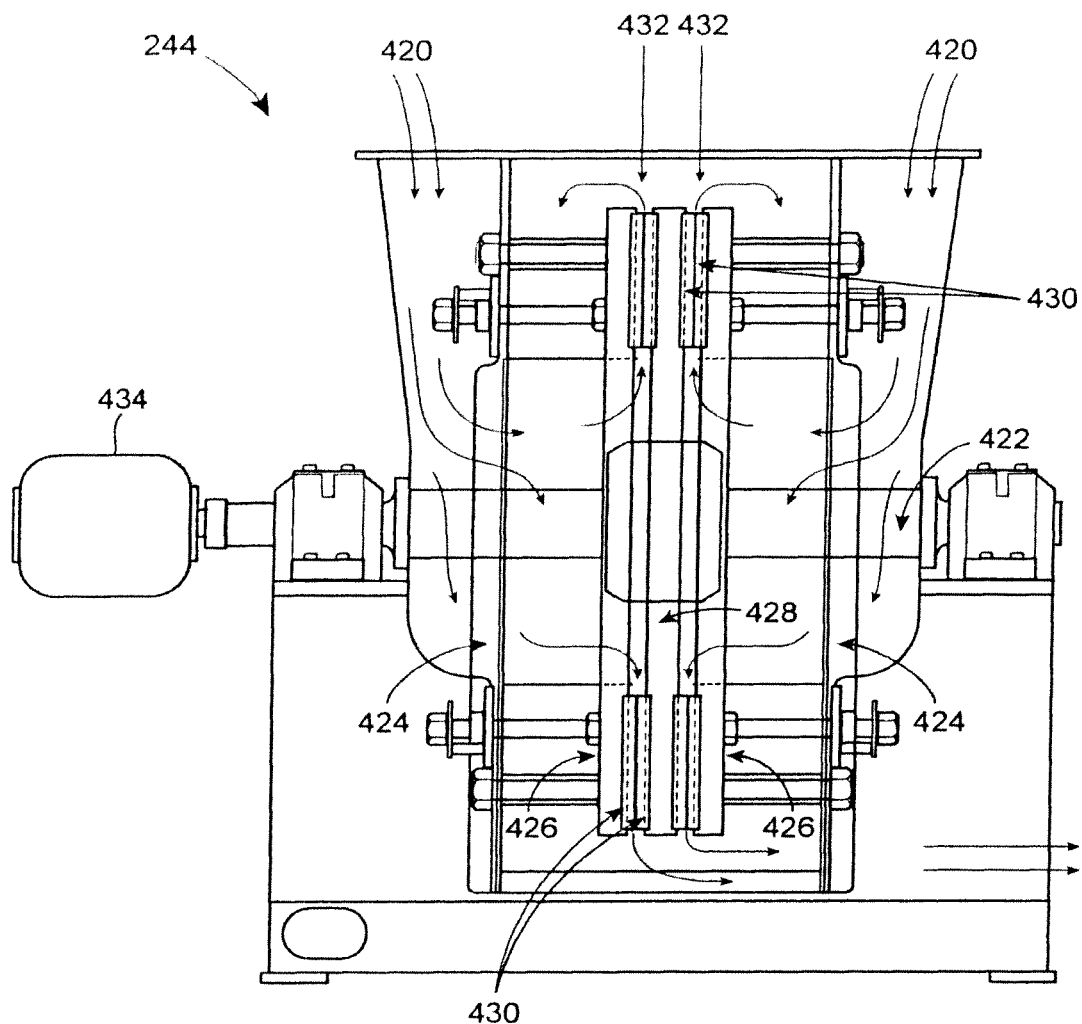
FIG. 6C illustrates one embodiment of a fiberizer device as utilized in connection with one embodiment the system and method of the present disclosure.

Alternatively, if already partially size-reduced, and instead of being processed through the EDP unit 212, the shredded waste cellulosic materials of the TS material stream can be passed through a so-called cellulose "fiberizer" machine (see fiberizer 244 in FIG. 6B), to substantially further size-reduce such cellulosic waste materials, preferably in the range of approximately ¼" to ½" or even less. Normally, fiberizer machines are operated on a "wet process" basis, such as when used in paper pulp making operations. However, as used in the present system and method, the preferred fiberizer unit here, also known as a disk attrition mill, is operated on a dry process basis. More specifically, one preferred form of fiberizer 244, as having lower power requirements relative to the amount of cellulose that can be processed, is depicted in FIG. 6C. It is called a "Therm-O-Quip"™ unit, as made by Reynolds Engineering & Equipment, Inc., of Muscatine, Iowa. That fiberizer 244 operates on the principal of feeding shredded, relatively dry large fraction cellulosic CB material into the twin inlets 420 through the top of fiberizer 244, where the cellulosic CB material then drops down to the shaft region 422. There, the CB material turns and enters through sleeves 424 which direct the material through large holes in the stationary plates 426 to the rotor 428. Impellers mounted on the rotor 428 direct the cellulosic CB material radially outward, where it passes through refining plates 430 mounted on both sides of the rotor 428 and on the inside surfaces of the stationary plates 426. As the dry cellulosic CB material passes through the refining plates 430, the cellulosic fibers are separated as they are rubbed and rolled between the refining plates 430. The gap 432 between the refining plates 430 is adjustable in order to produce cellulosic particles having desirable dimensions and integrity. High production rates can be achieved with low energy consumption with this particular "Therm-O-Quip" fiberizer unit, mainly because the two large fiberization zones (created within the gap 432 area between refining plates 430) are driven by a single motor 434. Yet another type fiberizer unit is made by Advanced Fiber Technology, Inc., of Cincinnati, Ohio (see U.S. Pat. Nos. 5,188,298 and RE 35,118, for a description of that type fiberizer unit, the teachings of which are incorporated herein by reference.)

It is anticipated that with this type of shredded waste cellulose TS source materials, that there may be no need to electrically degrade the same, via the ED unit 224. However, a second pass of the TS material stream through the EDP unit 212 (or through a second EDP unit in series, or through a fiberizer 244 unit) may be needed, especially if the recycled TS stream comprises a large amount of heavy duty cardboard. Further, depending upon the source type involved, some such recycled cellulosic TS materials may need the secondary LC bond destruction process (as provided by the ED unit's electrical energy field), so as to sufficiently degrade and break down the remaining LC bonds. In any event, once explosively dried and pulverized via the EDP unit 212 (and/or as processed by the fiberizer unit 224), and then, if needed, as also secondarily treated by the high intensity electrical field forces of the ED unit 224, the fine fluff TS material stream is fed through the ED outlet pipe 225 to a TS holding chamber 226, for further pre-treatment and handling.

f) Blending of CB Materials

It will be understood that a given biorefinery customer (for the pre-treated CB feedstock product produced pursuant to the present system and method), whether for processing, equipment, location, or other reasons, may be willing to pay extra for and demand delivery of only a "single CB feedstock" type product. That is, the biorefinery may need one that is created from only a single type of raw or recycled CB source material. For example, one given stand-alone (or co-located or co-joined) pre-processing site as contemplated hereunder may literally process only one type of CB material. In that case, the single incoming CB source material, for example, might be solely corn stover, solely an energy grass, solely cereal straw, solely wood chips, or solely the separated cellulosic portion of the daily MSW stream. On the other hand, a different biorefinery customer might wish to receive, whether for price or other reason, perhaps a lower-cost "blended CB feedstock" product, e.g., one formed from different CB source materials (but preferably all having generally similar chemical make-ups). Such a blended CB feedstock product itself might even vary on a daily weekly or seasonal basis, e.g., depending on lowest market price or local availability for given CB source materials. Advantageously, the present system can be customized to provide any of the above types of CB feedstock product blends, including even any specialized "custom blends" of CB feedstock product, i.e., as formed from different incoming CB source materials. Advantageously, chemical composition scanners, such as suitable spectrometer units (see the spectrometer unit 296 illustrated in FIG. 7), can be used in conjunction with any or all of the holding chambers 272, 274, 276 and 278, as well as with the main mixing/blending tank 280. Such a spectrometer unit 296 (for example, a near infrared or so-called NIR spectrometer unit) can provide real time measurement of the respective chemical make-up within the pulverized CB materials in such chambers and tanks, to thereby permit real time adjustments and correct blending of the various CB source materials as desired to achieve CB feedstock product uniformity. Such chemical make-up screening can identify the respective percentage contents of cellulose, hemicellulose, lignin, silica, sugars, specific gravities and so forth.

Preferably, as best able the presently contemplated pre-processing operator of the present system would normally seek to blend CB source materials that contain generally similar (i.e., chemical) lignocellulosic structural make-ups, i.e., ones having relatively similar types and percentage makeups of lignin, cellulose, and hemi-cellulose, and even similar types of hemicellulose. This can be controlled via response to readings taken by the spectrometer units 296. It is also conceivable that, throughout a given year, the various blends of CB source materials, as produced by the present method, could well vary from one another as based on the seasonality, market price, availability, quality, moisture content, transportation costs (e.g., origination distance), storage capacity, weather-created damage, and other variables for incoming CB product streams (e.g., PS, SS, TS, and even yet other types of CB source streams). For example, due to cost pressures, it may become a reality to regularly vary the daily blend of PS, SS, and TS incoming CB material streams. That is, one biorefinery customer may desire a feedstock pellet that is formulated 100% with PS cellulosic biomass material; a second biorefinery customer may wish (f)r price, bio-conversion process, equipment, or other reasons) a feedstock pellet that is formed of say, 60% PS material and 40% SS material, while a third biorefinery customer instead (based on price, transportation costs, ability of processing equipment to handle varying chemical make-ups, or even other reasons) may be willing to receive a feedstock pellet that varies and is formed of essentially any combination of PS, SS and TS materials, as long as it, for example, contains a substantial amount of (the normally cheaper and already pre-treated) TS material.

Figure 7:
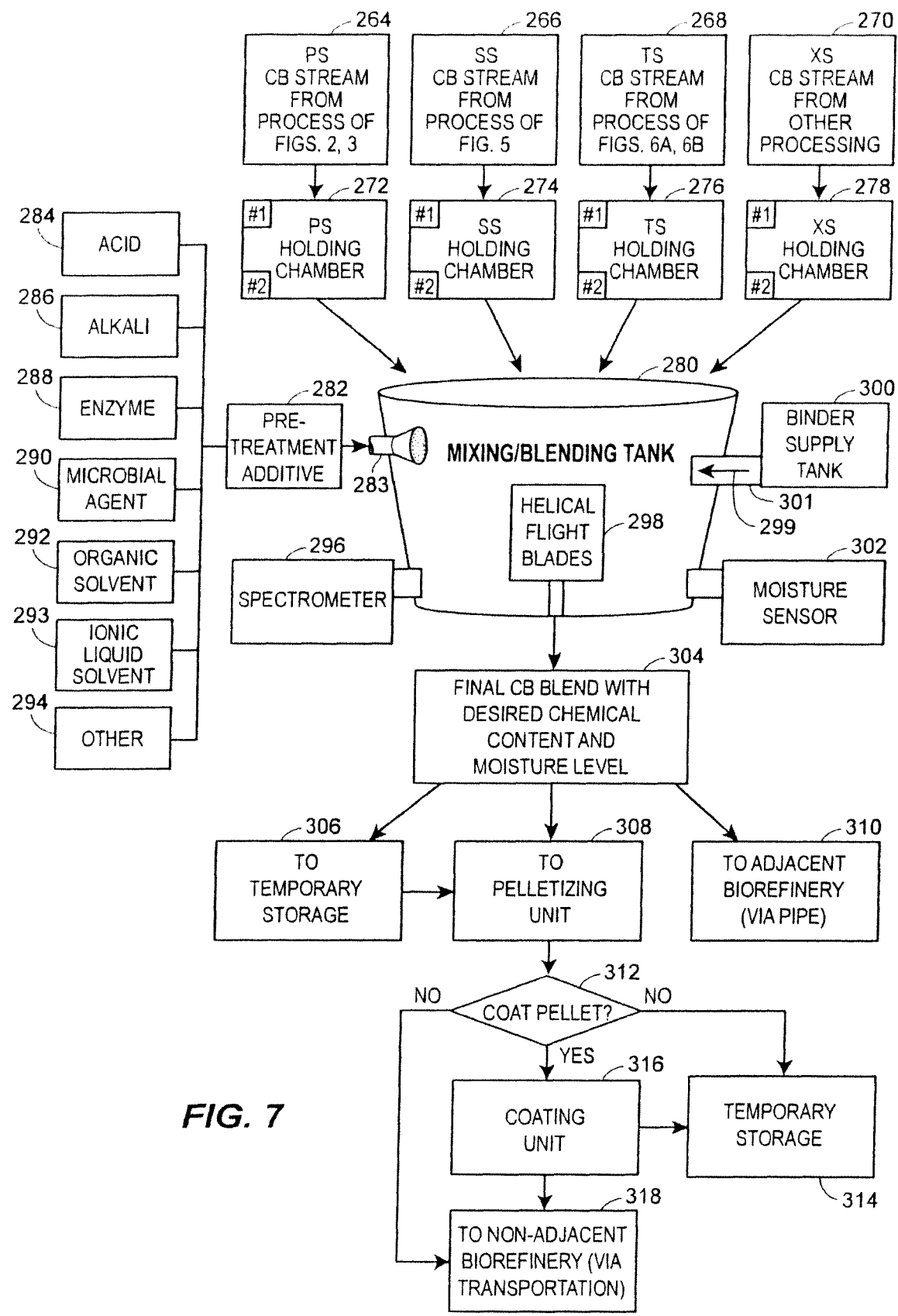
FIG. 7 is a combination, detailed block/flow diagram of a system and method for processing cellulosic biomass according to the present disclosure.

Thus, per FIG. 7, depending on the CB feedstock "blend" being made hereunder on a given day, or by a given pre-processing site, varying pre-selected percentages (by weight) of the powdery fluff-like contents from two or more of the respective holding chambers 272, 274, 276, and 278 are released into the mixing/blending tank 280. There, such as with helical flight mixing blades 298 (or a screw augers or other mixing apparatus, not shown) as operating within the main mixing/blending tank 280, the previously separate types of pulverized CB fluff materials are now uniformly mixed and blended together. Again, one or more spectrometer units can be used to sense the chemical make-up in holding chambers 272, 274, 276, and 278, and of the blended CB materials in tank 280 (see NIR spectrometer 296 in FIG. 7), and thereby permit real-time adjustment to achieve a uniform consistent CB fluff blend product.

At this stage, the blended fluff CB material within mixing/blending tank 280 will start to reach a uniform moisture content, preferably in a range of approximately 5% to 20%, and more preferably of approximately 10% to 15%, as blended from the moisture contents of the various separate CB streams. Advantageously, moisture sensor units 302 (see FIG. 7) can be used with the holding chambers 272, 274, 276, and 278, and with the main mixing/blending tank 280, to record and provide live moisture content readings to the system operators, thereby allowing real-time adjustments to be made to achieve a desired and pre-selected moisture content level for the final CB fluff blend, if any.

At this point in the present process, the CB fluff blend can be temporarily housed in storage bins or silos (not shown) for future use and/or later biorefinery pre-treatment. Alternatively, if the pre-processing site is co-located next to, or integrally formed within, a biorefinery, then such mixed CB fluff material (from mixing/blending tank 280) can be transported (again preferably transported within an enclosed material-handling system, e.g., high-speed pneumatic piping system) direct to the biorefinery's initial processing station (not shown). However, if perhaps the CB feedstock will need to be transported over longer distances, or stored for any length of time, or if a given biorefinery might desire yet a further pre-processed, value-added CB feedstock (e.g., to minimize that biorefinery's equipment or dedicated pre-treatment process steps so as to handle a given CB-type feedstock, or to help further speed up their bio-conversion process times), then yet further pre-processing of the CB fluff material is contemplated by the present system and method. Such further process steps will now be described. They, may include an acid pre-treatment, an alkaline pre-treatment, a moisture pre-treatment, an enzyme pre-treatment, a microbial pre-treatment, a solvent pre-treatment, treatment with a binder, pelletizing, or any other desired pretreatment.

g) Acid Pre-Treatment

For example, a suitable dilute acid material, preferably a dilute sulfuric acid at ambient temperature and pressure, or if desired by a given biorefinery customer, another pre-specified type of dilute acid 284 to match their specific pre-treatment process, can be applied to the CB fluff material within the mixing/blending tank 280, such as by a multi-nozzle sprayer arm 283. The contact of the dilute acid 284 with individual minute CB fluff particles, even though occurring only at ambient temperature and pressure, and at a dilute concentration, is believed to commence an active ongoing slow acid hydrolysis of the now broken-down LC bonds and other micro structures and through the open pores therein. This creates, in effect, an ambient temperature and pressure "encapsulated steeping", whereby the dilute acid continues to be active up until the point of the CB feedstock's use at the biorefinery, i.e., for the CB feedstock's entire lifetime until final use. Other dilute acids suitable for use with such CB fluff include other mineral acids, such as hydrochloric, phosphoric, nitric, and carbonic acid. Less suitable, but still usable, dilute acids include organic acids such as acetic, maelic, lactic, oxalic, and succinic acid. Also, it may be determined that, in effect, and depending on what CB source materials are being processed, a mixture of two or more such dilute acids may be used.

In any event, the inclusion of such a dilute acid 284 provides yet another pre-treatment of the CB source material particles, but here chemical, instead of physical (i.e., mechanical and explosive) and electrical. Preferably, the dilute acid 284 applied in mixing/blending tank 280 is a low concentration aqueous solution, having about 0.3% to 2.0% (by weight) of neat acid. The dilute acid 284, by weight, relative to the dry weight of the CB fluff material, would preferably be in the range from approximately 1% to 20%. The goal is to apply a sufficient amount of the dilute acid 284 to start the mild acid hydrolysis, yet not over-wet the CB fluff material with acid, especially to the extent that it might then prevent a subsequently applied binder to form a suitable compressible mixture. It is also a goal not to add so much dilute acid 284 as to cause more harm than good to the CB materials at this stage, e.g., by prematurely converting the CB materials or damaging the sugars. In any event, besides operating to further destruct the LC bonds, the addition of the dilute acid 284 will cause a general uniform wetting of the minute CB fluff particles, and thus a slight compaction thereof.

h) Alkaline Pre-Treatment

Yet further, a given biorefinery may be instead using an alkali hydrolysis process. Thus, instead of using a dilute acid 284, a dilute alkaline solution 286 (e.g., ammonia) can be applied to the CB material in mixing/blending tank 280, to continue the LC bonds disruption regime. The dilute alkaline solution 286 preferably has a concentration comparable to the above described dilute acid solution. Further, the dilute alkaline solution 286 is preferably added in amounts relative to the dry weight of the CB fluff material also comparable to the above-described dilute acid solution.

Also, by taking real-time spectrometer readings of the chemical make-up of the blended CB fluff in main mixing/blending tank 280, the dilution strength and weight concentration, of the dilute acid 284 (or alkaline solution 286) can be slightly adjusted in real time, so that each portion of the process stream of pre-treated CB fluff, and hence, the resultant CB feedstock (pellets or fluff) contains the needed proper amount of dilute acid 284 or alkali solution 286 for the specific blend type of CB material then present, and so that too much acid (or alkaline solution) is not applied.

i) Moisture Content

It will be understood that some biorefineries, due to the special requirements of their respective hydrolysis-type bio-fuel, e.g., cellulosic ethanol, conversion process systems, and the pre-treating equipment set-ups they employ, or for spontaneous combustion prevention reasons during storage, will require the incoming CB feedstock powder fluff (or pellet) to be at least at, below or above a specified moisture content percentage. Again, many biorefineries may well desire it to be the equilibrium moisture content of raw CB materials, e.g., in the 10% to 15% range, or at least not below the same (as it is anticipated they will likely not want to pay for any drying energy later rendered potentially moot by the CB feedstock's rehydrating to that equilibrium moisture content). Thus, to accommodate such CB feedstock desired moisture contents, whatever it may be, the process feed rate through the EDP unit 56, 118, 170, 178, 212 of the present method can be adjusted (e.g., speeded up or slowed back) to achieve such a pre-selected final moisture content. That is, to achieve a higher moisture content in the resultant CB feedstock pellet, a faster EDP unit process feed rate though the EDP unit can be utilized, whereas for a lower moisture content, a slower EDP process feed rate can be used. Alternatively, and particularly where they comprise high moisture contents, e.g., forest slash or bagasse, the incoming CB materials can be recycled, that is, processed a second time, in the EDP unit or processed through a second EDP unit operating in series, to yet further reduce their moisture content to a final desired level, if important to a given biorefinery customer.

Alternatively, assuming the intended lignocellulosic and chemical make-ups of the different CB source materials being blended within mixing/blending tank 280 are (preferably) relatively compatible, the final desired moisture content of the CB feedstock product (whether powdered fluff mix or pellet) can be established by custom blending two or more different CB source materials, each having differing moisture contents. Even further, the moisture content of the final CB feedstock pellet can be selectively adjusted (if needed) by varying the added amount and concentration of the applied pre-treatment dilute alkaline solution or acid, e.g., dilute sulfuric acid, or by additional water. The moisture sensors 302 monitor and provide real-time measurements of the final CB feedstock pellet (or fluff) to help assure uniformity.

As an alternate embodiment, it will be understood that some biorefineries may prefer to receive a CB feedstock product (whether in fluff or pellet form) that does not contain any type of dilute acid (or dilute alkaline solution). In that case, the above-described dilute chemical application step can be omitted, and the CB fluff material then simply proceeds to the next step, whether that is temporary storage in fluff form (e.g., in bins or silos, not shown), or instead, mixture with a suitable binder material 299 from binder supply tank 300 (if needed), and formation into a CB feedstock pellet 342, 344, 346, 348 (as described below).

j) Enzyme Pre-Treatment

Also, there is yet an additional pre-treatment step, that can be used in lieu of, or in addition to, the application of a dilute acid 284 (or alkaline solution 286) with the present system. That is, a suitable hydrolytic enzyme material 288 can be added to the powder CB fluff in the mixing/blending tank 280, and mixed via helical flight mixing blades 298. If tolerant of the same, the enzyme 288 can be added with, before or after the dilute acid 284 (or alkaline solution 286). That way, once the binder 300 is added, the enzyme 288 and binder-containing mixture (and any dilute acid or alkali present) can be pelletized and coated. Then, for whatever is the lifetime of the pellet, the enzyme 288 present within the coated pellet slowly acts to start helping enzymatically hydrolyze the fractured LC bonds and other micro structures within each CB particle. Depending on which enzyme is so added to the CB fluff, the enzyme 288 can work on the lignin, the cellulose, the hemi-cellulose, or any combination thereof. Even a specially formulated "mixture" of two or more such enzymes could be used. The addition of an enzyme 288, in lieu of or in addition to a dilute acid 284 (or alkaline solutions 286), may be particularly suited for use with recycled cellulosic-containing waste CB materials, i.e., where many of the LC bonds are already broken down.

Examples of enzymes that may be suitable for use in the present system and method are any of the class of cellulase complex, exo and endoglucanase, cellobiase, hemi-cellulase, pectinases, depolymerases, glucosidase, and other cellulose-degrading enzymes (see for example U.S. Publication No. US 2002/0062502, for a listing of many such enzymes, the teachings of which are incorporated herein by reference). The enzyme 288 could be intended to hydrolyze lignin, so a suitable enzyme may be lignase or lignin peroxidase. Yet other enzymes may include manganese peroxidase, xylanase, amylase, protease, lucanase, chitinase, glycosyl hydrolase, and lipase. It will be understood that the specific enzyme chosen to add into the CB fluff will be dependent on the chemical and structural make-up of the given CB fluff being processed, the specific internal component(s) thereof sought to be further processed by the added enzyme, the CB fluff material's moisture content, the enzyme's effectiveness at ambient temperatures and pressures, the enzyme's relative costs, the enzyme's strength, and of course, the commercial requirements, e.g., specific processing needs, of the given biorefinery that will utilize such enzyme pre-treated CB material. A mixture of two or more such enzymes can be added, e.g., of cellulase and hemi-cellulase type enzymes.

k) Microbial Agent Pre-Treatment

Alternatively, in lieu of or in addition to either or both of the dilute acid 284 (or alkaline solution 286) and any enzyme 288, and further, depending on how ready the blended powdered CB fluff is for bio-conversion and on the CB fluff material's moisture content, a dilute dosage of a microbial agent 290 could be added to the CB fluff material in the mixing/blending tank 280. Such a microbial agent might include a dilute recombinant fermenting organism, a yeast strain such as a *Saccharomyces cerevisiale* yeast, a transgenic fungus, or a *Clostridium thermocellum* bacterium. Other microbial agents include *Fusarium oxysporum, C. cellulolyticum, C. thermolydrosulfuricum,* and *Thermoanaerofacter ethanoliticus*. A bacteria used in butanol production is *clostridium acetobutylioum*. (See WO 2007/019505 A2, for a description of many such microbial agents, the teachings of which are incorporated herein by reference.) Yet even other known suitable microbial agents could be used, for different bio-conversion processes, with all starting to slowly act on the degraded CB materials (fluff or pellet form).

l) Solvent Pre-Treatment

Further yet, in lieu or in addition to any or all of a dilute acid 284, dilute alkaine solution 286, enzyme 288, or microbial agent 290, yet a further pre-treatment material of a solvent nature could be added to the CB fluff material, i.e., when the subsequent specific biorefinery processes call for the same. One such suitable solvent material is a dilute organic solvent material 292. Such an organic solvent, as diluted with water, could comprise ethanol as catalyzed by a sulfuric acid. Other suitable organic solvents comprise methanol with an acid catalyst, and acetone with a phosphoric acid catalyst. Yet other suitable solvents could include n-proponol, isoproponol, other low molecular weight alcohols, glycols or ketones, and combinations thereof. The added dilute organic solvent 292 could be a 50% solvent/50% water concentration, with sufficient acid added to adjust the pH to approximately 2.4 at ambient temperature. The organic solvent could be added to the CB fluff, on a weight basis, similar to the dilute acid 284 or dilute alkaline solution 286 pre-treatment materials discussed above. The related solvent pre-treatment process, as could be later used on a commercial scale at a biorefinery, and as considered particularly suitable for softwood type CB materials, is known as the "Organosolv", "clean fractionization", or "solvent delignification" process. (See WO 2007/019505 A2; "Bioconversion of Hybrid Poplar to Ethanol and Co-Products Using an Organosolv Fractionation Process: Optimization of Process Yields", X. Pau et al., Biotechnology and Bioengineering, Vol. 94, No. 5, page 851, Aug. 5, 2006; and "Update on Softwood-to-Ethanol Process Development", W. Mabee et al., Applied Biochemistry and Biotechnology, Vol. 129-132, pg. 55, 2006, for a description of a solvent/pre-treatment process for biomass materials, and for suitable organic solvents and catalyst acids, the teachings of which are incorporated herein by reference.)

In lieu of using a dilute organic solvent, there is also a biorefinery pre-treatment process that uses an ionic liquid, sometimes known as a molten salt, type solvent. Thus, for example, an ionic liquid solvent material 293 (FIG. 7) can be used as an additive to blending tank 280. Suitable ionic liquid solvents, particularly ones here for use as a room temperature (and ambient pressure) ionic liquid, include those containing 1-butyl-3-methylimidazolium cations ([Cymin]$^+$, 1-ethyl-3-methylimidazolium, and 1-allkyl-methylimidazolium with anions preferably smaller, hydrogen and acceptors (Cl$^-$). Other examples, for use in the present system, are [C$_4$min]Cl and the longer chain-substituted ionic liquids ([C$_6$min]Cl and [C$_8$min]Cl). Others, for use as ionic liquid compounds, include alkylammonium, pyridium, and imidozlium compounds. Even other known room temperature ionic liquids can be used. The ionic liquids would be added, on a weight basis, similar to the organic solvents mentioned above. Preferably, when an ionic liquid solvent is being used, the moisture content of the CB fluff material within blending tank 280 is no more than 10% and preferably less. (See U.S. Pat. No. 6,824,599; US 2003/0157351; WO 2008/043837, for a detailed description of an ionic liquid solvent pre-treatment process, and for suitable ionic liquid solvents, the teachings of which are incorporated herein by reference.)

m) Binder

Then, as a next step, i.e., after the introduction (or not) of any or all of a suitable dilute acid 284, dilute alkaline solution 286, hydrolytic enzyme 288, microbial agent 290, organic solvent 292, or ionic liquid solvent 293, and then if needed fora given CB material fluff or blend, a suitable binder material 299 can be fed into the CB fluff contents within the mixing/blending tank 280, via a binder feed pipe 301 from a binder supply tank 300. The binder material 299 is preferably used, because it is believed that the following potential waxy and adhesive binder-like substances, as naturally present within most cellulosic biomass materials, are likely not present in sufficient quantity to properly bind the minute CB fluff particles during pelletizing: protein, lignin, pectin, and protoplasms (although in given CB fluff blends, they actually may be). Also, the chemical make-up of the added binder material 299 is preferably one that will be able to be quickly broken down and decomposed later, both physically and chemically, in the biorefinery's CB biofuel conversion and other bio-byproduct processes, and without then adversely affecting the same. Depending on the future biorefinery's needs, such a binder material 299 could comprise any one (or combination) of a wet starch mix, colloids, calcium, lignosulfonate, bentonite, proteins, calcium hydroxide, hydrated lime, pea starch, or molasses, among others. It could even include an ethanol-enhancing, enzyme-containing binder, using one or more of the enzymes discussed above. Whatever binder material 299 is used, the binder must be compatible with and stand up to (that is, not be attackable and compromised by) the dilute acid 284 (and/or any alkaline solution 286, enzyme 288, microbial agent 290, organic solvent 292, or ionic liquid solvent 293) that is already present and mixed into the CB fluff material. The binder will preferably be added in an amount in the range of approximately 1% to approximately 12% by weight, more preferably of approximately 2% to approximately 8% by weight, and still more preferably of approximately 2.5% by weight, relative to the dry weight of the CB fluff material. Inclusion of the binder material 299 causes the CB fluff and acid 284 (and/or alkali 286, enzyme 288, microbial agent 290, organic solvent 292, or ionic liquid solvent 293) mix to become yet a further semi-moist and compressible mixture. However, addition of the binder material 299 does not affect the many now destructed LC bonds and other micro structures present within the mixed CB materials. Rather, the binder material 299 merely acts to temporarily hold the individual fine degraded powder-like CB particles together into a pellet.

n) Pelletizing

Figure 8:
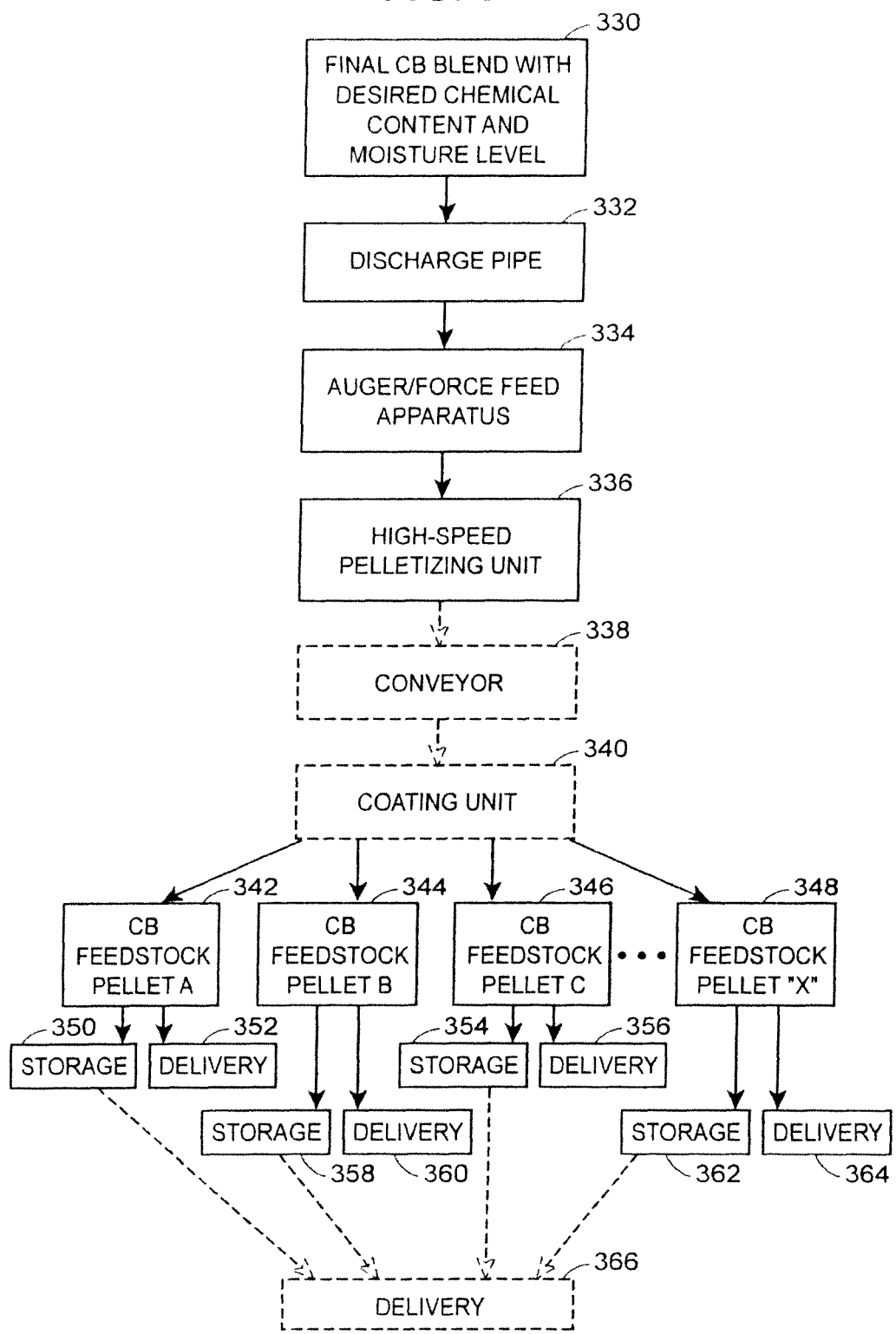
FIG. 8 is a combination block/flow diagram of one embodiment of a system and method for finally preparing and delivering processed cellulosic biomass according to the present disclosure.

Next, after thorough mixing by the helical flight mixing blades 298 (FIG. 7), the compressible mixture of CB fluff, any added acid (and/or alkaline solution, enzyme, microbial agent, or solvent), and any added binder (collectively comprising the final CB blend 330 with its pre-selected desired chemical content and moisture level) is forced under pressue through a discharge pipe 332, via an auger 334 (see FIG. 8, or through any similar force feed apparatus) to a high-speed pelletizing unit 336. The latter is preferably a known high-speed, rotary, open-die type pelletizing unit. There, the compressible CB mixture 330 is pressed into appropriately sized, uniform, relatively small pellets, e.g., for flowability. These pellets can be formed into any of a log or cylinder, a Out disk, elongate pill, dog bone, or other shape. For example, such CB feedstock pellets could be formed by a high speed rotary pelletizing unit as generally round logs which are approximately ½" in diameter by approximately 2" in length. Alternatively, using different well-known equipment, they can be formed as briquettes or cubes of generally similar or larger volume. The goal with the pelletizing step is to form, at high throughput speeds, the final pre-selected mixture of degraded CB fluff particles, any added acid 284 (and/or alkaline slution solution 286, enzyme 288, microbial agent 290, or solvent 292/293), and any added binder 299, into a uniform-sized, flowable, high energy density, uniform moisture content type CB feedstock product. Again, it will be understood that the resultant CB feedstock pellet could be formed simply with a binder 299, and without including any dilute acid 284, alkaline solution 286, enzyme 288, microbial agent 290, or solvent-type 292/293 pre-treating component. The CB feedstock pellet (or briquette or cube) could even be formed without any binder 299.

o) Coating

Then, as a potential next step, but only if needed, the CB feedstock pellets 342, 344, 346, 348 may be transported from the high-speed pelletizing unit 336 by a conveyor 338 (FIG. 8) to a coating unit 340. There, each pellet 342, 344, 346, 348 may be covered with a suitable coating material to fully encapsulate the pellet (or briquette or cube). This encapsulation coating further creates and contains, in effect, a miniaturized acid (and/or alkaline solution, enzyme, microbial agent, and solvent)—containing hydrolysis process operation (again, in effect, an "encapsulated steeping") on the degraded CB fluff particles within each pellet. The coating layer needs to be formed of a suitable coating material that is not attacked by, i.e., remains impervious to, and then also, itself does not compromise the effect of, any dilute acid (or alkali, enzyme, microbial agent, or solvent) within the pellet. The coating material also has to be one that is readily dissolvable, at elevated processing temperatures, within the biorefinery. Such a coating material could comprise, for example, a starch material, or one of the above-noted binder materials. It will be understood however that, if desired, the coating step can be eliminated. Use of any coating, and the type of coating, is dependent on many factors, such as the anticipated pellet lifetime until biorefinery use, any need to limit evaporation loss (or gain) of the included moisture content, the severity of any added acid, alkaline solution or solvent (e.g., to storage containers and material handling machinery), the need for a coating to help minimize pellet breakage and damage, any material handling lubricity needs (e.g., to increase pellet flowability), the need to prevent any future pellet decay, and so forth.

If needed, so as to differentiate the various types (e.g., of CB source material, sugar, chemical make-up, specific gravity, or moisture content, for example) of CB feedstock pellets made by a CB pre-processor, the color of the coating material could be varied. For example, a CB feedstock pellet made hereunder as comprising 100% corn stover could be clear-coated; a pellet formed hereunder of approximately 60% corn stover and 40% softwood wood chips could be red; while a pellet formed hereunder of approximately 50% urban yard waste and 50% recycled cellulosic containing separated MDW components could be blue. Alternatively, for purposes of pellet differentiation and identification, the different CB source material or chemical make-ups of given pellets made hereunder could be formed into different pellet shapes, e.g., by changing the shapes of the pellet-forming dies within the pelletizer unit 336. As to yet further alternatives, the pellets can be differentiated by varying the size and/or by adding surface indicia (e.g., graphics or other marker symbols, such as sprayed-on spots or stripes).

With such pelletizing, and any coating, what originally randomly began as different ages, sizes, shapes, moisture contents, qualities, chemical compositions, and source types of CB materials, results in a blended CB feedstock pellet that is easily handled, since it is readily flowable, by commonly used open-type material-handling equipment found at biorefineries. Such equipment can include conveyors, shaker belts, screw augers, live bottom silos, screens, elevator buckets, live bottom feeder troughs, delivery piping, and the like. Also, such flowable CB feedstock pellets allow for cost-efficient and easy loading and transportation, via tanker railcar, tanker trucks, hopper car, barge, and the like, as well as for easy temporary storage, such as in metal, concrete, fiberglass, or glass-lined bins, open trenches, and silos.

Thus, summarizing, at high throughput process rates, the present system and method comprises the following pre-processing and pretreating steps: Receiving in pre-size reduced CB source material; or alternatively, receiving and breaking-down, as needed, any large round, square, rectangular, or otherwise shaped bales, blocks, or haystacks of raw or waste CB source material, and chipping or grinding any oversize (e.g., "woody") materials; magnetic screening of the CB source material, to remove any unwanted metal debris; initial mesh sorting or other screening to remove large-fraction CB source material to assure the needed reduced size "starter" CB material for later process steps, and to also remove any large fraction non-CB materials; roller pressing (or other de-watering, if even needed) of the CB source material to eliminate any initial extra high moisture content that is present; coarse-grinding or chopping (of full plant length or other oversized material if not otherwise already pre-ground or pre-chopped by the CB producer or recycling source down to a suitable "starter" size) to reduce the CB material to a sufficiently small size, and any re-chopping (as needed) of any removed large fraction CB material; explosively drying and pulverizing the small fraction CB material into fine particulate material, to thereby produce a lignocellulosic powder "fluff" material, in which many of the LC bonds are now destructed and altered; effecting any repeated explosive drying and pulverizing of the CB fluff material as needed, depending on the internal structural make-up of the incoming CB source materials, and also of any remaining large fraction material separated out, to yet further degrade the tough internal LC bonds; classifying or otherwise separating out any remaining non-CB debris materials, and also any unwanted bark and/or needle fraction (as needed); subjecting the resultant high quality CB fluff to a high-intensity electrical degrading force, thereby to yet further alter and destruct the LC bonds, and help further expose as much of the micro structure surface areas and pores, and reduce the lignin's interference with subsequent processing; then, if desired and dependent upon a given biorefinery's needs, the internal make-up of the CB source material, and the various types of CB source material present, co-mixing any two or more separate types of raw CB fluff, including (as needed) one or more different types of recycled cellulosic-containing CB material, to create, in effect, a pre-selected uniform blend of degraded lignocellulosic fiber material; incorporating (by spraying, mixing or otherwise) one or more dilute acids (and/or alkaline solutions, hydrolytic enzymes, microbial agents, and organic or ionic liquid solvents) into the CB blend to create a pre-treated CB fluff mass; if needed, blending in a suitable binder material to create a further compressible mass; if not then used (or temporarily stored) as a CB fluff feedstock product, forming the compressible mass into CB feedstock pellets of consistent size and high energy value; if desired, coating the CB pellets with a suitable coating material (that is unaffected by any dilute acid, or alkaline solution, or solvent present, but which coating, during later biorefinery processing, will readily break down at elevated temperatures); thereby to create a CB feedstock pellet (or powder fluff, if pelletizing is not needed for a given biorefinery's use) having an ongoing slow, but active, pre-treatment regimen, at ambient temperature and pressure, contained inside, thereby continuing to further break down the LC bonds, over the pellet's (or fluff's) lifetime up through eventual use at the biorefinery.

It is expected that the presently contemplated CB pre-treatment and pre-processing facility will be permanent, i.e., built for use at a single operating location. However, it may be needed, for reasons of cost, or to minimize the "origination distance" of transporting the less dense new or recycled CB materials to the presently-contemplated pre-processing operator, or for zoning or road limits, to make the present system and method portable. That is, the various above-described components, as used to achieve the present system and method, can be mounted on portable trailers or flatbed trucks, for example, and then moved close to CB material sources, i.e., from temporary work site to temporary work site. For example, the tub grinder 50 (FIG. 1A) or 92 (FIG. 3), the metal debris roller and vibratory screen 94 (FIG. 3) or 164 (FIG. 5), could be mounted on one trailer; the EDP unit could be mounted on a second trailer; the air classifier 182 (FIG. 5), and any needed fiberizer unit 244 (FIG. 6B), could be mounted on a third trailer; the ED unit 188 (FIG. 5) and CB stream holding tanks 272, 274, 276, 278 (FIG. 7) could be mounted on a fourth trailer; the blending tank 280, and related tanks (and spraying equipment 283) for acid and other pre-treatment materials 284, 286, 288, 290, 292, 293, 29 (FIG. 7) could be mounted on a fifth trailer; while the pelletizing unit 308, any pellet coating unit 312, and related conveyor or chute delivery equipment (not shown, but for use in delivering the final CB pellets to awaiting silos, trucks or railcars see FIGS. 7 and 8), could be mounted on yet a sixth trailer. Such a caravan of system component trucks or trailers could then be moved to the next temporary processing site, e.g., near pine bettle kill logging operations, a C & D wood waste collection operation at a landfill, or a seasonal food processing operation, for, example, to be set up, interconnected with needed material handling equipment, and powered up for processing. Then, when the presently contemplated pre-processing of the current supply of raw or recycled CB material is completed for that given temporary work site, the portable system and method of the present disclosure can be broken down and moved on to the yet next temporary CB material processing site.

p) Thermal Conversion

Besides preparing CB source materials for use in hydrolysis-type CB ethanol and other biofuel production, certain steps of the present disclosure can also be used to prepare CB materials to create CB ethanol, biobutanol, and other biofuels, as may be made by a thermal-conversion process, i.e., a high temperature type bioconversion processes such as pyrolysis, gasification and plasma arc gasification, and whether a fixed-bed, fluidized-bed, or other type process. With such alternate thermal-conversion type CB ethanol and other fuel production processes, the CB materials are typically first heated at elevated temperatures in the absence of oxygen, and then combusted at a yet higher temperature, creating a so-called syngas (synthesis gas). Then, the syngas is catalytically converted to ethanol or other biofuels. Thus, the present system and method, in a modified form, can be advantageously used in a thermal conversion process. Specific ones include the gasification-type CB ethanol process as used by Range Fuels, Inc., of Broomfield, Colo. (see U.S. Pat. No. 6,863,878, for a description of that process, the teachings of which are incorporated herein by reference), or by the "plasma arc gasification" syngas process used in part by Coskata, Inc. of Warrenville, Ill. (see US 2007/0275447 and 2008/0057554, for a description of that process, the teachings of which are incorporated herein by reference). Other gasification-type processes, with which the present system and method can be used, include those described in US 2006/0032139A1 and WO 08063512A2, the teachings of which are also incorporated herein by reference. Generally, prylosis processes are performed at a temperature of at least 400° F.; gasification processes are performed at a temperature of at least 900° F.; while plasma arc gasification processes are performed at a temperature of at least 1200° F.

More specifically, the system and method of the present disclosure can easily be altered to advantageously work with any such thermal-conversion type processes. Such an alternate form of the present system and method can be used to prepare CB source materials that are significantly dried and pulverized, and rendered generally free of unwanted non-CB debris, and of generally uniform size, so as to be best prepared for use with a subsequent thermal-conversion process. Use of the present method with such alternate biofuel-producing operations results in higher combustion efficiencies, less gas or electricity usage and costs, less clinkers, reduced process times, and less moisture content to burn off.

In such a modified, alternate CB source material preparation process, the CB materials are first pre-chopped (if needed), vibratory screened to remove unwanted non-CB debris, run past a magnet roller (as needed) to remove unwanted metal objects, and then processed through the EDP unit, preferably at a slower process rate than used in the above-described process, e.g., to now accomplish as much drying as able, and then air (or otherwise) classified to remove any remaining non-CB debris material. The resulting CB materials will have a high quality, substantially reduced and uniform particle size, e.g., in the range of approximately 60 mesh to 4 mesh, and a low moisture content, preferably in the range of only approximately 1% to 10%. By having such high quality, small particle sizes, with such a low moisture content, such pre-processed CB source materials will undergo thermal-conversion more efficiently, at an earlier time and at a faster process rate, and with less resultant clinkers, and less overall exhaust gases created, thereby reducing energy costs and any associated pollution control equipment requirements.

It will be understood that parts of the present overall system and method can be performed at one location, while other parts can be performed at one or more different locations. For example, certain steps or machines can be positioned closer to the CB source material location, while other steps and machines can be performed at a second location closer to or at the later biorefinery, if needed for cost reasons.

q) Advantages of the Present System and Method

Based on the foregoing, it will be seen that the present system and method may include one or more of the following advantages:

It assures that a biorefinery will be able to continuously receive a uniform, readily treatable, and consistent (quality, physical, composition make-up, moisture content) CB feedstock, which is advantageous to the pre-treatment processes of most biorefineries.

Because the present system and method act to greatly disrupt many of the LC bonds within the CB materials, at the cellular and molecular level, they increase the surface area, create many new reactive sites, and create and open up pores in the CB materials. They further reduce the harshness, and costs, of further biorefinery processing, on a per unit basis, for the production of CB biofuels, e.g., CB ethanol, such as by reducing the volume and strength of needed chemicals (e.g., acids, alkaline solutions, solvents), reducing the amount of needed expensive enzymes and/or microbial agents, reducing power consumption, reducing water consumption, reducing processing times (e.g., reducing later hydrolysis reaction times), and reducing process temperatures. It is also projected that the fermentation yields and the quality of the resulting sugars will be enhanced.

By permitting use of different CB waste steams within a CB feedstock blend, it lessens the average "per delivered pound origination cost" (e.g., cost of driving distance required for trucks to deliver the densified CB source materials to a biorefinery).

The explosive drying and pulverizing step of the present method acts to substantially sterilize and kill unwanted bacteria, mold, fungus, and other pathogens contained within the CB source materials at an early time, thereby minimizing the deleterious effects of the same during their storage and also on subsequent biorefinery processing and conversion steps. This in turn, increases sugar yields, and is particularly helpful when recycled "contaminated" waste paper or moldy stored raw CB agricultural material is being used as a CB source material.

The initial screening, and then the explosive drying and pulverizing, coupled with air classification or other separation techniques, helps substantially remove unwanted non-CB debris materials, and even unwanted bark and/or needles fractions, thereby ensuring a high quality resultant CB feedstock product. Further, the magnetic removal of metal debris, coupled with later air classification and other separation techniques, minimizes the presence of unwanted iron components in the CB fluff material, which unwanted iron components if present can damage or destroy the precious metals used in catalysts in certain types of bio-conversion processes.

In a modified form of the present disclosure, small, generally uniform sized CB source materials can be provided for effective and cost-efficient combustion in alternate thermal combustion-type CB biofuel production processes, and with minimized resultant ash.

It allows intake and processing of raw and recycled waste stream CB materials across a wide range of material moisture content, e.g., from ensiled raw CB materials in the 45% to 65% moisture range, to field-dried raw CB materials in the 35% to 45% moisture range, to essentially dry recycled waste CB materials in the 1% to 10% range, all to create an end CB feedstock product having a generally consistent moisture content.

It permits ongoing daily custom blending of various types of incoming raw and recycled CB source materials, permitting a rapid adjustment based on their current market price, seasonality, and availability.

It permits use of all different types of CB source materials, e.g., agricultural-, urban-, rural-, industrial-, food processing-, forest-, recycle-, organic waste-based, and even aquaculture-based, CB source materials.

It permits switching over for a time each year, e.g., whether for only a few months or more, to an available secondary source of CB materials, e.g., wood chips or separated cellulosic daily waste materials, when the availability and quantity of a local primary CB source material, e.g., corn stover or energy grass, is seasonably reduced or non-existant.

It permits siting the CB feedstock pre-processing facility, as contemplated by this present disclosure, as close as able near the actual sources of the raw or recycled CB materials, including even as temporarily placed on movable flatbed trucks or trailers, thereby resulting in the shortest "origination distance" needed for the high volume/low energy density and generally high moisture content CB source materials to the pre-processing facility, yet then permits shipment to the biorefineries of only a highly densified, uniform high-energy, and uniform moisture content form of CB feedstock (whether as powder fluff or pellets). Thus, this process significantly increases the overall economical transportation distance of the end CB feedstock product.

It allows cost-effectively siting the present pre-processing facility (or certain system components thereof) in an area that is close to a regular source of cheap CB materials, e.g., near a recycling separation facility or industrial wood-processing operation, when the site, for environmental, zoning, size, safety, rail or road proximity, congestion, political, transportation cost, or other reasons, may not be a suitable location for a full biorefinery plant. It also allows siting (temporarily or permanently) of several such CB material pre-processing plants near respective sources of CB materials, to then collectively supply feedstock to one, or just a few, biorefineries, e.g., in effect, it allows creation of a distributed CB pre-processing system.

It allows maximum use of the daily price-fluctuations in local "low cost" (or free or even "negative cost") CB source materials, and thus, helps reduce the biorefinery's overall cost to create CB-based ethanol and other biofuels, and to extract other bio-byproducts from CB materials.

It achieves a pre-selected uniform moisture content (or a customly varied moisture content) for the resultant CB feedstock, by varying the process speed at which the CB material is passed through the explosive dryer and pulverizer unit, and by varying the respective CB materials (with different moisture contents) in a CB blend, to meet a given biorefinery's process needs and feedstock moisture specificaitons.

It allows the use, with only minimal front end modifications, of major portions of currently existing grain-based ethanol production plants. It also minimizes the need for construction of numerous new biorefineries, since CB source materials can be processed in the presently-contemplated processing site, and then more economically transported (e.g., to the Midwest) to currently-existing ethanol processing facilities (as then partially modified to also handle CB feedstocks).

It permits the cost-effective use of inexpensive but yet potentially problematic type CB materials, such as so-called "contaminated" (e.g., grease and oil-laden) recycled waste paper, molded and mildewed raw CB source materials, high moisture content "ensiled" or forest slash raw CB materials, and high bark or needle content type wood materials.

It allows, by pre-processing, and by dilute acid (or alkaline solution or solvent) pre-treating the CB source materials at ambient temperatures and pressures, the use at the subsequent biorefinery of lower cost processing equipment materials, e.g., Fiberglass tanks, PVC piping, and the like.

It accommodates the processing, by extra initial "size reduction" processing, or by in-line size re-processing, or by varying the process feed rates, or by using different types of dilute acids, alkaline solutions, organic or ionic liquid solvents, enzymes, and/or microbial agents, of various types of large fraction CB source material, or alternatively, of high lignin and resin-content CB source materials, e.g., softwood-based wood chips.

Its use of an ambient temperature, extended-length, dilute (acid or alkaline solution or enzyme or microbial or solvent) pre-treatment, as contained within the resultant CB pellet (or fluff) for the length of its lifetime, results in minimal overall degradation of the CB material's included sugars and organic content.

It permits, for the easier-to-degrade CB source materials, e.g., recycled waste cardboard and paper, direct use of enzymes and/or microbial agents for the CB materials' further processing, thereby eliminating or at least minimizing the need for the usual initial dilute acid (or alkaline solution or solvent) pre-treatment step at the biorefinery.

It allows use of one basic equipment set-up, at the herein-contemplated CB source material pre-processing facility, regardless of the different types of incoming raw or recycled waste CB source materials that will be processed.

Not only using the explosive forces of the EDP unit to create CB particle size reductions to increase the surface area for improved pre-treatment efficiencies, the present system also uses those explosive forces and the high intensity ED unit's forces to disrupt plant wall cellular and molecular structures, thereby to significantly enhance the subsequent biorefinery processes.

Notwithstanding the application of highly physically destructive (e.g., mechanical, explosive, electrical and chemical) steps to alter the molecular make-up of the CB source material, the available sugar content quality and percentages of the thus pre-treated CB source material are not substantially affected.

It permits application of chemical, enzymatic, and microbial pre-treatment materials to size-reduced CB materials at the earliest possible time, i.e., such pre-treatment materials operate for the longest potential time.

It permits locating the present CB material pre-processing facility centrally among several different ethanol plants and other CB biorefineries, to simultaneously supply them each with a customized CB feedstock product.

It readily achieves needed pre-treatment and densification of large bulk quantities of CB source materials, and does so at the required high process throughput rates that are needed for CB biorefinery use.

It permits all size reduction and drying (as needed), for the high annual tonnage of CB materials to be processed by the pre-processing sites contemplated hereunder, to be performed at a single site, rather than respectively spread across multiple biorefinery sites. Hence, any resulting dust control and exhaust-of-VOCs issues are readily controlled at and confined to one location.

A "plugging" problem is sometimes encountered with conventional high speed, open-ended rotary ring pelleting dies, i.e., the die end holes often get restricted or plugged, such as by debris, metal and other hard objects. However, the present system and method, where non-CB debris material has been substantially removed before any pelletizing step, will result in significantly less plugging of the pellet die open end holes.

Due to the fact that the CB particle sizes resulting from this system and method are sufficiently small, and of relative uniform size, it reduces diffusion resistance, and thus, speeds up the dispersion and reaction time of those CB particles, for the subsequent chemical and biological agents, both in the present method, and at the biorefinery.

Just as every biorefinery is different in many respects, and has specific needs, also different will be the incoming CB material feedstock and blends of feedstocks utilized by each such biorefinery. Yet the present system provides a substantially standardized method for pre-treating such different feedstocks to accommodate such differing biorefinery needs.

By controlling the process rate though the EDP unit, it allows for varying the final particle size and moisture content for the CB particles within the resulting fluff (or pellets, depending on the need of the given biorefinery customer).

It permits further reduction in landfill needs by providing additional uses of and demands for recyclable cellulose-containing and organic waste materials.

It permits, even if one locally available dependable CB source material unexpectedly suddenly becomes wholly or partially scarce and unavailable, such as due to weather events, or to government-prescribed restrictions (e.g., some future government limitation placed of the amount of corn stover that can be harvested and used in CB feedstock, or on how much CRP land can be converted to growing energy-type CB materials), the ready accommodation and adjustment for such a CB source material change, yet still allows creation of a uniform CB feedstock product.

By having, in an alternate embodiment of the present system and method, a second (or even additional) EDP unit present in series, i.e., after the primary EDP unit, it permits ready "extra" EDP processing (by the second and any additional EDP unit) of any especially tough LC bond type materials, should the need arise.

The foregoing disclosure is a projection. From the foregoing, it is believed that those skilled in the art will readily appreciate the unique features and advantages of the present disclosure over previous methods and systems for pre-treating cellulosic biomass for subsequent biorefinery use. Further, it is to be understood that while the present disclosure has been described in relation to a particular preferred and alternate embodiments as set forth in the accompanying drawings and as above described, the same nevertheless is susceptible to change, variation and substitution of equivalents without departure from the spirit and scope of this disclosure. It is therefore intended that the present disclosure be unrestricted by the foregoing description and drawings, except as may appear in the following appended claims.

We claim:

1. A biorefinery feedstock product formed from cellulose-containing input materials, said product comprising:
   (i) two or more different source types of cellulose-containing input materials blended together to define a quantity of blended cellulosic biomass material;
   the blended cellulosic biomass material comprising particles thereof having within them, at the cellular and molecular level, explosively degraded and destructed lignocellulosic bonds and other similarly disrupted microstructure;
   the blended cellulosic material having:
   material particles having a weight-average size in a size range of approximately 625 mesh to 40 mesh, and
   a moisture content, as blended, in a range of approximately 5%, on a weight basis, to approximately 25%, on a weight basis; and
   each of the respective source types of blended input materials having comprised, before blending, particles thereof having within them, at the cellular and molecular level, explosively degraded and destructed lignocellulosic bonds and other similarly disrupted microstructure; and
   (ii) means incorporated within said blended cellulosic biomass material, prior to the employment of said product at a biorefinery, for chemically, enzymatically and/or microbially pretreating, at the cellular and molecular level, the material particles of the blended biomass cellulosic material, and for further disrupting, at the cellular and molecular level, the disrupted lignocellulosic bonds of said particles, said means including one or more pre-treatment solutions, at least one of said pre-treatment solutions being incorporated in a state of encapsulated steeping and operating at ambient temperature and pressure during the lifetime of said blended, cellulosic biomass material so as to maximize a duration of operation of said one or more pre-treatment solutions;
   said lifetime and said encapsulated steeping each commencing upstream of the biorefinery where said product is employed as a feedstock and each continuing without interruption until the point at which said blended, cellulosic biomass material is used as a feedstock at said biorefinery; and
   said pre-treatment solutions comprising one or more of: (a) a dilute acid, (b) a dilute alkaline, (c) an organic solvent, (d) an ionic liquid solvent, (e) a microbial agent, (f) an enzyme, and (g) any combination thereof wherein the blended cellulosic biomass material is in the form of compacted, flowable units formed from powder fluffs and wherein each of the compacted, flowable units is coated and the state of encapsulated steeping continues within each coated, compacted, flowable units.

2. The product of claim 1 wherein:
the particles thereof have disrupted lignocellulosic bonds characteristic of bonds disrupted, before the blending of said different source types of input materials, by one of:
   (a) explosive drying and pulverizing of an input material;
   (b) electrical degrading of an input material; and
   (c) a combination of (a) and (b).

3. The product of claim 2 wherein said explosive drying and pulverizing has comprised one of passing said input material through:
   a high-speed, rotating, flail-processing unit having a tip speed greater than 300 MPH; and
   a high speed air-flow processing unit.

4. The product of claim 1 wherein the pre-treatment solutions comprise the dilute acid.

5. The product of claim 1 wherein the pre-treatment solutions comprise the dilute alkaline.

6. The product of claim 1 wherein the pre-treatment solutions comprise the organic solvent.

7. The product of claim 1 wherein the pre-treatment solutions comprise the ionic liquid solvent.

8. The product of claim 1 wherein the pre-treatment solutions comprise the microbial agent.

9. The product of claim 1 wherein the pre-treatment solutions comprise the enzyme.

10. The product of claim 1, wherein the two or more different source types of cellulose-containing input materials are blended in accordance with a measurable characteristic such that the blended cellulosic material is uniform with respect to the measurable characteristic, wherein the measurable characteristic comprises at least one of a moisture content, a cellulose content, a hemicellulose content, a lignin content, a silica content, a sugar content, a specific gravity, an electrical conductivity, and any combination thereof.

11. The product of claim 1, wherein one of the source types of cellulose- containing input materials comprises one of recycled paper, recycled cardboard, and a combination of recycled paper and recycled cardboard, and which has first undergone a dry fiberization process.

12. The product of claim 1, wherein each of the two or more different source types of cellulose-containing input materials comprises at least one of raw cellulose materials and recycled cellulose materials.

13. The product of claim 1, wherein said one or more pre-treatment solutions is a solution employed in the subsequent biorefining of said product.

14. A biorefinery feedstock product formed from cellulose-containing input materials, said product comprising:
(i) two or more different source types of cellulose-containing input materials blended together to define a quantity of blended cellulosic biomass material;
the blended cellulosic biomass material comprising particles thereof having within them, at the cellular and molecular level, explosively degraded and destructed lignocellulosic bonds and other similarly disrupted microstructure;
the blended cellulosic material having:
material particles in a size range of approximately 625 mesh to 4 mesh, and
a moisture content, as blended, in a range of approximately 5%, on a weight basis, to approximately 25%, on a weight basis; and
each of the respective source types of blended input materials having comprised, before blending, particles thereof having within them, at the cellular and molecular level, explosively degraded and destructed lignocellulosic bonds and other similarly disrupted microstructure; and
(ii) means incorporated within said blended cellulosic biomass material, prior to the employment of said product at a biorefinery, for chemically, enzymatically and/or microbially pretreating, at the cellular and molecular level, the material particles of the blended biomass cellulosic material, and for further disrupting, at the cellular and molecular level, the disrupted lignocellulosic bonds of said particles, said means including one or more pre-treatment solutions, at least one of said pre-treatment solutions being incorporated in a state of encapsulated steeping and operating at ambient temperature and pressure during the lifetime of said blended, cellulosic biomass material so as to maximize a duration of operation of said one or more pre-treatment solutions;
said lifetime and said encapsulated steeping each commencing upstream of the biorefinery where said product is employed as a feedstock and each continuing without interruption until the point at which said blended, cellulosic biomass material is used as a feedstock at said biorefinery; and
said pre-treatment solutions comprising one or more of: a dilute acid, a dilute alkaline, an organic solvent, an ionic liquid solvent, a microbial agent, an enzyme, and any combination thereof wherein the blended cellulosic biomass material is in the form of compacted, flowable units formed from powder fluffs and wherein each of the compacted, flowable units is coated and the state of encapsulated steeping continues within each coated, compacted, flowable units.

15. A biorefinery feedstock product formed from cellulose-containing input materials, said product comprising:
(i) two or more different source types of cellulose-containing input materials blended together to define a quantity of blended cellulosic biomass material;
the blended cellulosic biomass material comprising particles thereof having within them, at the cellular and molecular level, explosively degraded and destructed lignocellulosic bonds and other similarly disrupted microstructure;
the blended cellulosic material having:
material particles in a size range of approximately 625 mesh to 4 mesh, and
a moisture content, as blended, in a range of approximately 5%, on a weight basis, to approximately 25%, on a weight basis;
each of the respective source types of blended input materials having comprised, before blending, particles thereof having within them, at the cellular and molecular level, explosively degraded and destructed lignocellulosic bonds and other similarly disrupted microstructure; and
increased surface area, pores, and reactive sites for further reactions with one or more of a dilute acid, a dilute alkaline, an organic solvent, an ionic liquid solvent, and a microbial agent, relative to cellulosic biomass which has not been explosively degraded and destructed; and
(ii) means incorporated within said blended cellulosic biomass material, prior to the employment of said product at a biorefinery, for chemically, enzymatically and/or microbially pretreating, at the cellular and molecular level, the material particles of the blended biomass cellulosic material, and for further disrupting, at the cellular and molecular level, the disrupted lignocellulosic bonds of said particles, said means including one or more pre-treatment solutions, at least one of said pre-treatment solutions being incorporated in a state of encapsulated steeping and operating at ambient temperature and pressure during the lifetime of said blended, cellulosic biomass material so as to maximize a duration of operation of said one or more pre-treatment solutions;
said lifetime and said encapsulated steeping each commencing upstream of the biorefinery where said product is employed as a feedstock and each continuing without interruption until the point at which said blended, cellulosic biomass material is used as a feedstock at said biorefinery; and
said pre-treatment solutions comprising one or more of:
(a) a dilute acid, (b) a dilute alkaline, (c) an organic solvent, (d) an ionic liquid solvent, (e) a microbial agent, (f) an enzyme, and (g) any combination thereof wherein the blended cellulosic biomass material is in the form of compacted, flowable units formed from powder fluffs and wherein each of the compacted, flowable units is coated and the state of encapsulated steeping continues within each coated, compacted, flowable units.

* * * * *